United States Patent
Matsushita et al.

(10) Patent No.: US 10,396,464 B2
(45) Date of Patent: Aug. 27, 2019

(54) POWER TRANSMITTING COMMUNICATION UNIT AND POWER TRANSMITTING COMMUNICATION DEVICE

(71) Applicant: Yazaki Corporation, Tokyo (JP)

(72) Inventors: Kenji Matsushita, Kanagawa (JP); Tatsuo Toba, Kanagawa (JP); Shingo Tanaka, Kanagawa (JP); Yoichi Ido, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 152 days.

(21) Appl. No.: 15/241,254

(22) Filed: Aug. 19, 2016

(65) Prior Publication Data
US 2017/0054219 A1 Feb. 23, 2017

(30) Foreign Application Priority Data

Aug. 21, 2015 (JP) ................................. 2015-163741
Feb. 1, 2016 (JP) ................................. 2016-017475
Jul. 1, 2016 (JP) ................................. 2016-131852

(51) Int. Cl.
*H01Q 13/10* (2006.01)
*H02J 50/00* (2016.01)
*H04B 5/00* (2006.01)

(52) U.S. Cl.
CPC ............. *H01Q 13/10* (2013.01); *H02J 50/00* (2016.02); *H04B 5/0037* (2013.01)

(58) Field of Classification Search
CPC .... H01Q 9/0407; H01Q 13/10; H04B 5/0037; H02J 50/00
See application file for complete search history.

(56) References Cited

U.S. PATENT DOCUMENTS 5,418,545 A * 5/1995 Pantsios ................... H01Q 9/28
343/767
2006/0044200 A1 3/2006 Mori
(Continued)

FOREIGN PATENT DOCUMENTS

JP 2006-66993 A 3/2006
JP 2008-67012 A 3/2008
(Continued)

OTHER PUBLICATIONS

Japanese Office Action for the related Japanese Patent Application No. 2016-131852 dated Aug. 14, 2018.

*Primary Examiner* — Hoang V Nguyen
*Assistant Examiner* — Awat M Salih
(74) *Attorney, Agent, or Firm* — Kenealy Vaidya LLP

(57) ABSTRACT

An electric transmission communication unit and an electric reception communication unit are arranged on a base material, and include a flat plate-like first electrode that transmits electric power in a non-contact manner, a flat plate-like second electrode that is arranged side by side with the first electrode on the base material and transmits electric power in a non-contact manner, and a slot antenna that transmits or receives radio waves via a slit formed on the first electrode. For a power transmitting communication device, the first electrode and the second electrode of the electric transmission communication unit are arranged being opposed to the first electrode and the second electrode of the electric reception communication unit so that power transmission can be performed, and the slot antenna of the electric transmission communication unit is arranged being opposed to the slot antenna of the electric reception communication unit in a communicable manner.

6 Claims, 38 Drawing Sheets

(56) References Cited

U.S. PATENT DOCUMENTS

| | | | |
|---|---|---|---|
| 2009/0273418 A1 | 11/2009 | Shimizu et al. | |
| 2010/0289713 A1* | 11/2010 | Taura | H01Q 1/243 343/767 |
| 2014/0002312 A1* | 1/2014 | Konanur | H01Q 1/243 343/702 |
| 2014/0184455 A1* | 7/2014 | Lea | H01Q 9/285 343/745 |
| 2015/0065041 A1 | 3/2015 | Ahn | |
| 2015/0256228 A1* | 9/2015 | Goma | H01Q 7/00 307/104 |
| 2015/0333538 A1* | 11/2015 | Kusunoki | H01J 17/00 307/104 |

FOREIGN PATENT DOCUMENTS

| | | |
|---|---|---|
| JP | 2009-268022 A | 11/2009 |
| JP | 2013-223303 A | 10/2013 |
| WO | 2014/112150 A1 | 7/2014 |

* cited by examiner

POWER TRANSMITTING COMMUNICATION UNIT AND POWER TRANSMITTING COMMUNICATION DEVICE

CROSS-REFERENCE TO RELATED APPLICATION(S)

The present application claims priority to and incorporates by reference the entire contents of Japanese Patent Application No. 2015-163741 filed in Japan on Aug. 21, 2015, Japanese Patent Application No. 2016-017475 filed in Japan on Feb. 1, 2016 and Japanese Patent Application No. 2016-131852 filed in Japan on Jul. 1, 2016.

BACKGROUND OF THE INVENTION

1. Field of the Invention

The present invention relates to a power transmitting communication unit and a power transmitting communication device.

2. Description of the Related Art

In the related art, known is a power transmission system that transmits electric power in a non-contact manner. For example, the power transmission system causes an electrode of a power transmission module on a power transmission side to be opposed to an electrode of a power transmission module on a power reception side, and transmits electric power in a non-contact manner by electric field coupling (for example, refer to Japanese Patent Application Laid-open No. 2013-223303).

To add a wireless communication function to the power transmission module, a communication module is required to be added to another place on the same plane as the power transmission module. Due to this, there has been a problem in that the size of the power transmission system, including the power transmission module and the communication module, is increased.

SUMMARY OF THE INVENTION

The present invention is made in view of such a situation, and provides a power transmitting communication unit and a power transmitting communication device that can be downsized.

In order to achieve the above mentioned object, a power transmitting communication unit according to one aspect of the present invention includes a base material; a flat plate-like first electrode that is arranged on the base material and transmits electric power in a non-contact manner; a flat plate-like second electrode that is arranged side by side with the first electrode on the base material, and transmits electric power in a non-contact manner; and a slot antenna that transmits or receives radio waves via a slit formed on at least one of the first electrode and the second electrode.

According to another aspect of the present invention, in the power transmitting communication unit, it is preferable that the slit is formed in a rectangular shape, a length of a long side of the slit is ½ of a wavelength of the radio waves, and a length of a short side of the slit is equal to or smaller than 1/30 of the wavelength of the radio waves.

According to still another aspect of the present invention, in the power transmitting communication unit, it is preferable to further include a signal input/output circuit that is connected to the slot antenna via a signal line and inputs/outputs an electric signal to the slot antenna.

According to still another aspect of the present invention, in the power transmitting communication unit, it is preferable that the slot antenna includes a power feeding point to which the signal line is connected, and the power feeding point is arranged at a center of the long side of the slit.

According to still another aspect of the present invention, in the power transmitting communication unit, it is preferable that the slit is formed in a rectangular shape, and the slot antenna includes a short-circuit part that electrically connects one long side with the other long side of the slit.

According to still another aspect of the present invention, in the power transmitting communication unit, it is preferable that the short-circuit part is arranged along a direction orthogonal to the long side of the slit, and positioned closer to an end with respect to the center of the long side of the slit.

In order to achieve the above mentioned object, a power transmitting communication device according to still another aspect of the present invention includes an electric transmission communication unit that includes a base material on a power transmission side, a flat plate-like first electrode on the power transmission side that is arranged on the base material on the power transmission side and transmits electric power in a non-contact manner, a flat plate-like second electrode on the power transmission side that is arranged side by side with the first electrode on the power transmission side on the base material on the power transmission side and transmits electric power in a non-contact manner, and a slot antenna on the power transmission side that transmits or receives radio waves via a slit on the power transmission side formed on at least one of the first electrode on the power transmission side and the second electrode on the power transmission side; and an electric reception communication unit that includes a base material on a power reception side, a flat plate-like first electrode on the power reception side that is arranged on the base material on the power reception side and receives electric power in a non-contact manner, a flat plate-like second electrode on the power reception side that is arranged side by side with the first electrode on the power reception side on the base material on the power reception side and receives electric power in a non-contact manner, and a slot antenna on the power reception side that transmits or receives radio waves via a slit on the power reception side formed on at least one of the first electrode on the power reception side and the second electrode on the power reception side, wherein the first electrode on the power transmission side and the second electrode on the power transmission side are arranged being opposed to the first electrode on the power reception side and the second electrode on the power reception side so that power transmission can be performed, and the slot antenna on the power transmission side is arranged being opposed to the slot antenna on the power reception side in a communicable manner.

According to still another aspect of the present invention, in the power transmitting communication device, it is preferable that the electric transmission communication unit includes an alternating current power supply that is connected to the first electrode on the power transmission side and the second electrode on the power transmission side via an electric wire, and supplies alternating current power, and the electric transmission communication unit supplies the alternating current power to the electric reception communication unit by electric field coupling when the alternating current power is supplied from the alternating current power supply.

In order to achieve the above mentioned object, a power transmitting communication unit according to still another aspect of the present invention includes a base material; a flat plate-like first electrode that is arranged on the base material and transmits electric power in a non-contact manner; a flat plate-like second electrode that is arranged side by side with the first electrode on the base material, and transmits electric power in a non-contact manner; and a U-shaped folded monopole antenna that transmits or receives radio waves via a U-shaped metal plate formed on at least one of the first electrode and the second electrode.

In order to achieve the above mentioned object, a power transmitting communication device according to still another aspect of the present invention includes an electric transmission communication unit that includes a base material on a power transmission side, a flat plate-like first electrode on the power transmission side that is arranged on the base material on the power transmission side and transmits electric power in a non-contact manner, a flat plate-like second electrode on the power transmission side that is arranged side by side with the first electrode on the power transmission side on the base material on the power transmission side and transmits electric power in a non-contact manner, and a U-shaped folded monopole antenna on the power transmission side that transmits or receives radio waves via a U-shaped metal plate formed on at least one of the first electrode on the power transmission side and the second electrode on the power transmission side; and an electric reception communication unit that includes a base material on a power reception side, a flat plate-like first electrode on the power reception side that is arranged on the base material on the power reception side and receives electric power in a non-contact manner, a flat plate-like second electrode on the power reception side that is arranged side by side with the first electrode on the power reception side on the base material on the power reception side and receives electric power in a non-contact manner, and a U-shaped folded monopole antenna on the power reception side that transmits or receives radio waves via a U-shaped metal plate formed on at least one of the first electrode on the power reception side and the second electrode on the power reception side, wherein the first electrode on the power transmission side and the second electrode on the power transmission side are arranged being opposed to the first electrode on the power reception side and the second electrode on the power reception side so that power transmission can be performed, and the U-shaped folded monopole antenna on the power transmission side is arranged being opposed to the U-shaped folded monopole antenna on the power reception side in a communicable manner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes preferred embodiments in detail with reference to the drawings. The present invention is not limited to the embodiments described below. Components described below include a component that is easily conceivable by those skilled in the art and substantially the same component. The components described below can be appropriately combined. The components can be variously omitted, replaced, or modified without departing from the gist of the present invention.

First Embodiment

Figure 1:
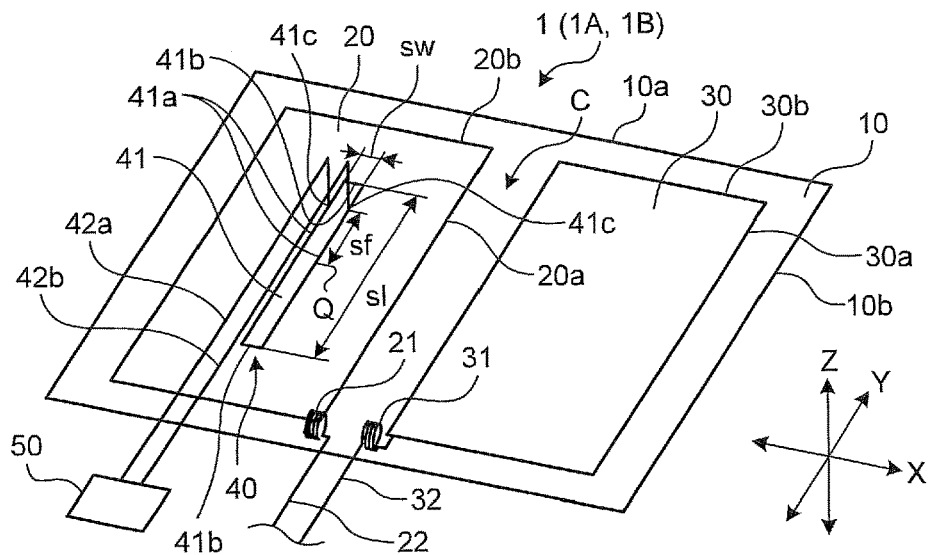
FIG. 1 is a perspective view illustrating a configuration example of a power transmitting communication unit according to a first embodiment.
Figure 2:
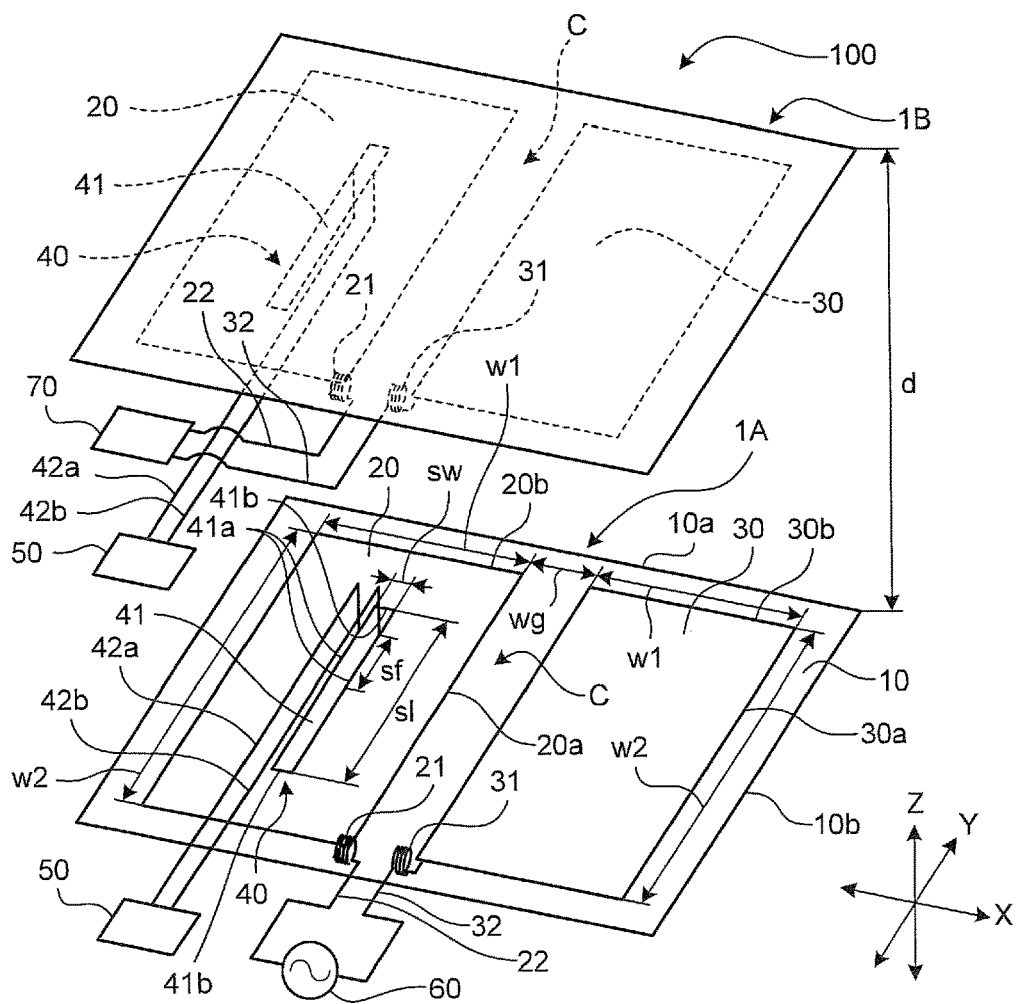
FIG. 2 is a perspective view illustrating a configuration example of a power transmitting communication device according to the first embodiment.

The following describes a power transmitting communication unit and a power transmitting communication device according to a first embodiment. FIG. 1 is a perspective view illustrating a configuration example of the power transmitting communication unit according to the first embodiment. FIG. 2 is a perspective view illustrating a configuration example of the power transmitting communication device according to the first embodiment.

A power transmitting communication unit 1 transmits electric power by electric field coupling (electric field resonance coupling), and performs wireless communication. As illustrated in FIG. 1, the power transmitting communication unit 1 includes a base material 10, a first electrode 20, a second electrode 30, inductors 21 and 31, electric wires 22 and 32, a slot antenna 40, signal lines 42a and 42b, and a signal input/output circuit 50.

The base material 10 is made of a flat plate-like insulating material, and formed in a rectangular shape having a long side 10a and a short side 10b. A direction along the long side 10a of the base material 10 is assumed to be the X-axis direction, a direction along the short side 10b of the base material 10 is assumed to be the Y-axis direction, and a direction orthogonal to the X-axis direction and the Y-axis direction on the same plane is assumed to be the Z-axis direction.

The first electrode 20 transmits electric power in a non-contact manner. The first electrode 20 is made of a flat plate-like conductive member, and formed in a rectangular shape having a long side 20a and a short side 20b. The first electrode 20 is arranged on the base material 10 so that the long side 20a is parallel with the Y-axis direction and the short side 20b is parallel with the X-axis direction. The electric wire 22 is connected to the first electrode 20 via the inductor 21. For example, one end of the inductor 21 is connected to one end in the X-axis direction of the first electrode 20. One end of the electric wire 22 is connected to the other end of the inductor 21.

The second electrode 30 transmits electric power in a non-contact manner. The second electrode 30 is made of a flat plate-like conductive member, and formed in a rectangular shape having a long side 30a and a short side 30b. The second electrode 30 is formed to have substantially the same size as that of the first electrode 20. The long side 30a of the second electrode 30 is parallel with the Y-axis direction, and the short side 30b thereof is parallel with the X-axis direction. The second electrode 30 is arranged side by side with the first electrode 20 in the X-axis direction on the same plane of the base material 10, and arranged at the same position as that of the first electrode 20 in the Y-axis direction. A capacitor C is formed between the first electrode 20 and the second electrode 30 in the X-axis direction. The electric wire 32 is connected to the second electrode 30 via the inductor 31. For example, one end of the inductor 31 is connected to one end in the X-axis direction of the second electrode 30. One end of the electric wire 32 is connected to the other end of the inductor 31. Each of the electric wires 32 and 22 is, for example, a coaxial cable.

In the power transmitting communication unit 1, a series resonance circuit is configured with the capacitor C formed between the first electrode 20 and the second electrode 30 in the X-axis direction, and the inductors 21 and 31.

The electric wire 22 of the first electrode 20 and the electric wire 32 of the second electrode 30 are arranged to avoid regions of the first electrode 20 and the second electrode 30 and a region of the capacitor C between the first electrode 20 and the second electrode 30, and to extend in the Y-axis direction away from these regions. An AC (alternating current) power supply 60 or a load 70 (described later) is connected to the other end of each of the electric wires 22 and 32.

The slot antenna 40 is used for transmitting or receiving radio waves. The slot antenna 40 has a slit (slot) 41. The slit 41 is an opening formed on at least one of the first electrode 20 and the second electrode 30. In the first embodiment, the slit 41 is formed at substantially the center of the first electrode 20. The slit 41 passes through the first electrode 20 in the Z-axis direction. The slit 41 is formed in a rectangular shape having a long side 41a and a short side 41b, the long side 41a of the slit 41 is formed along the Y-axis direction, and the short side 41b of the slit 41 is formed along the X-axis direction. A length s1 of the long side 41a of the slit 41 is ½ of a wavelength λ of the radio waves, and a length sw of the short side 41b of the slit 41 is equal to or smaller than 1/30 of the wavelength λ of the radio waves. The slot antenna 40 includes a power feeding point 41c to which the signal lines 42a and 42b are connected. One end of the signal line 42a is connected to the power feeding point 41c on one of long sides 41a of the slit 41, and one end of the signal line 42b is connected to the power feeding point 41c on the other long side 41a of the slit 41. The power feeding point 41c of the slit 41 is offset in the Y-axis direction from the center in the Y-axis direction of the long side 41a of the slit 41. Each of the signal lines 42a and 42b is, for example, a coaxial cable.

The other ends of the signal lines 42a and 42b are connected to the signal input/output circuit 50. The signal input/output circuit 50 outputs an electric signal having a high frequency to the slot antenna 40 via the signal lines 42a and 42b. The signal input/output circuit 50 also receives an electric signal having a high frequency input from the slot antenna 40 via the signal lines 42a and 42b.

As illustrated in FIG. 2, the power transmitting communication unit 1 functions as an electric transmission communication unit 1A that transmits electric power or an electric reception communication unit 1B that receives electric power. The electric transmission communication unit 1A and the electric reception communication unit 1B constitute a power transmitting communication device 100.

In the power transmitting communication device 100, the first electrode 20 and the second electrode 30 of the electric transmission communication unit 1A are opposed to the first electrode 20 and the second electrode 30 of the electric reception communication unit 1B so that power transmission can be performed. For example, the first electrode 20 of the electric transmission communication unit 1A and the first electrode 20 of the electric reception communication unit 1B are arranged in parallel with an XY-plane constituted of the X-axis direction and the Y-axis direction, and arranged at the same position based on XY-plane coordinates. The first electrode 20 of the electric transmission communication unit 1A and the first electrode 20 of the electric reception communication unit 1B are arranged with a predetermined gap d in the Z-axis direction. Similarly, the second electrode 30 of the electric transmission communication unit 1A and the second electrode 30 of the electric reception communication unit 1B are arranged in parallel with the XY-plane, and arranged at the same position based on the XY-plane coordinates. The second electrode 30 of the electric transmission communication unit 1A and the second electrode 30 of the electric reception communication unit 1B are arranged with the predetermined gap d in the Z-axis direction.

In the power transmitting communication device 100, the slot antenna 40 of the electric transmission communication unit 1A is opposed to the slot antenna 40 of the electric reception communication unit 1B in a communicable manner. For example, the slit 41 of the slot antenna 40 of the electric transmission communication unit 1A and the slit 41 of the slot antenna 40 of the electric reception communication unit 1B are arranged in parallel with the XY-plane, and arranged at the same position based on the XY-plane coordinates. The slit 41 of the electric transmission communication unit 1A and the slit 41 of the electric reception communication unit 1B are arranged with a predetermined gap in the Z-axis direction, that is, with the same gap d as that between the first electrode 20 of the electric transmission communication unit 1A and the first electrode 20 of the electric reception communication unit 1B.

The power transmitting communication device 100 includes the AC power supply 60 and the load 70. The AC power supply 60 is connected to the first electrode 20 of the electric transmission communication unit 1A via the electric wire 22 and the inductor 21. The AC power supply 60 is also connected to the second electrode 30 of the electric transmission communication unit 1A via the electric wire 32 and the inductor 31. The AC power supply 60 supplies AC power to the first electrode 20 of the electric transmission communication unit 1A via the electric wire 22 and the inductor 21, and supplies the AC power to the second electrode 30 of the electric transmission communication unit 1A via the electric wire 32 and the inductor 31.

The load 70 is, for example, a storage battery, and connected to the first electrode 20 of the electric reception communication unit 1B via the electric wire 22 and the inductor 21. The load 70 is also connected to the second electrode 30 of the electric reception communication unit 1B via the electric wire 32 and the inductor 31. The load 70 receives the AC power from the first electrode 20 of the electric reception communication unit 1B via the inductor 21 and the electric wire 22, and receives the AC power from the second electrode 30 of the electric reception communication unit 1B via the inductor 31 and the electric wire 32.

Next, the following describes an operation example of the power transmitting communication device 100. When receiving the AC power supplied from the AC power supply 60, the electric transmission communication unit 1A supplies the AC power to the electric reception communication unit 1B in a non-contact manner by electric field coupling. The electric reception communication unit 1B receives the AC power supplied from the electric transmission communication unit 1A, and stores the AC power in the load 70 serving as the storage battery.

When the electric signal is output from the signal input/output circuit 50, the electric transmission communication unit 1A transmits radio waves to the slot antenna 40 of the electric reception communication unit 1B from the slot antenna 40. The electric reception communication unit 1B receives the radio waves transmitted from the electric transmission communication unit 1A via the slot antenna 40, and outputs the electric signal to the signal input/output circuit 50. When the electric signal is output from the signal input/output circuit 50, the electric reception communication unit 1B transmits the radio waves to the slot antenna 40 of the electric transmission communication unit 1A from the slot antenna 40. The electric transmission communication unit 1A receives the radio waves transmitted from the electric reception communication unit 1B via the slot antenna 40, and outputs the electric signal to the signal input/output circuit 50.

Figure 3:
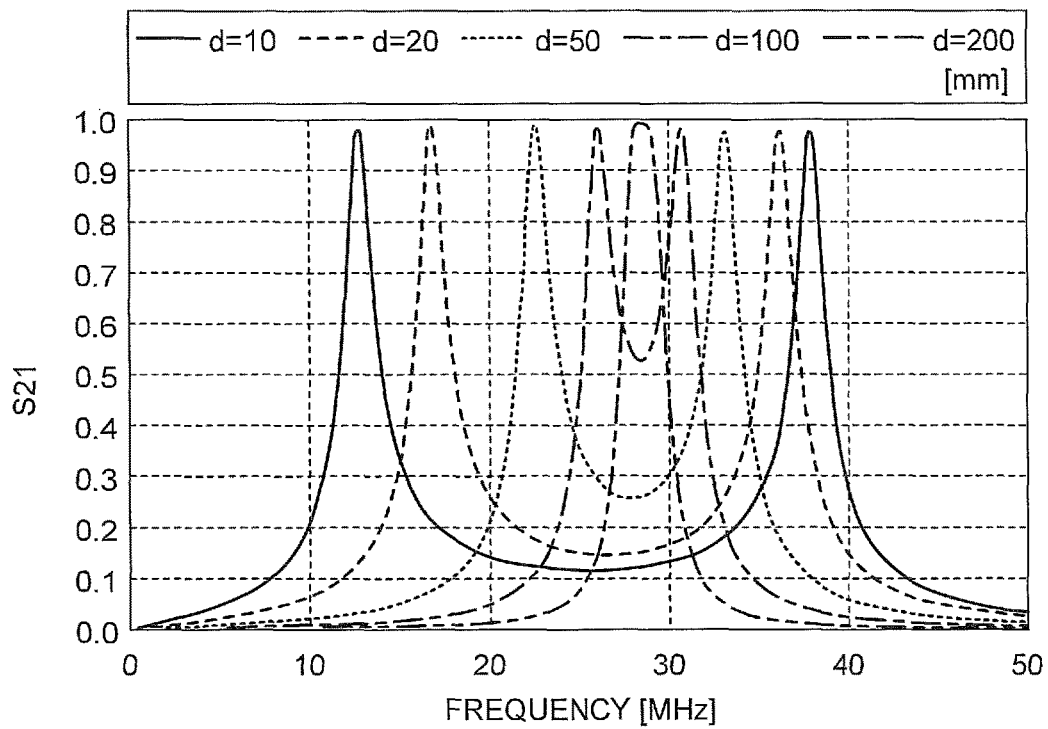
FIG. 3 is a diagram illustrating a power transmission characteristic (S21) according to the first embodiment.
Figure 4:
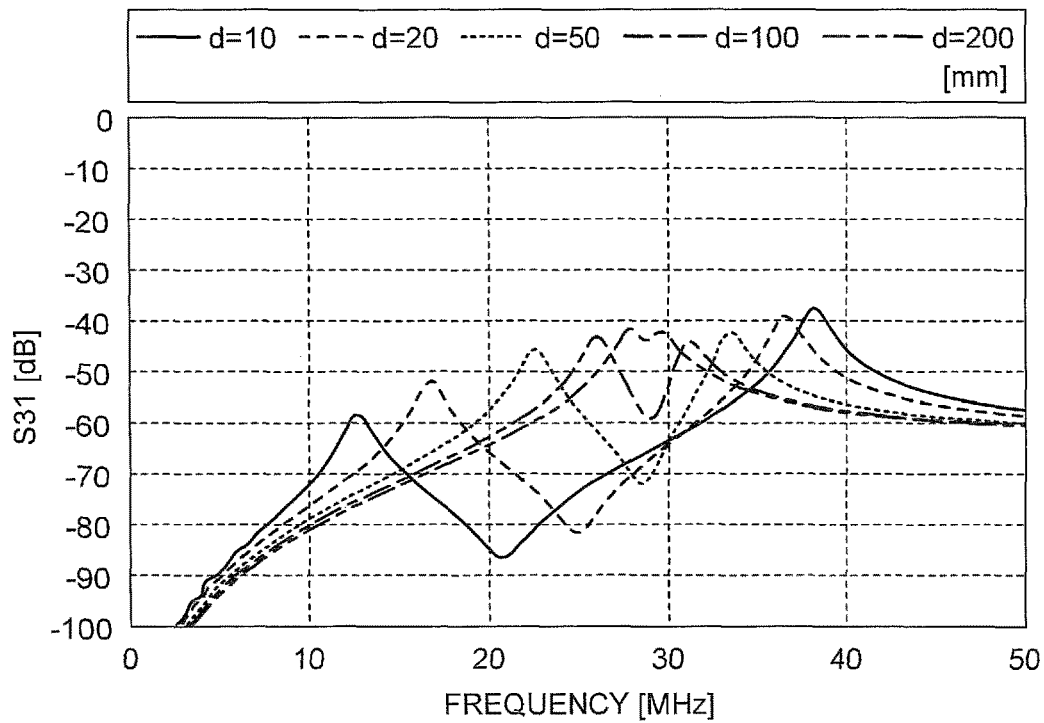
FIG. 4 is a diagram illustrating an isolation characteristic (S31) according to the first embodiment.
Figure 5:
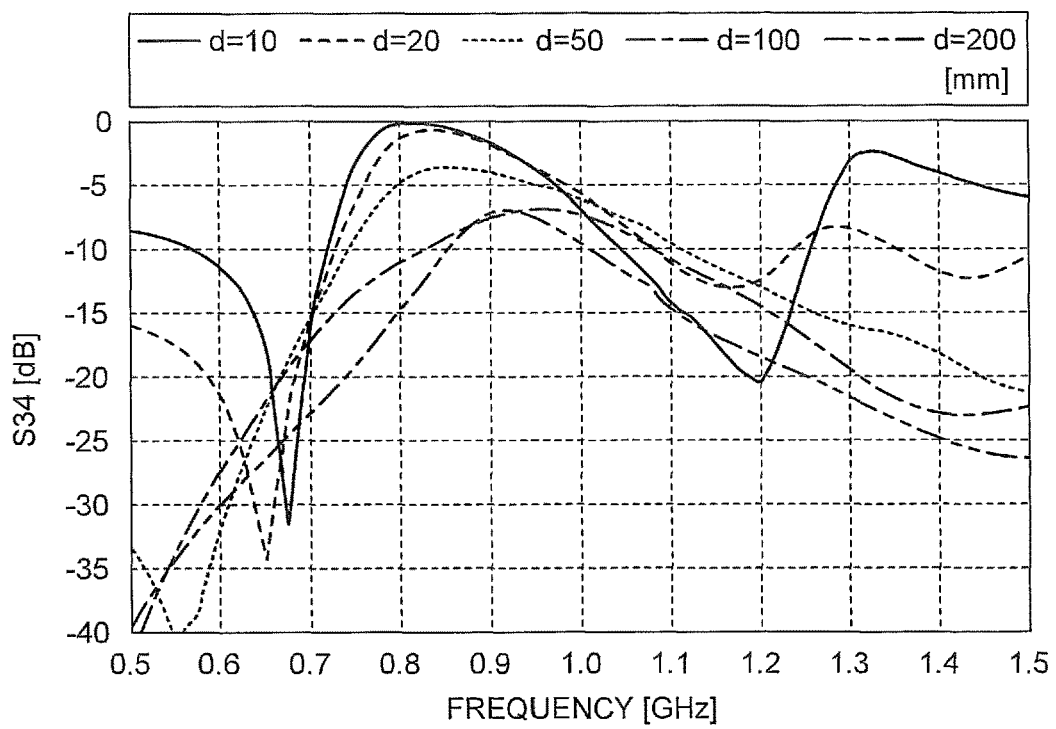
FIG. 5 is a diagram illustrating a communication transmission characteristic (S34) according to the first embodiment.
Figure 6:
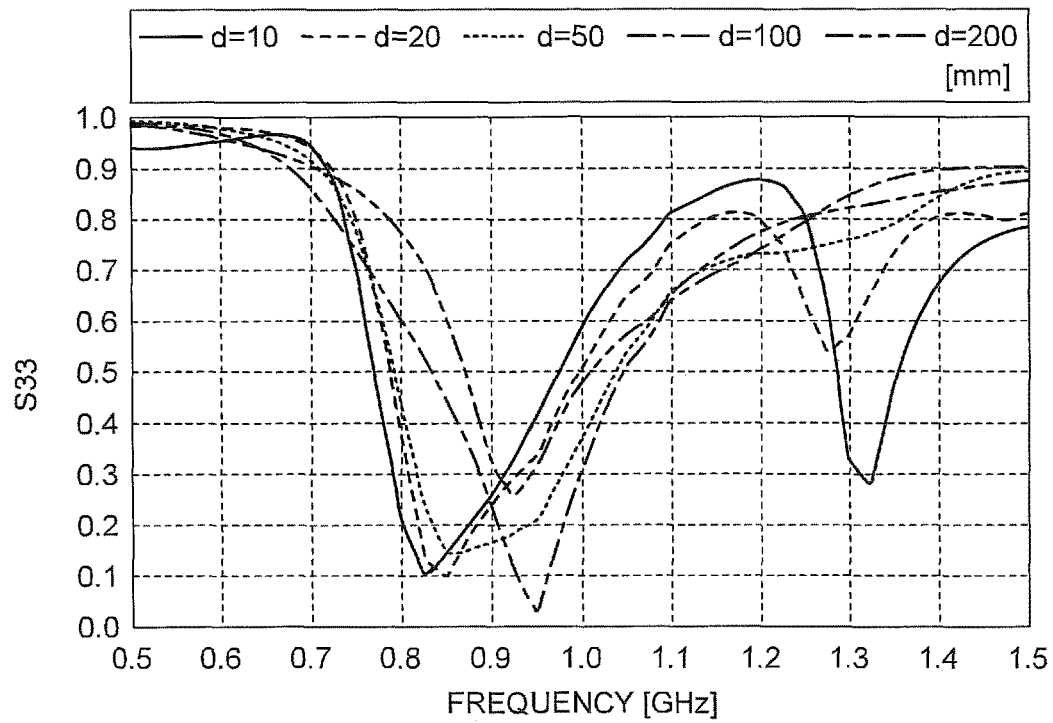
FIG. 6 is a diagram illustrating a communication reflection characteristic (S33) according to the first embodiment.
Figure 7:
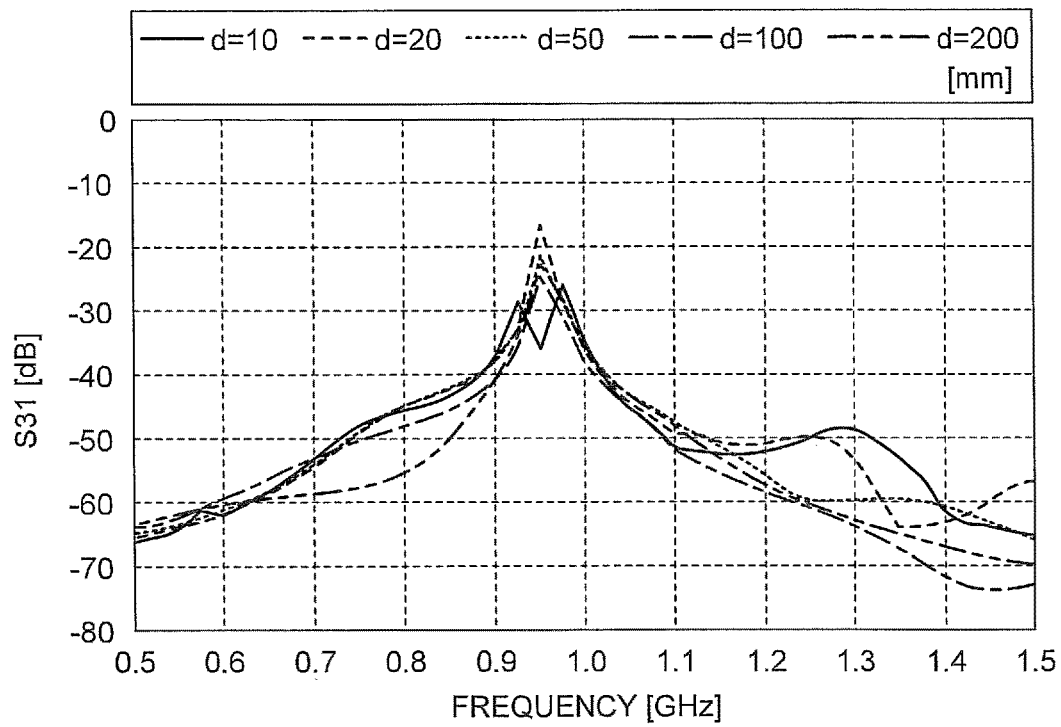
FIG. 7 is a diagram illustrating the isolation characteristic (S31) according to the first embodiment.

Next, the following describes an operation characteristic of the power transmitting communication device 100. FIG. 3 is a diagram illustrating a power transmission characteristic (S21) according to the first embodiment. FIG. 4 is a diagram illustrating an isolation characteristic (S31) according to the first embodiment. FIG. 5 is a diagram illustrating a communication transmission characteristic (S34) according to the first embodiment. FIG. 6 is a diagram illustrating a communication reflection characteristic (S33) according to the first embodiment. FIG. 7 is a diagram illustrating the isolation characteristic (S31) according to the first embodiment.

In this example, a frequency of the radio waves transmitted from the slot antenna 40 is assumed to be 1 GHz band. The length s1 of the long side 41a of the slit 41 of the slot antenna 40 is assumed to be 150 mm, the length sw of the short side 41b is assumed to be 1 mm, and an offset amount sf of the power feeding point 41c is assumed to be 50 mm, the power feeding point 41c being offset from the center Q in the Y-axis direction of the long side 41a of the slit 41 to the Y-axis direction. The frequency of the radio waves is assumed to be 1 GHz band (wavelength $\lambda$=300 mm), so that the length s1 of the long side 41a of the slit 41 is 150 mm ($\lambda/2$) to resonate the radio waves with the slot antenna 40. The gap d between the electric transmission communication unit 1A and the electric reception communication unit 1B is assumed to be 10 mm, 20 mm, 50 mm, 100 mm, or 200 mm. A length w1 of the short side 20b of the first electrode 20 is 107.8 mm, and a length w2 of the long side 20a of the first electrode 20 is 250 mm. Similarly, the length w1 of the short side 30b of the second electrode 30 is 107.8 mm, and the length w2 of the long side 30a of the second electrode 30 is 250 mm. A gap wg between the first electrode 20 and the second electrode 30 in the X-axis direction is 34.4 mm. An inductance of the inductors 21 and 31 is $2.8e^{-6}$ (H).

In the power transmitting communication device 100, as illustrated in FIG. 3, it can be found that the power transmission characteristic (S21) is equal to or larger than 90% at a frequency around 30 MHz. That is, it can be found that the power transmission characteristic is not affected even when the slot antenna 40 is arranged on each of the first electrode 20 of the electric transmission communication unit 1A and the first electrode 20 of the electric reception communication unit 1B. In FIG. 3, the vertical axis indicates the power transmission characteristic (S21), and the horizontal axis indicates a frequency of the AC power supplied from the AC power supply 60.

In the power transmitting communication device 100, as illustrated in FIG. 4, the isolation characteristic (S31) indicating influence on communication caused by supplying electric power is equal to or larger than 35 dB. That is, it can be found that the influence on communication caused by supplying electric power is suppressed. When isolation equal to or larger than 35 dB is insufficient, the isolation can be enhanced with a filter and the like. In FIG. 4, the vertical axis indicates the isolation characteristic (S31), and the horizontal axis indicates the frequency of the AC power supplied from the AC power supply 60.

In the power transmitting communication device 100, as illustrated in FIG. 5, the communication transmission characteristic (S34) is substantially equal to or smaller than 10 dB around 1 GHz band. That is, it can be found that the influence on communication caused by supplying electric power is suppressed. A flat communication transmission characteristic is obtained around 1 GHz band. In FIG. 5, the vertical axis indicates the communication transmission characteristic (S34), and the horizontal axis indicates a frequency of the electric signal output from the signal input/output circuit 50.

In the power transmitting communication device 100, as illustrated in FIG. 6, the communication reflection characteristic (S33) is equal to or smaller than 0.5 over a wide band. Table 1 below represents a frequency band in which the communication reflection characteristic (S33) is equal to or smaller than 0.5 and a fractional bandwidth for each gap d between the electric transmission communication unit 1A and the electric reception communication unit 1B. As a comparative example, represented are a frequency band and a fractional bandwidth in a case of using the single slot antenna 40. According to Table 1, the fractional bandwidth is larger than the fractional bandwidth (19%) in a case of using the single slot antenna 40 except a case in which a distance (gap) d is 200 mm. This is because the slot antenna 40 is formed on each of the first electrode 20 of the electric transmission communication unit 1A and the first electrode 20 of the electric reception communication unit 1B coupled to each other, which causes overcoupling between slot antennas 40. In FIG. 6, the vertical axis indicates the communication reflection characteristic (S33), and the horizontal axis indicates the frequency of the electric signal output from the signal input/output circuit 50.

TABLE 1

| Distance d (mm) | Frequency band (MHz) | Specific band (%) |
| --- | --- | --- |
| 10 | 770 to 970 | 23 |
| 20 | 790 to 990 | 22 |
| 50 | 790 to 1030 | 26 |
| 100 | 830 to 1020 | 21 |
| 200 | 870 to 1010 | 15 |
| (Single slot antenna) | 850 to 1030 | 19 |

In the power transmitting communication device 100, as illustrated in FIG. 7, the isolation characteristic (S31) indicating influence on supplying of electric power caused by communication is equal to or larger than 20 dB. That is, it can be found that the influence on supplying of electric power caused by communication is suppressed. Electric power required for communication is small, so that influence thereof on supplying of electric power, which requires large electric power, is not necessarily strictly considered, and the present situation is sufficient. In FIG. 7, the vertical axis indicates the isolation characteristic (S31), and the horizontal axis indicates the frequency of the electric signal output from the signal input/output circuit 50.

Figure 8:
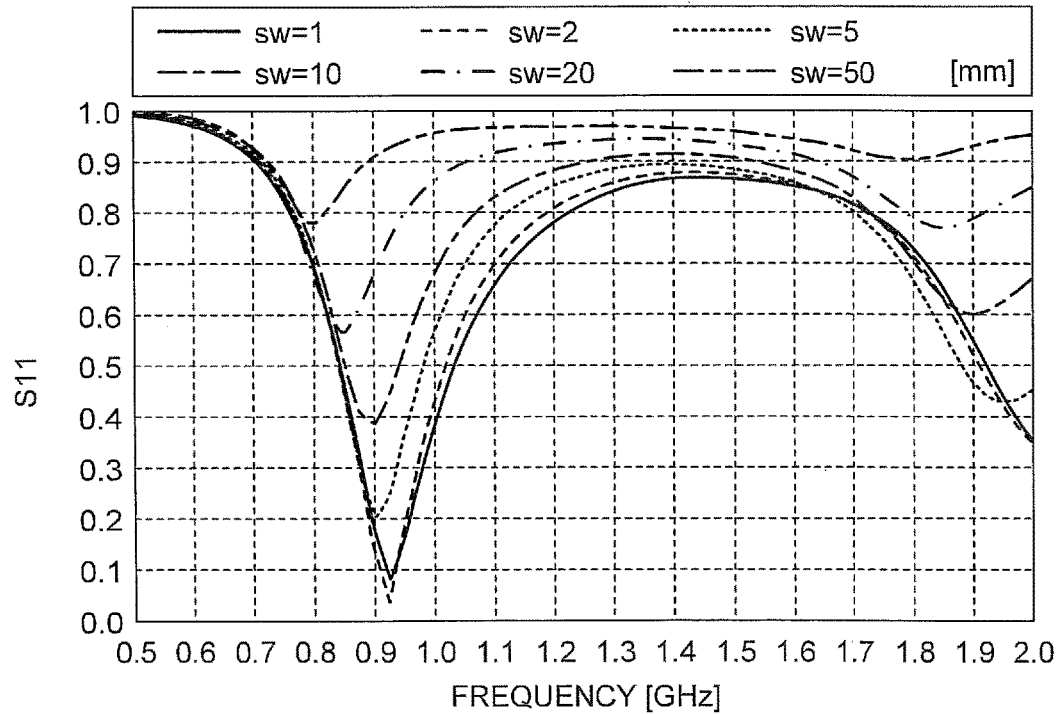
FIG. 8 is a diagram illustrating a reflection characteristic (S11) according to the first embodiment.
Figure 9:
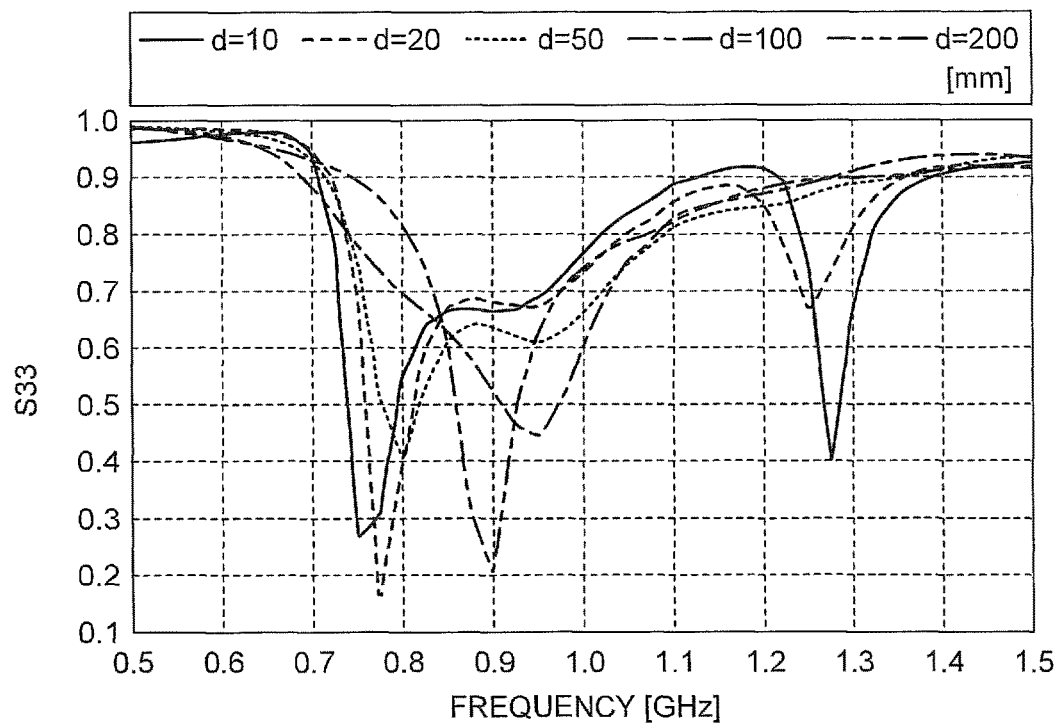
FIG. 9 is a diagram illustrating the communication reflection characteristic (S33) in a case in which a length of a short side of a slit according to the first embodiment is 10 mm.

The following describes an example of a range of the length sw of the short side 41b of the slit 41 of the slot antenna 40 satisfying the operation characteristic (1 GHz band) of the power transmitting communication device 100 described above. FIG. 8 is a diagram illustrating a reflection characteristic (S11) according to the first embodiment. FIG. 9 is a diagram illustrating the communication reflection characteristic (S33) in a case in which the length of the short side of the slit according to the first embodiment is 10 mm. In this example, simulation is performed by using the single slot antenna 40, that is, using any one of the slot antenna 40 of the electric transmission communication unit 1A and the slot antenna 40 of the electric reception communication unit 1B. As illustrated in FIG. 8, it can be found that the reflection characteristic (S11) exceeds 0.5 when the length sw of the short side 41b of the slit 41 exceeds about 10 mm, and the slot antenna 40 becomes inoperative. Thus, the length sw of the short side 41b of the slit 41 needs to be equal to or smaller than 10 mm ($\lambda/30$). When the length sw (=10 mm) of the short side 41b of the slit 41 is normalized with the wavelength $\lambda$ at 1 GHz, the length sw of the short side 41b of the slit 41 is $\lambda/30$. In the power transmitting communication device 100, as illustrated in FIG. 9, it can be found that the communication reflection characteristic (S33) is equal to or smaller than 0.5, which is close to a limit, in a case in which the length sw of the short side 41b of the slit 41 is 10 mm ($\lambda/30$). The communication reflection characteristic (S33) illustrated in FIG. 9 in a case in which the length sw of the short side 41b of the slit 41 is 10 mm causes effect of band expansion smaller than that caused by the communication reflection characteristic (S33) illustrated in FIG. 6 in a case in which the length sw of the short side 41b of the slit 41 is 1 mm. Accordingly, the length sw of the short side 41b of the slit 41 is preferably set to be equal to or smaller than $\lambda/30$. In FIG. 8, the vertical axis indicates the reflection characteristic (S11), and the horizontal axis indicates the frequency of the electric signal output from the signal input/output circuit 50. In FIG. 9, the vertical axis indicates the communication reflection characteristic (S33), and the horizontal axis indicates the frequency of the electric signal output from the signal input/output circuit 50.

Next, the following describes an example in which the frequency of the radio waves transmitted from the slot antenna 40 is assumed to be 2 GHz band. The length s1 of the long side 41a of the slit 41 of the slot antenna 40 is assumed to be 75 mm, the length sw of the short side 41b is assumed to be 0.5 mm, and the offset amount sf of the power feeding point 41c is assumed to be 25 mm. The frequency of the radio waves is assumed to be 2 GHz band (wavelength $\lambda$=150 mm), so that the length s1 of the long side 41a of the slit 41 is caused to be 75 mm ($\lambda/2$) to resonate the radio waves with the slot antenna 40. The gap d between the electric transmission communication unit 1A and the electric reception communication unit 1B is assumed to be 10 mm, 20 mm, 50 mm, 100 mm, or 200 mm.

Figure 10:
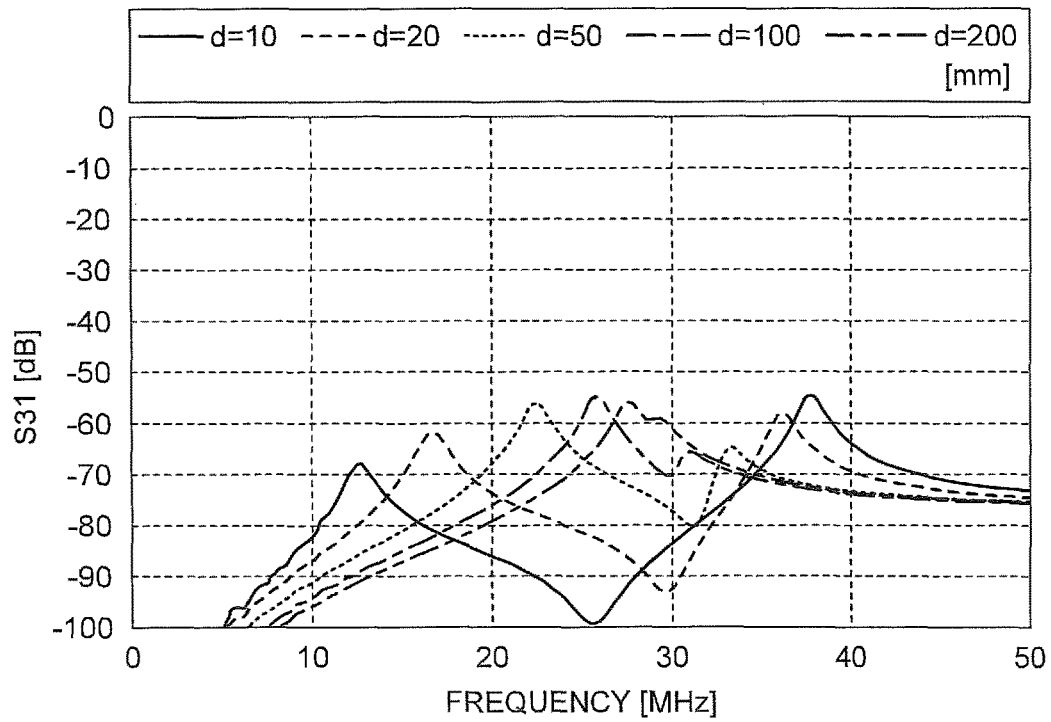
FIG. 10 is a diagram illustrating the isolation characteristic (S31) according to the first embodiment.
Figure 11:
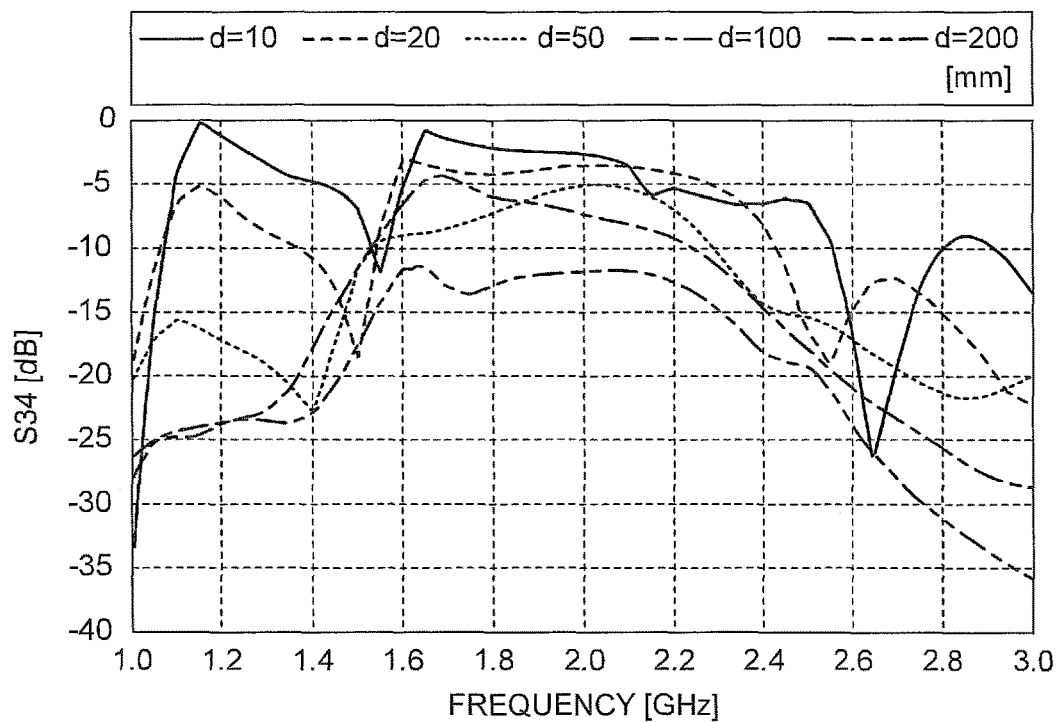
FIG. 11 is a diagram illustrating the communication transmission characteristic (S34) according to the first embodiment.
Figure 12:
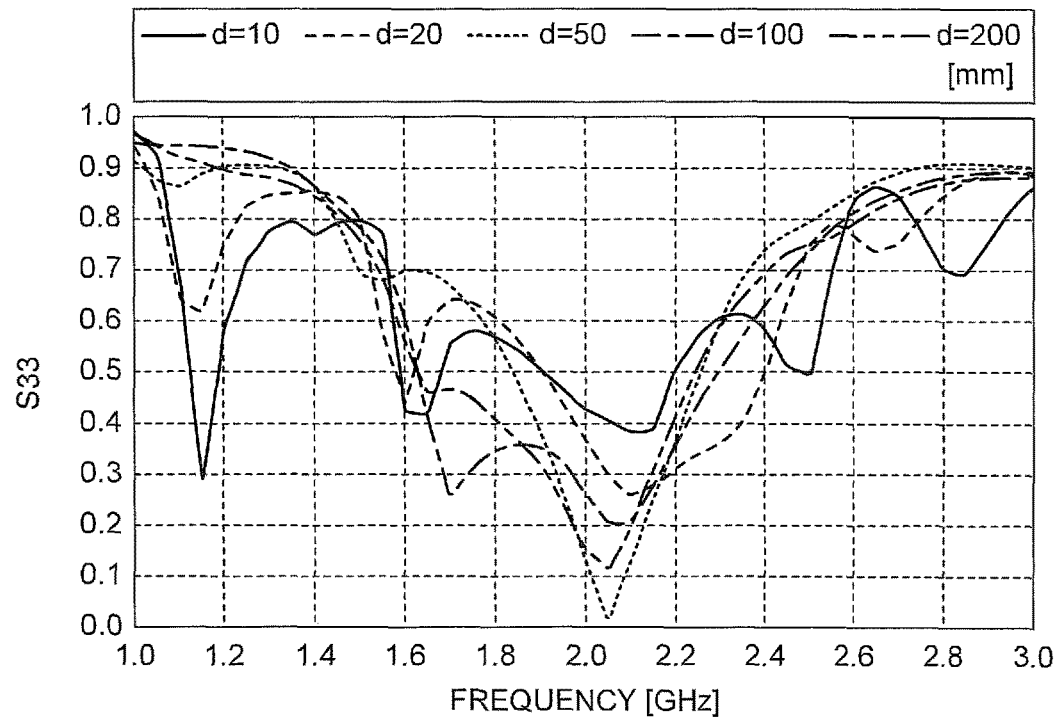
FIG. 12 is a diagram illustrating the communication reflection characteristic (S33) according to the first embodiment.
Figure 13:
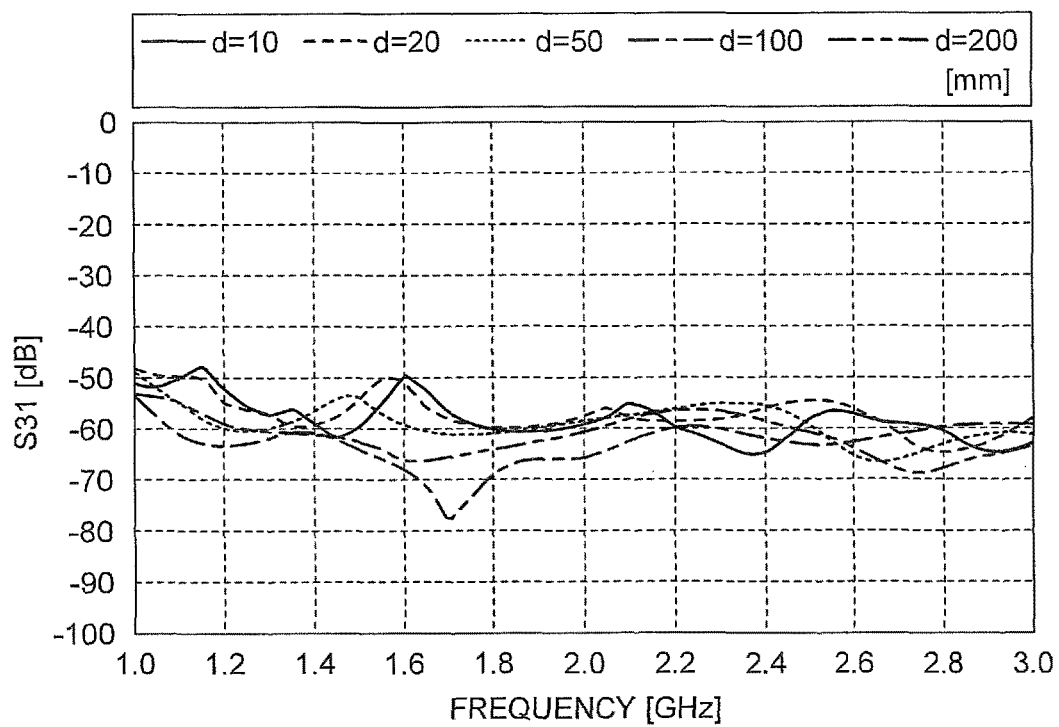
FIG. 13 is a diagram illustrating the isolation characteristic (S31) according to the first embodiment.
Figure 14:
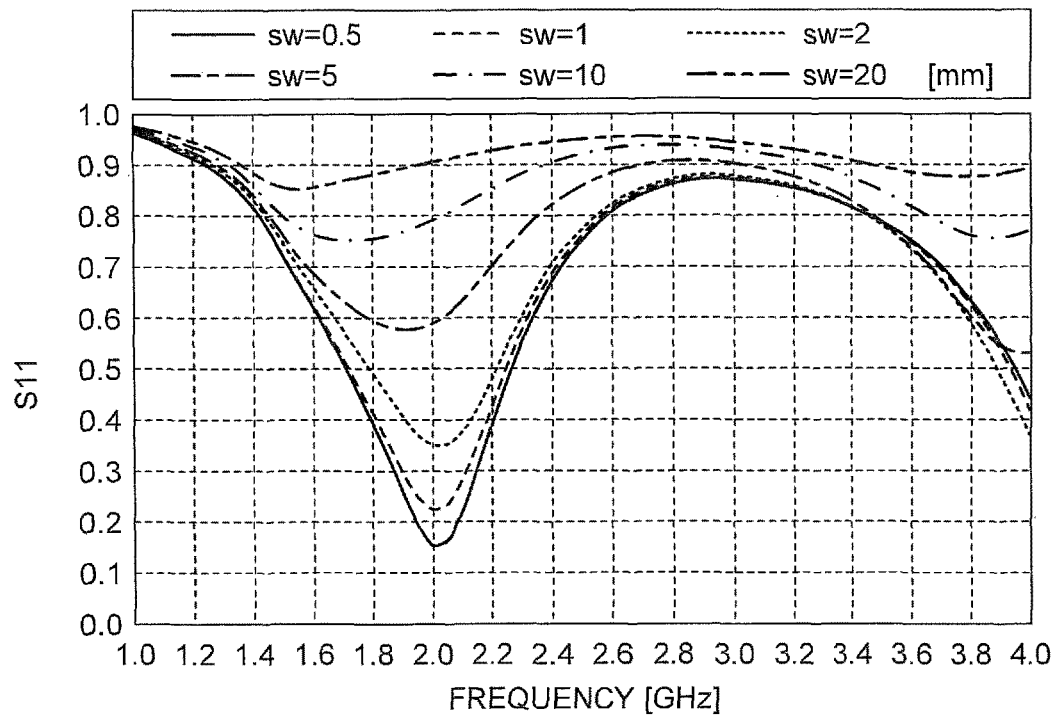
FIG. 14 is a diagram illustrating the reflection characteristic (S11) according to the first embodiment.

FIG. 10 is a diagram illustrating the isolation characteristic (S31) according to the first embodiment. FIG. 11 is a diagram illustrating the communication transmission characteristic (S34) according to the first embodiment. FIG. 12 is a diagram illustrating the communication reflection characteristic (S33) according to the first embodiment. FIG. 13 is a diagram illustrating the isolation characteristic (S31) according to the first embodiment. FIG. 14 is a diagram illustrating the reflection characteristic (S11) according to the first embodiment.

In the power transmitting communication device 100, although not illustrated, it can be found that the power transmission characteristic (S21) is equal to or larger than 90% at a frequency around 30 MHz. That is, it can be found that the power transmission characteristic is not affected even when the slot antenna 40 is arranged on each of the first electrode 20 of the electric transmission communication unit 1A and the first electrode 20 of the electric reception communication unit 1B.

In the power transmitting communication device 100, as illustrated in FIG. 10, the isolation characteristic (S31) indicating the influence on communication caused by supplying electric power is equal to or larger than 55 dB. That is, it can be found that the influence on communication caused by supplying electric power is suppressed. In FIG. 10, the vertical axis indicates the isolation characteristic (S31), and the horizontal axis indicates the frequency of the AC power supplied from the AC power supply 60.

In the power transmitting communication device 100, as illustrated in FIG. 11, the communication transmission characteristic (S34) is substantially equal to or smaller than 10 dB around 2 GHz band. That is, it can be found that the influence on communication caused by supplying electric power is suppressed. A flat communication transmission characteristic is obtained around 2 GHz band. In FIG. 11, the vertical axis indicates the communication transmission characteristic (S34), and the horizontal axis indicates the frequency of the electric signal output from the signal input/output circuit 50.

In the power transmitting communication device 100, as illustrated in FIG. 12, the communication reflection characteristic (S33) is equal to or smaller than 0.5 over a wide band. Table 2 below represents a frequency band in which the communication reflection characteristic (S33) is equal to or smaller than 0.5 and the fractional bandwidth for each gap d between the electric transmission communication unit 1A and the electric reception communication unit 1B. As a comparative example, represented are a frequency band and a fractional bandwidth in a case of using the single slot antenna 40. According to Table 2, the fractional bandwidth is larger than the fractional bandwidth (27%) in a case of using the single slot antenna 40 when the distance (gap) d is 100 mm and 200 mm. This is because the slot antenna 40 is formed on each of the first electrode 20 of the electric transmission communication unit 1A and the first electrode 20 of the electric reception communication unit 1B coupled to each other, which causes overcoupling between the slot antennas 40. In FIG. 12, the vertical axis indicates the communication reflection characteristic (S33), and the horizontal axis indicates the frequency of the electric signal output from the signal input/output circuit 50.

TABLE 2

| Distance d (mm) | Frequency band (MHz) | Specific band (%) |
| --- | --- | --- |
| 10 | 1910 to 2190 | 14 |
| 20 | 1910 to 2400 | 23 |

TABLE 2-continued

| Distance d (mm) | Frequency band (MHz) | Specific band (%) |
| --- | --- | --- |
| 50 | 1840 to 2260 | 20 |
| 100 | 1630 to 2300 | 34 |
| 200 | 1630 to 2240 | 32 |
| (Single slot antenna) | 1720 to 2260 | 27 |

In the power transmitting communication device 100, as illustrated in FIG. 13, the isolation characteristic (S31) indicating the influence on supplying of electric power caused by communication is equal to or larger than 45 dB. That is, it can be found that the influence on supplying of electric power caused by communication is suppressed. In FIG. 13, the vertical axis indicates the isolation characteristic (S31), and the horizontal axis indicates the frequency of the electric signal output from the signal input/output circuit 50.

The following describes an example of a range of the length sw of the short side 41b of the slit 41 of the slot antenna 40 satisfying the operation characteristic (2 GHz band) of the power transmitting communication device 100 described above. In this example, simulation is performed by using the single slot antenna 40, that is, using any one of the slot antenna 40 of the electric transmission communication unit 1A and the slot antenna 40 of the electric reception communication unit 1B. As illustrated in FIG. 14, it can be found that the reflection characteristic (S11) exceeds 0.5 when the length sw of the short side 41b of the slit 41 exceeds about 5 mm, and the slot antenna 40 becomes inoperative. Thus, the length sw of the short side 41b of the slit 41 needs to be equal to or smaller than 5 mm ($\lambda/30$). When the length sw (=5 mm) of the short side 41b of the slit 41 is normalized with the wavelength $\lambda$ at 2 GHz, the length sw of the short side 41b of the slit 41 is $\lambda/30$.

As described above, the power transmitting communication unit 1 according to the first embodiment includes the slot antenna 40 that transmits or receives the radio waves via the slit 41 formed on the first electrode 20. Due to this, a communication module is not required to be added to another place on the same plane as a power transmission module as in the related art, so that the power transmitting communication unit 1 can be downsized. The influence on communication caused by supplying electric power can be suppressed, and the influence on supplying of electric power caused by communication can be suppressed. That is, supplying of electric power and communication can be prevented from interfering with each other even when the first electrode 20 is integrated with the slot antenna 40.

The length sw of the short side 41b of the slit 41 of the slot antenna 40 is equal to or smaller than 1/30 of the wavelength $\lambda$ of the radio waves, so that the reflection characteristic (S11) can be caused to be smaller than 0.5. Due to this, a reflected wave can be suppressed, so that communication can be favorably performed with the slot antenna 40. When the length sw of the short side 41b of the slit 41 is equal to or smaller than 1/30 of the wavelength $\lambda$, the reflection characteristic (S11) can be improved as the length sw of the short side 41b is reduced.

The power transmitting communication unit 1 includes the signal input/output circuit 50, so that the power transmitting communication unit 1 can output the electric signal to the slot antenna 40, or receive the electric signal input from the slot antenna 40.

In the power transmitting communication device 100 according to the first embodiment, the first electrode 20 and the second electrode 30 of the electric transmission communication unit 1A are arranged being opposed to the first electrode 20 and the second electrode 30 of the electric reception communication unit 1B so that power transmission can be performed, and the slot antenna 40 of the electric transmission communication unit 1A is arranged being opposed to the slot antenna 40 of the electric reception communication unit 1B in a communicable manner. Due to this, in the power transmitting communication device 100, power transmission and communication can be performed between the electric transmission communication unit 1A and the electric reception communication unit 1B.

The slot antenna 40 is formed on each of the first electrode 20 of the electric transmission communication unit 1A and the first electrode 20 of the electric reception communication unit 1B coupled to each other, so that overcoupling is caused between the slot antennas 40, and the fractional bandwidth can be caused to be wider than the fractional bandwidth in a case of using the single slot antenna 40. Due to this, the power transmitting communication device 100 is effective for broadband communication required for high-speed wireless communication.

The electric transmission communication unit 1A includes the AC power supply 60 for supplying the AC power, so that the electric transmission communication unit 1A can supply the AC power to the electric reception communication unit 1B by electric field coupling.

Modification of First Embodiment

The following describes a modification of the first embodiment. In the above example, the base material 10 is formed to be a rectangular flat plate having the long side 10a and the short side 10b, but the embodiment is not limited thereto. For example, the base material 10 may have a square shape or a circular shape.

In the above example, the first electrode 20 is formed to be a rectangular flat plate having the long side 20a and the short side 20b, and the second electrode 30 is formed to be a rectangular flat plate having the long side 30a and the short side 30b. However, the embodiment is not limited thereto. For example, the first electrode 20 and the second electrode 30 may have a square shape or a circular shape.

In the above example, the slot antenna 40 is formed at substantially the center of the first electrode 20, but the embodiment is not limited thereto. For example, the slot antenna 40 may be formed at an end in the X-axis direction of the first electrode 20, or formed at an end in the Y-axis direction of the first electrode 20. In the above example, the slot antenna 40 is formed so that the long side 41a is along the Y-axis direction, but the embodiment is not limited thereto. For example, the slot antenna 40 may be formed so that the long side 41a is along the X-axis direction, or the long side 41a is not along the X-axis direction and the Y-axis direction. The slot antenna 40 may be formed on the second electrode 30. The slot antenna 40 of the electric transmission communication unit 1A and the slot antenna 40 of the electric reception communication unit 1B need to be arranged being opposed to each other in a communicable manner in view of a position or orientation of the slot antenna 40.

In the above example of the power transmitting communication unit 1, the series resonance circuit is configured with the capacitor C formed between the first electrode 20 and the second electrode 30 in the X-axis direction, and the inductors 21 and 31. However, the series resonance circuit is not necessarily configured.

Figure 15:
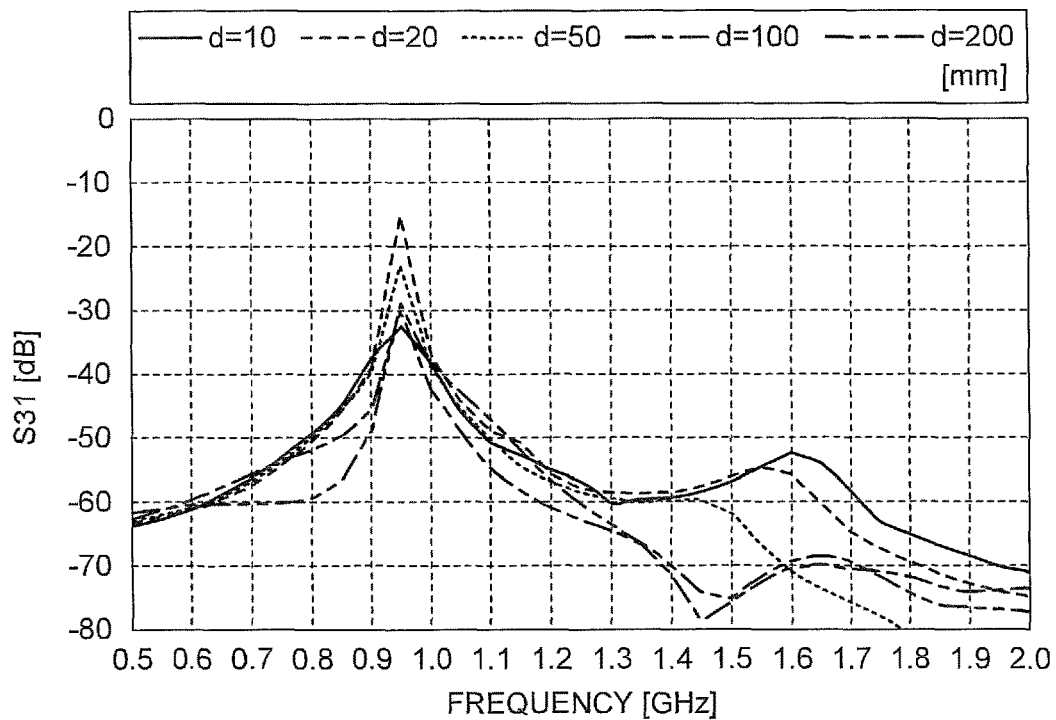
FIG. 15 is a diagram illustrating the isolation characteristic (S31) according to a modification.
Figure 16:
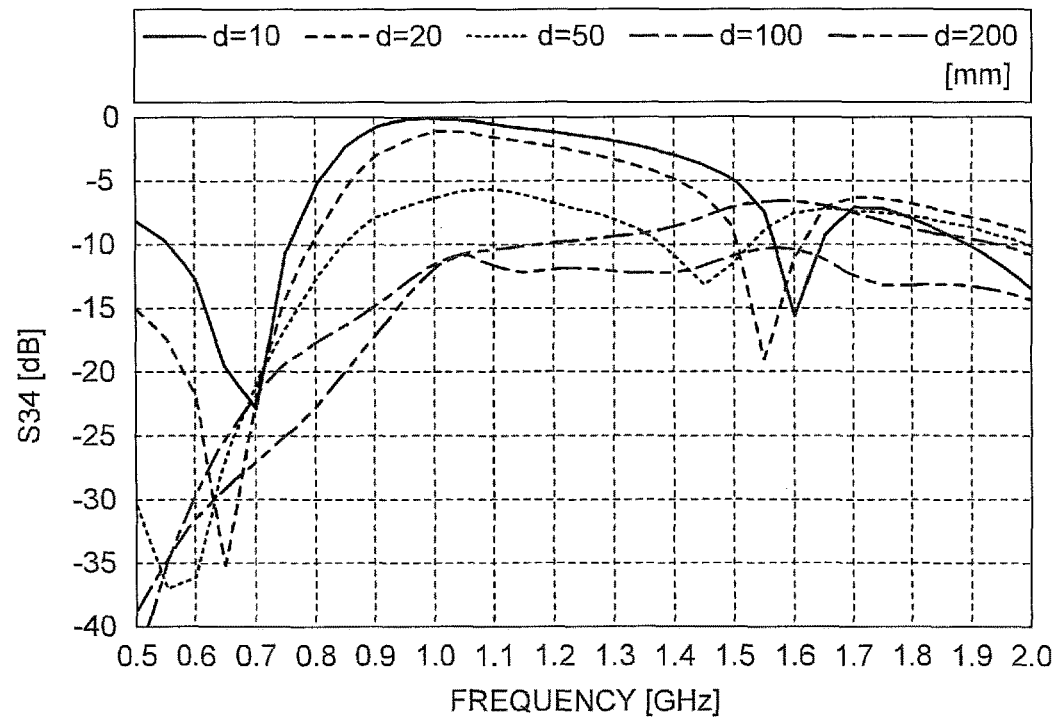
FIG. 16 is a diagram illustrating the communication transmission characteristic (S34) according to the modification.
Figure 17:
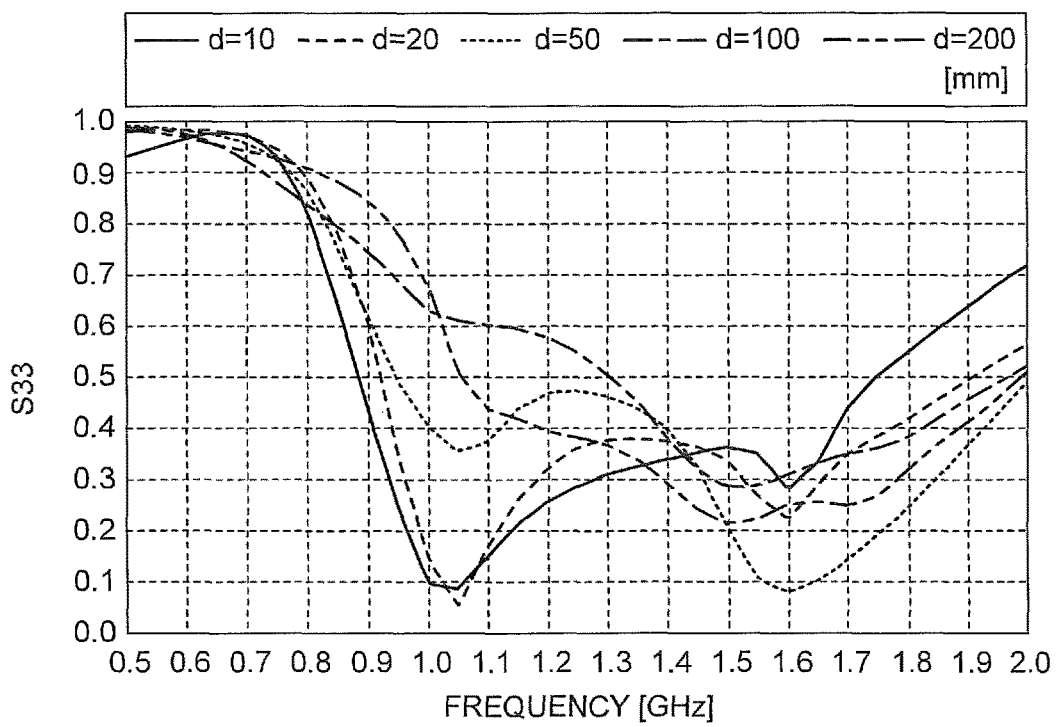
FIG. 17 is a diagram illustrating the communication reflection characteristic (S33) according to the modification.

In the power transmitting communication device 100, the offset amount sf of the power feeding point 41c is assumed to be 50 mm (25 mm), but the embodiment is not limited thereto. FIG. 15 is a diagram illustrating the isolation characteristic (S31) according to the modification. FIG. 16 is a diagram illustrating the communication transmission characteristic (S34) according to the modification. FIG. 17 is a diagram illustrating the communication reflection characteristic (S33) according to the modification.

In a power transmitting communication device 100A and a power transmitting communication unit 2 according to the modification, the offset amount sf of the power feeding point 41c of the slot antenna 40 is 0 mm. That is, in the power transmitting communication device 100A, the power feeding point 41c of the slot antenna 40 is arranged at the center Q of the long side 41a of the slit 41. The position of the power feeding point 41c may be shifted from the center Q of the long side 41a of the slit 41 in the width direction (X-axis direction) of the first electrode 20.

The following describes an operation characteristic of the power transmitting communication device 100A. In this example, the frequency of the radio waves transmitted from the slot antenna 40 is assumed to be 1 GHz band. In the power transmitting communication device 100A, although not illustrated, it can be found that the power transmission characteristic (S21) is equal to or larger than 90% at a frequency around 30 MHz. That is, it can be found that the power transmission characteristic is not affected even when the slot antenna 40 is arranged on each of the first electrode 20 of the electric transmission communication unit 1A and the first electrode 20 of the electric reception communication unit 1B in the power transmitting communication device 100A.

In the power transmitting communication device 100A, as illustrated in FIG. 15, the isolation characteristic (S31) indicating the influence on communication caused by supplying electric power is equal to or larger than 15 dB. That is, the influence on communication caused by supplying electric power is suppressed in the power transmitting communication device 100A. In FIG. 15, the vertical axis indicates the isolation characteristic (S31), and the horizontal axis indicates the frequency of the AC power supplied from the AC power supply 60.

In the power transmitting communication device 100A, as illustrated in FIG. 16, the communication transmission characteristic (S34) is substantially equal to or smaller than 10 dB around 1 GHz band. That is, the influence on communication caused by supplying electric power is suppressed in the power transmitting communication device 100A. In the power transmitting communication device 100A, a more flat communication transmission characteristic is obtained around 1 GHz band than that of the power transmitting communication device 100 according to the first embodiment, and the band is widened. In FIG. 16, the vertical axis indicates the communication transmission characteristic (S34), and the horizontal axis indicates the frequency of the electric signal output from the signal input/output circuit 50.

In the power transmitting communication device 100A, as illustrated in FIG. 17, the communication reflection characteristic (S33) is equal to or smaller than 0.5 over a wide band. Table 3 below represents a frequency band in which the communication reflection characteristic (S33) is equal to or smaller than 0.5 and the fractional bandwidth for each gap d between the electric transmission communication unit 1A and the electric reception communication unit 1B of the power transmitting communication device 100A. As a comparative example, represented are a frequency band and a fractional bandwidth in a case of using the single slot antenna 40. According to Table 3, the fractional bandwidth is larger than the fractional bandwidth (53%) in a case of using the single slot antenna 40 except a case in which the distance (gap) d is 100 mm in the power transmitting communication device 100A. In the power transmitting communication device 100A, the fractional bandwidth can be widened as compared with that in the power transmitting communication device 100 according to the first embodiment. In FIG. 17, the vertical axis indicates the communication reflection characteristic (S33), and the horizontal axis indicates the frequency of the electric signal output from the signal input/output circuit 50.

TABLE 3

| Distance d (mm) | Frequency band (MHz) | Specific band (%) |
| --- | --- | --- |
| 10 | 890 to 1750 | 65 |
| 20 | 920 to 1910 | 70 |
| 50 | 950 to 2000 | 71 |
| 100 | 1310 to 1970 | 40 |
| 200 | 1060 to 1990 | 61 |
| (Single slot antenna) | 1140 to 1960 | 53 |

Figure 18:
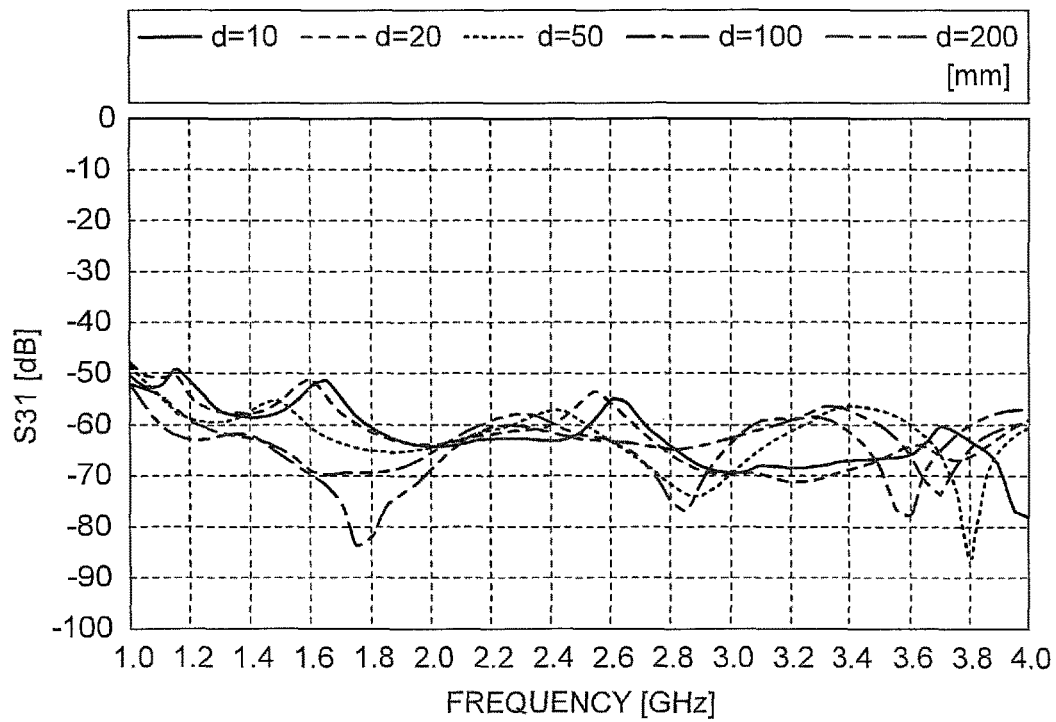
FIG. 18 is a diagram illustrating the isolation characteristic (S31) according to the modification.
Figure 19:
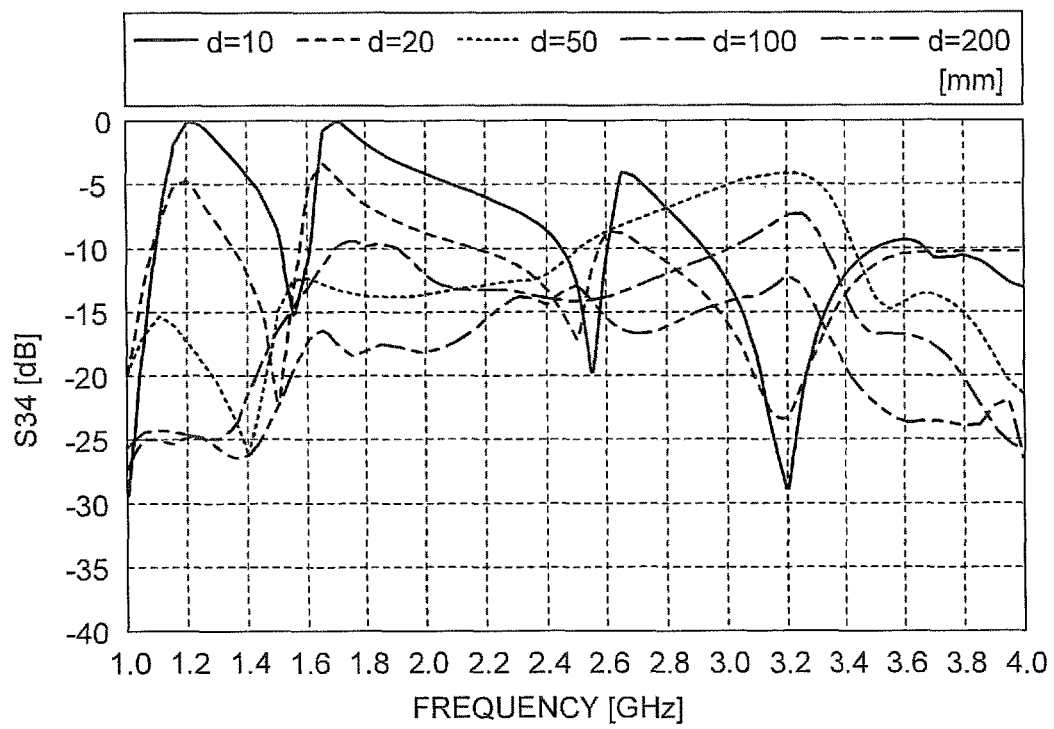
FIG. 19 is a diagram illustrating the communication transmission characteristic (S34) according to the modification.
Figure 20:
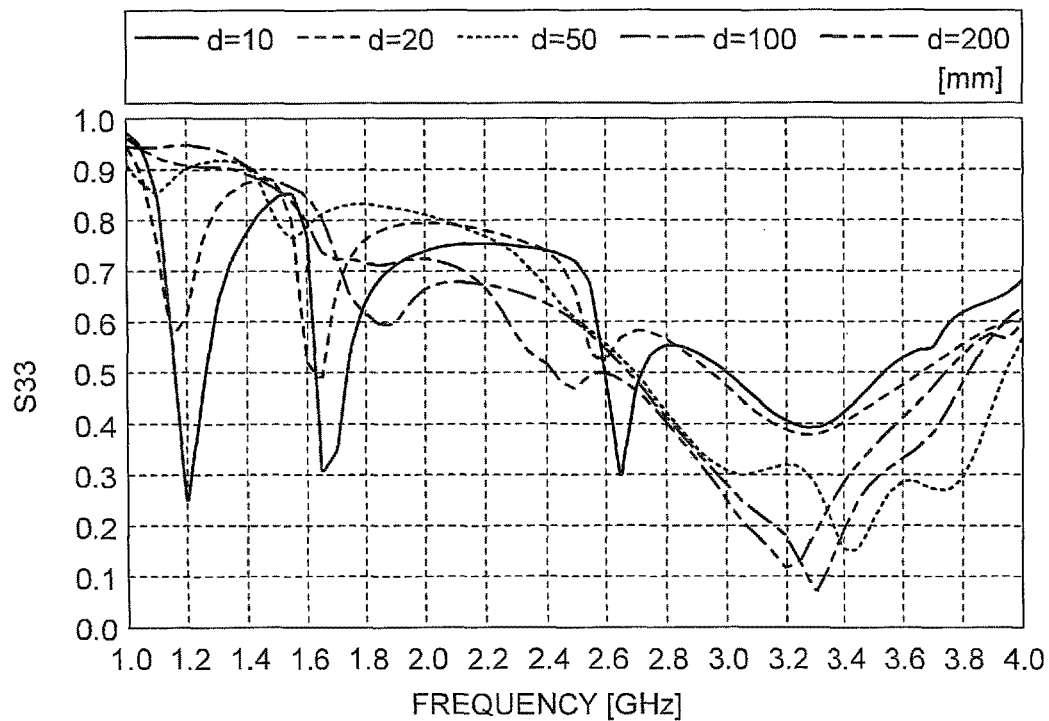
FIG. 20 is a diagram illustrating the communication reflection characteristic (S33) according to the modification.

The following describes an example in which the frequency of the radio waves transmitted from the slot antenna 40 is assumed to be 2 GHz band when the offset amount sf of the signal lines 42a and 42b of the slot antenna 40 is 0 mm. FIG. 18 is a diagram illustrating the isolation characteristic (S31) according to the modification. FIG. 19 is a diagram illustrating the communication transmission characteristic (S34) according to the modification. FIG. 20 is a diagram illustrating the communication reflection characteristic (S33) according to the modification.

In the power transmitting communication device 100A, although not illustrated, it can be found that the power transmission characteristic (S21) is equal to or larger than 90% at a frequency around 30 MHz. That is, it can be found that the power transmission characteristic is not affected even when the slot antenna 40 is arranged on each of the first electrode 20 of the electric transmission communication unit 1A and the first electrode 20 of the electric reception communication unit 1B in the power transmitting communication device 100A.

In the power transmitting communication device 100A, as illustrated in FIG. 18, the isolation characteristic (S31) indicating the influence on communication caused by supplying electric power is equal to or larger than 45 dB. That is, the influence on communication caused by supplying electric power is suppressed in the power transmitting communication device 100A. In FIG. 18, the vertical axis indicates the isolation characteristic (S31), and the horizontal axis indicates the frequency of the AC power supplied from the AC power supply 60.

In the power transmitting communication device 100A, as illustrated in FIG. 19, the communication transmission characteristic (S34) is substantially equal to or smaller than 15 dB around 2 GHz band. That is, the influence on communication caused by supplying electric power is suppressed in the power transmitting communication device 100A. In the power transmitting communication device 100A, a flat communication transmission characteristic is obtained around 2 GHz band. In FIG. 19, the vertical axis indicates the communication transmission characteristic (S34), and the horizontal axis indicates the frequency of the electric signal output from the signal input/output circuit 50.

In the power transmitting communication device 100A, as illustrated in FIG. 20, the communication reflection characteristic (S33) is equal to or smaller than 0.5 over a wide band. Table 4 below represents a frequency band in which the communication reflection characteristic (S33) is equal to or smaller than 0.5 and the fractional bandwidth for each gap d between the electric transmission communication unit 1A and the electric reception communication unit 1B of the power transmitting communication device 100A. As a comparative example, represented are a frequency band and a fractional bandwidth in a case of using the single slot antenna 40. According to Table 4, the fractional bandwidth is wider than the fractional bandwidth (38%) in a case of using the single slot antenna 40 when the distance (gap) d is 200 mm in the power transmitting communication device 100A. In the power transmitting communication device 100A, the fractional bandwidth can be widened as compared with that in the power transmitting communication device 100 according to the first embodiment except a case in which the gap d is 20 mm. In FIG. 20, the vertical axis indicates the communication reflection characteristic (S33), and the horizontal axis indicates the frequency of the electric signal output from the signal input/output circuit 50.

TABLE 4

| Distance d (mm) | Frequency band (MHz) | Specific band (%) |
| --- | --- | --- |
| 10 | 3010 to 3540 | 16 |
| 20 | 2940 to 3670 | 22 |
| 50 | 2700 to 3940 | 37 |
| 100 | 2670 to 3820 | 35 |
| 200 | 2410 to 3740 | 43 |
| (Single slot antenna) | 2550 to 3770 | 38 |

As described above, in the power transmitting communication device 100A and the power transmitting communication unit 2 according to the modification, the power feeding point 41c of the slot antenna 40 is arranged at the center Q of the long side 41a of the slit 41. Due to this, a communication frequency band can be substantially widened in the power transmitting communication device 100A and the power transmitting communication unit 2 as compared with the power transmitting communication device 100 and the power transmitting communication unit 1 according to the first embodiment in which the power feeding point 41c is offset, and a maximum communication frequency band can be obtained.

Second Embodiment

Figure 21:
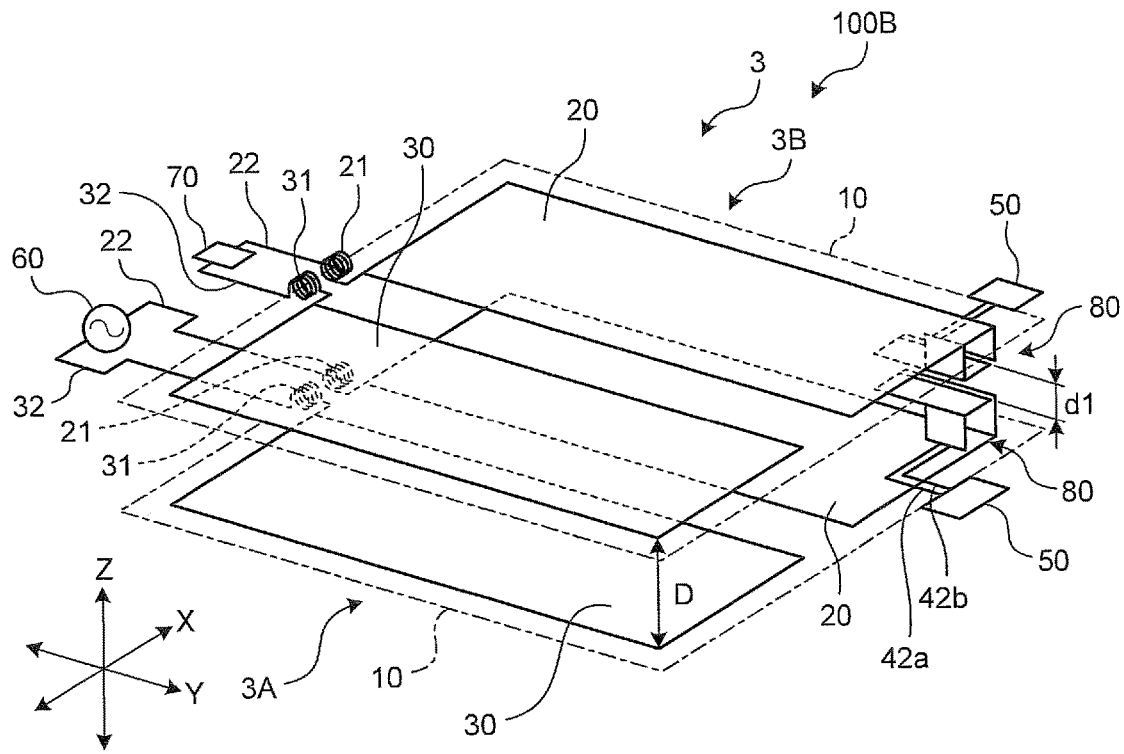
FIG. 21 is a perspective view illustrating a configuration example of a power transmitting communication device according to a second embodiment.
Figure 22:
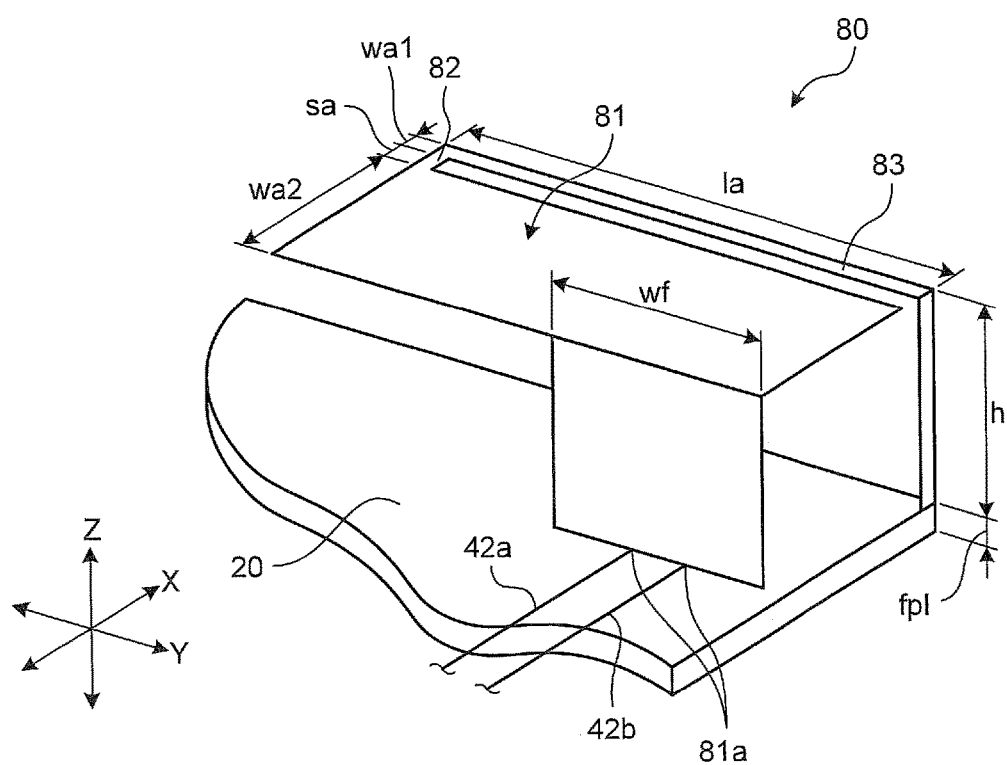
FIG. 22 is a perspective view illustrating a configuration example of a U-shaped folded monopole antenna according to the second embodiment.

Next, the following describes a power transmitting communication device 100B and a power transmitting communication unit 3 according to a second embodiment. The second embodiment is different from the first embodiment in that the power transmitting communication device 100B includes a U-shaped folded monopole antenna (UFMA) 80 in place of the slot antenna 40. The same component of the power transmitting communication device 100B as that of the power transmitting communication device 100 according to the first embodiment is denoted by the same reference numeral, and detailed description thereof will not be repeated. FIG. 21 is a perspective view illustrating a configuration example of the power transmitting communication device according to the second embodiment. FIG. 22 is a perspective view illustrating a configuration example of the U-shaped folded monopole antenna according to the second embodiment.

The power transmitting communication unit 3 transmits electric power by electric field coupling, and also performs wireless communication. As illustrated in FIG. 21, the power transmitting communication unit 3 includes the base material 10, the first electrode 20, the second electrode 30, the inductors 21 and 31, the electric wires 22 and 32, the UFMA 80, the signal lines 42a and 42b, and the signal input/output circuit 50.

The UFMA 80 is used for transmitting or receiving the radio waves, and formed on at least one of the first electrode 20 and the second electrode 30. In the second embodiment, the UFMA 80 is formed at a corner of the first electrode 20, and positioned inside the first electrode 20 when viewed from the Z-axis direction. As illustrated in FIG. 22, the UFMA 80 includes: a first element part 81 that is arranged being opposed to and separated from the first electrode 20 serving as a ground plate by a height h, part of a side end thereof being electrically connected to the first electrode 20 to be grounded; a folded part 82 that is arranged being opposed to and separated from the first electrode 20 by the height h, and is continuous to the first element part 81; a second element part 83 that is continuous to the folded part 82 and arranged being opposed to and separated from the first electrode 20 by a gap sa, a terminal thereof being electrically connected to the first electrode 20; and a power feeding point 81a for outputting an electric signal having a high frequency from the signal input/output circuit 50 to a connection part between the first element part 81 and the first electrode 20. The first element part 81, the folded part 82, and the second element part 83 are a metal plate formed in a U-shape when viewed from the Z-axis direction.

In the UFMA 80 that performs communication at a frequency of 1 GHz, a length 1a of the first and second element parts 81 and 83 in the Y-axis direction is 94 mm, a width wa2 of the first element part 81 is 40 mm, a width wa1 of the second element part 83 is 4 mm, the gap sa between the first element part 81 and the second element part 83 is 4 mm, a length wf of a portion where the first element part 81 is connected to the first electrode 20 is 40 mm, the height h of the UFMA 80 is 36 mm, and a thickness fpl of the first electrode 20 is 4 mm. The size of the UFMA 80 that performs communication at a frequency of 2 GHz is half the size of the UFMA 80 that performs communication at the frequency of 1 GHz. That is, in the UFMA 80 that performs communication at the frequency of 2 GHz, the length 1a of the first and second element parts 81 and 83 in the Y-axis direction is 47 mm, the width wa2 of the first element part 81 is 20 mm, the width wa1 of the second element part 83 is 2 mm, the gap sa between the first element part 81 and the second element part 83 is 2 mm, the length wf of a portion where the first element part 81 is connected to the first electrode 20 is 20 mm, and the height h of the UFMA 80 is 18 mm. The thickness fpl of the first electrode 20 is 4 mm.

The power transmitting communication unit 3 functions as an electric transmission communication unit 3A that transmits electric power, or an electric reception communication unit 3B that receives electric power. The electric transmission communication unit 3A and the electric reception communication unit 3B constitute the power transmitting communication device 100B.

In the power transmitting communication device 100B, the first electrode 20 and the second electrode 30 of the electric transmission communication unit 3A and the first electrode 20 and the second electrode 30 of the electric reception communication unit 3B are opposed to each other so that power transmission can be performed, and are arranged with a predetermined gap D in the Z-axis direction.

In the power transmitting communication device 100B, the UFMA 80 of the electric transmission communication unit 3A is opposed to the UFMA 80 of the electric reception communication unit 3B in a communicable manner. For example, the first and second element parts 81 and 83 of the UFMA 80 of the electric transmission communication unit 3A and the first and second element parts 81 and 83 of the UFMA 80 of the electric reception communication unit 3B are arranged in parallel with the XY-plane, and arranged at the same position based on the XY-plane coordinates. The first and second element parts 81 and 83 of the electric transmission communication unit 3A and the first and second element parts 81 and 83 of the electric reception communication unit 3B are arranged with a predetermined gap d1 in the Z-axis direction. The gap d1 is a length obtained by subtracting each height h of UFMAs 80 in the Z-axis direction from the gap D between first electrodes 20 (d1=D−2 h).

The power transmitting communication device 100B includes the AC power supply 60 and the load 70. The AC power supply 60 is connected to the first electrode 20 of the electric transmission communication unit 3A via the electric wire 22 and the inductor 21, and connected to the second electrode 30 via the electric wire 32 and the inductor 31. The AC power supply 60 supplies AC power to the first and second electrodes 20 and 30 of the electric transmission communication unit 3A.

The load 70 is connected to the first electrode 20 of the electric reception communication unit 3B via the electric wire 22 and the inductor 21, and connected to the second electrode 30 via the electric wire 32 and the inductor 31. The load 70 receives the AC power from the first and second electrodes 20 and 30 of the electric reception communication unit 3B.

Next, the following describes an operation example of the power transmitting communication device 100B. When receiving the AC power supplied from the AC power supply 60, the electric transmission communication unit 3A supplies the AC power to the electric reception communication unit 3B in a non-contact manner by electric field coupling. The electric reception communication unit 3B receives the AC power supplied from the electric transmission communication unit 3A, and stores the AC power in the load 70 serving as the storage battery.

When the electric signal is output from the signal input/output circuit 50, the electric transmission communication unit 3A transmits radio waves to the UFMA 80 of the electric reception communication unit 3B from the UFMA 80. The electric reception communication unit 3B receives the radio waves transmitted from the electric transmission communication unit 3A via the UFMA 80, and outputs the electric signal to the signal input/output circuit 50. When the electric signal is output from the signal input/output circuit 50, the electric reception communication unit 3B transmits the radio waves to the UFMA 80 of the electric transmission communication unit 3A from the UFMA 80. The electric transmission communication unit 3A receives the radio waves transmitted from the electric reception communication unit 3B via the UFMA 80, and outputs the electric signal to the signal input/output circuit 50.

Figure 23:
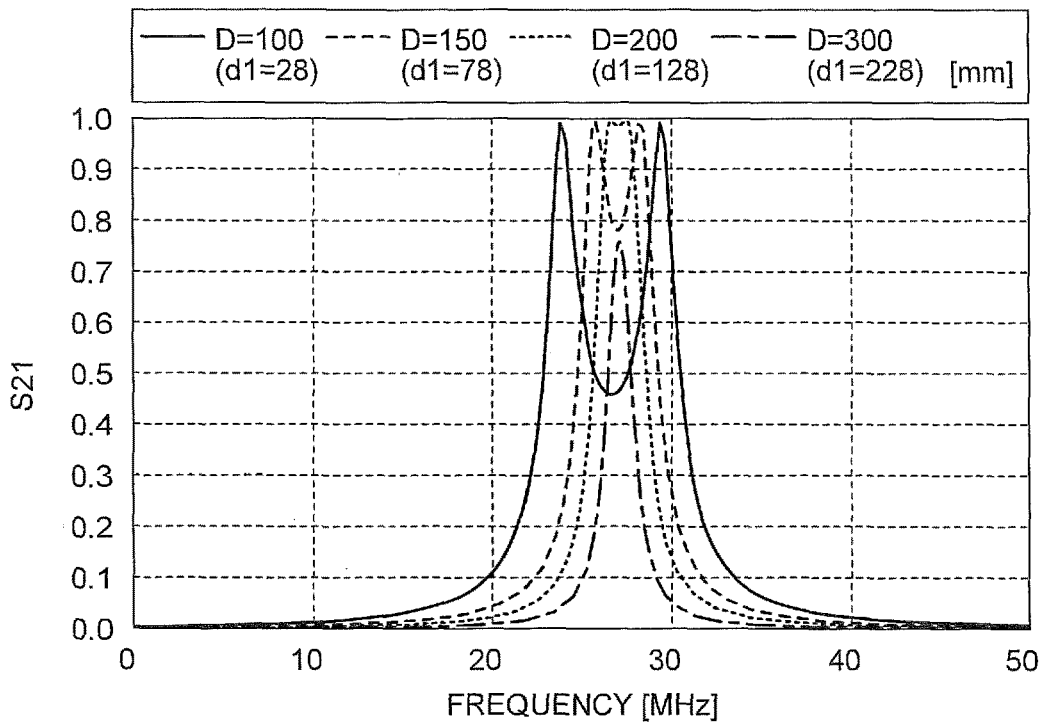
FIG. 23 is a diagram illustrating the power transmission characteristic (S21) in 30 MHz band according to the second embodiment.
Figure 24:
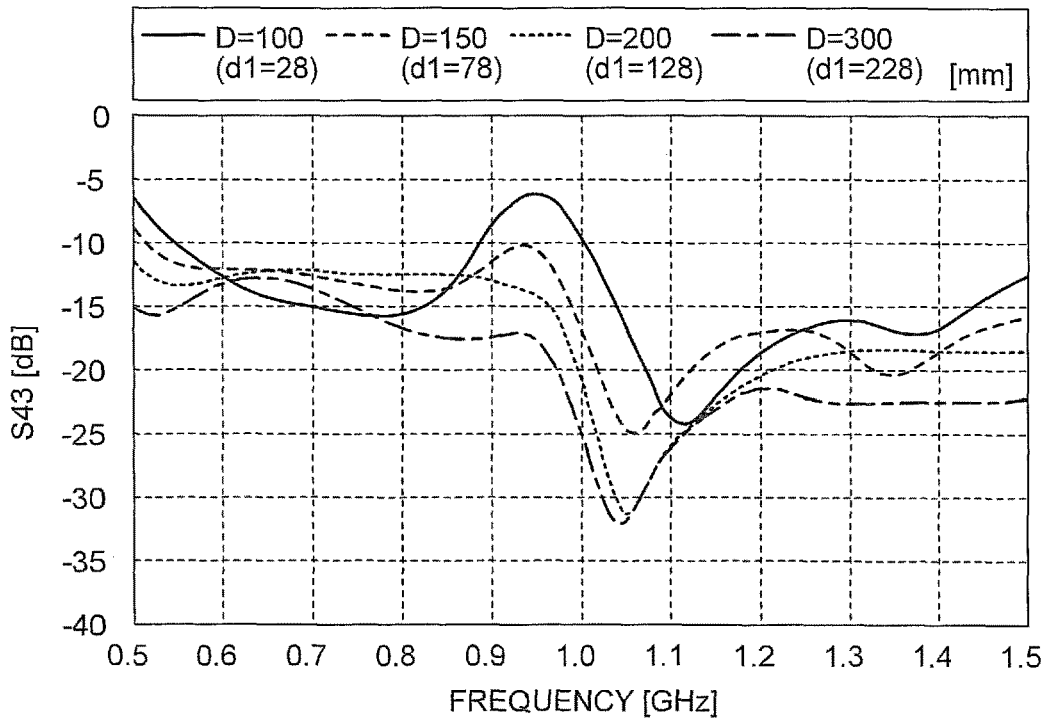
FIG. 24 is a diagram illustrating a communication pass characteristic (S43) in 1 GHz band according to the second embodiment.
Figure 25:
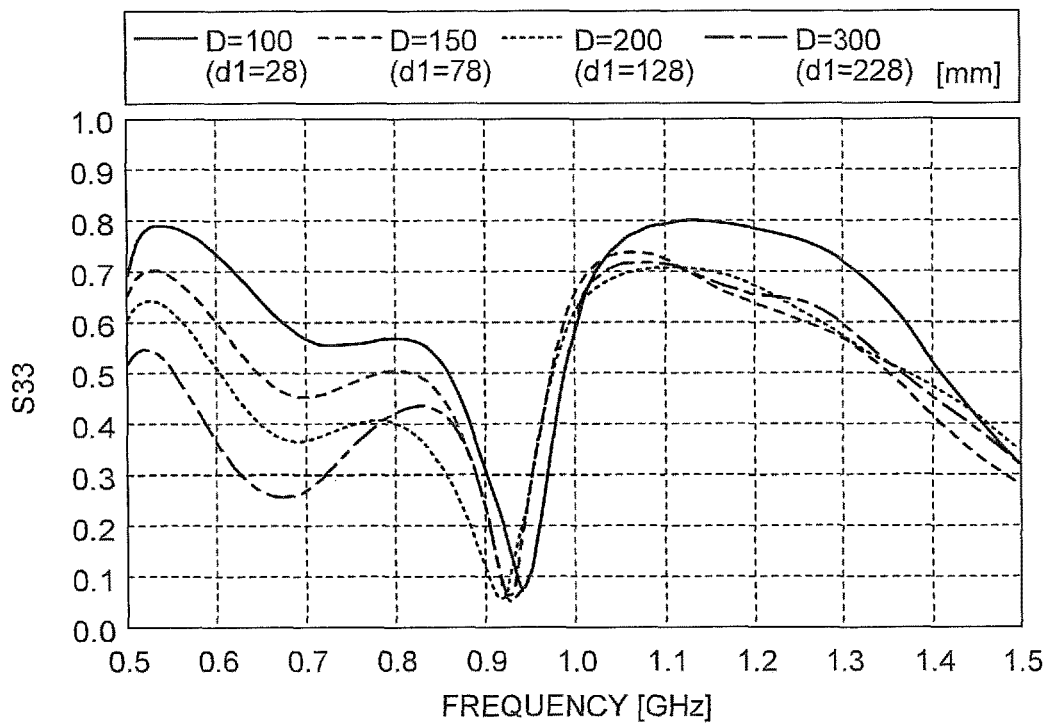
FIG. 25 is a diagram illustrating the communication reflection characteristic (S33) in 1 GHz band according to the second embodiment.
Figure 26:
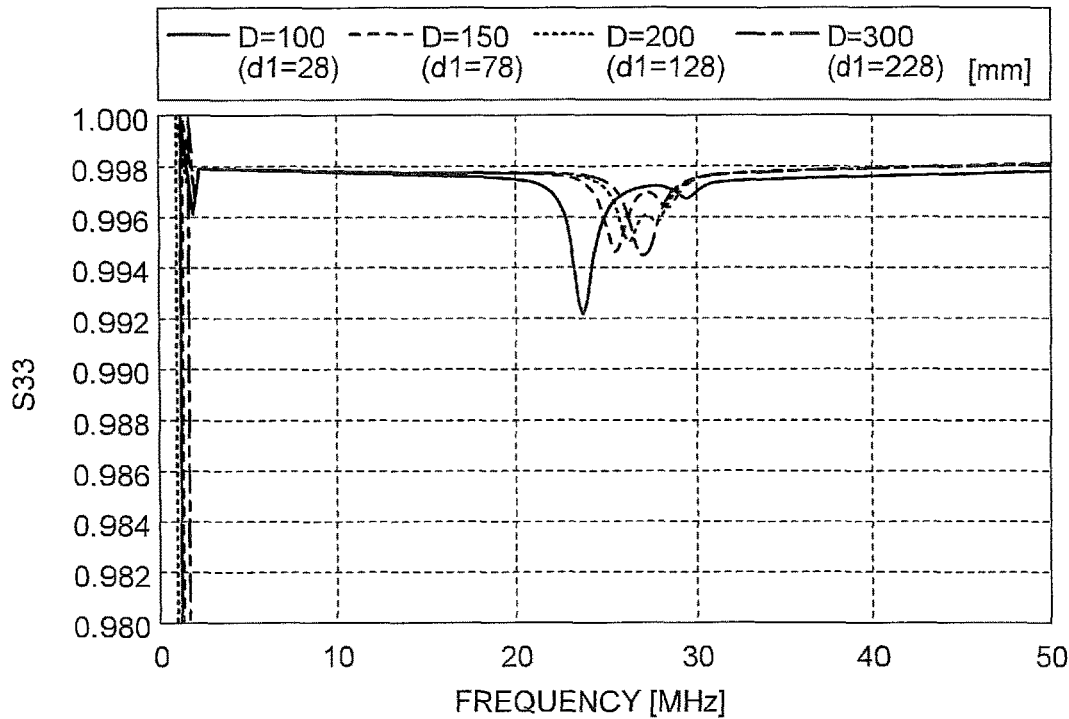
FIG. 26 is a diagram illustrating the communication reflection characteristic (S33) in 30 MHz band according to the second embodiment.
Figure 27:
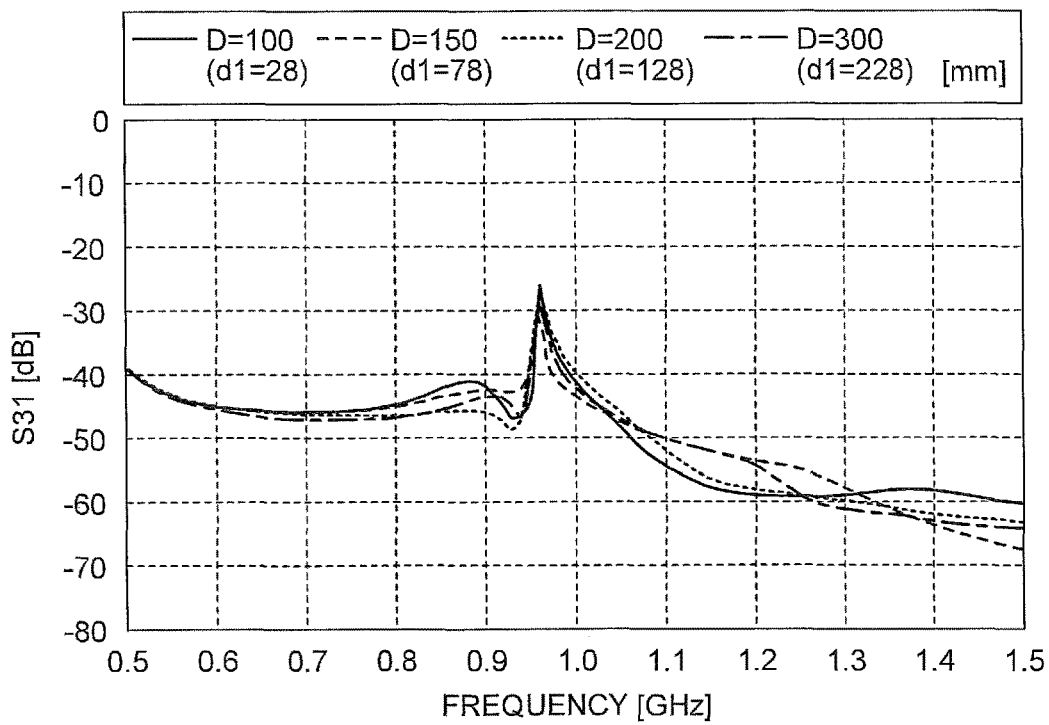
FIG. 27 is a diagram illustrating the isolation characteristic (S31) in 1 GHz band according to the second embodiment.
Figure 28:
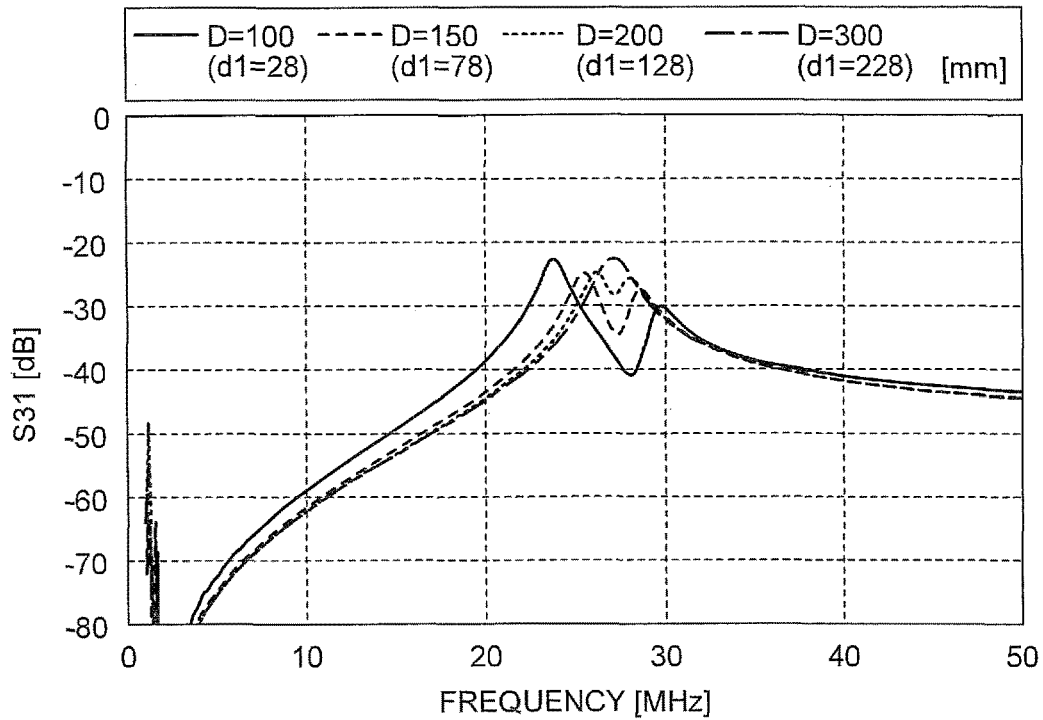
FIG. 28 is a diagram illustrating the isolation characteristic (S31) in 30 MHz band according to the second embodiment.
Figure 29:
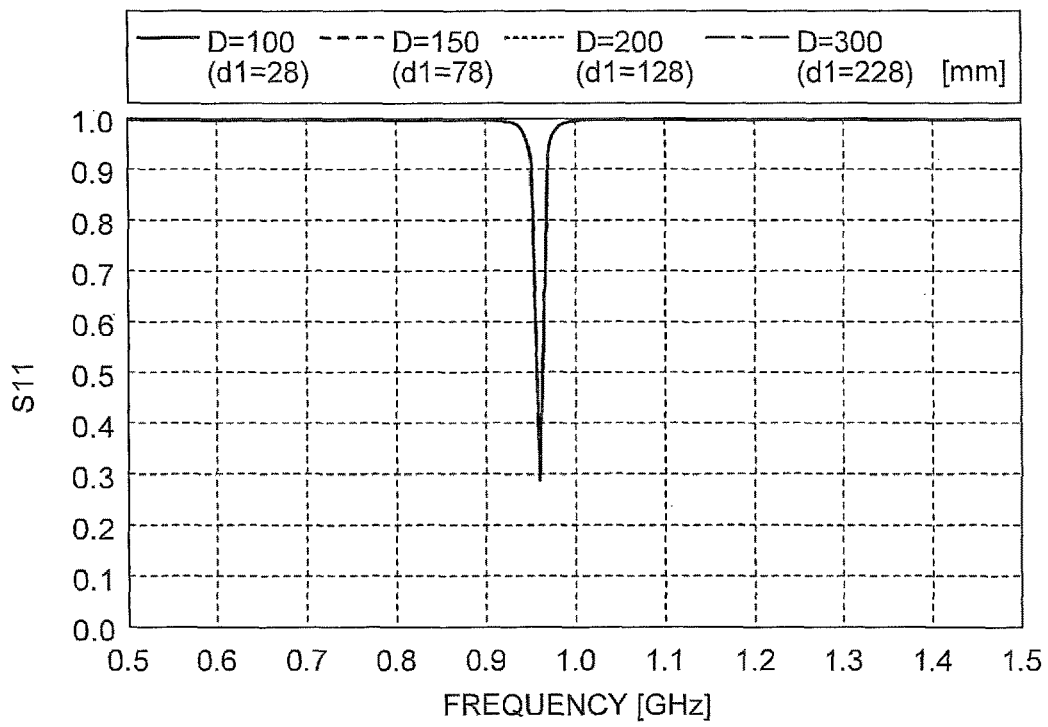
FIG. 29 is a diagram illustrating the power reflection characteristic (S11) in 1 GHz band according to the second embodiment.
Figure 30:
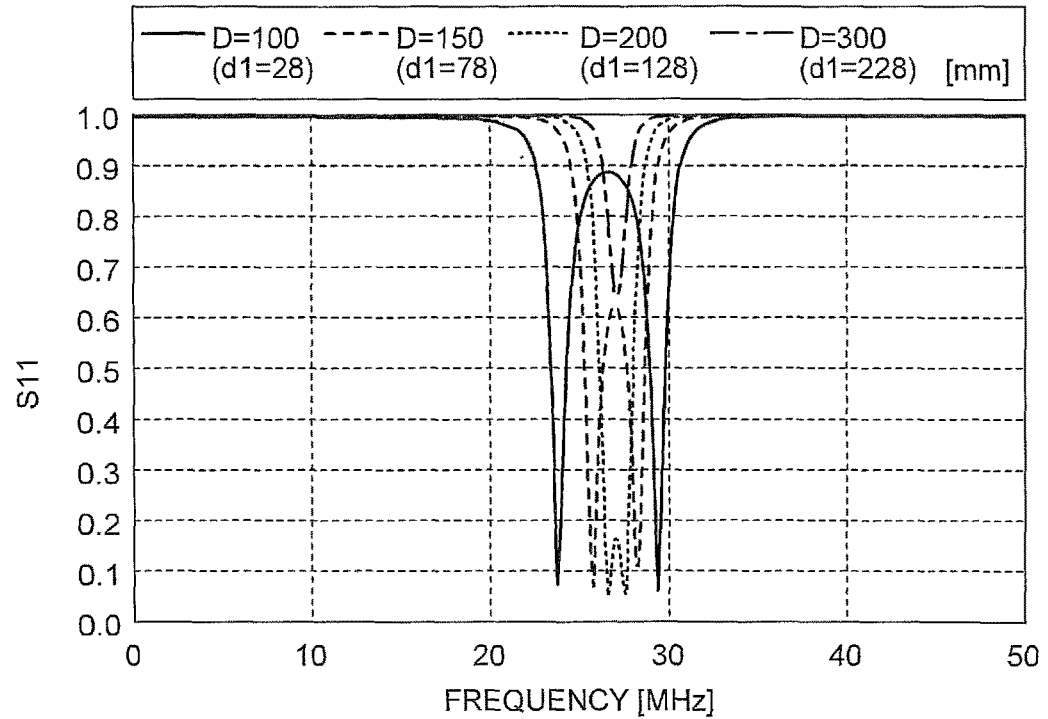
FIG. 30 is a diagram illustrating the power reflection characteristic (S11) in 30 MHz band according to the second embodiment.

Next, the following describes an operation characteristic of the power transmitting communication device 100B. FIG. 23 is a diagram illustrating the power transmission characteristic (S21) in 30 MHz band according to the second embodiment. FIG. 24 is a diagram illustrating a communication pass characteristic (S43) in 1 GHz band according to the second embodiment. FIG. 25 is a diagram illustrating the communication reflection characteristic (S33) in 1 GHz band according to the second embodiment. FIG. 26 is a diagram illustrating the communication reflection characteristic (S33) in 30 MHz band according to the second embodiment. FIG. 27 is a diagram illustrating the isolation characteristic (S31) in 1 GHz band according to the second embodiment. FIG. 28 is a diagram illustrating the isolation characteristic (S31) in 30 MHz band according to the second embodiment. FIG. 29 is a diagram illustrating the power reflection characteristic (S11) in 1 GHz band according to the second embodiment. FIG. 30 is a diagram illustrating the power reflection characteristic (S11) in 30 MHz band according to the second embodiment.

In this example, the frequency of the radio waves transmitted from the UFMA 80 is assumed to be 1 GHz band. The gap D between the first electrodes 20 of the electric transmission communication unit 3A and the electric reception communication unit 3B is assumed to be D=100 mm (d1=28 mm), D=150 mm (d1=78 mm), D=200 mm (d1=128 mm), or D=300 mm (d1=228 mm).

In the power transmitting communication device 100B, as illustrated in FIG. 23, it can be found that the power transmission characteristic (S21) is equal to or larger than 90% at a frequency around 30 MHz. That is, it can be found that the power transmission characteristic is not affected even when the UFMA 80 is arranged on each of the first electrode 20 of the electric transmission communication unit 3A and the first electrode 20 of the electric reception communication unit 3B in the power transmitting communication device 100B. In FIG. 23, the vertical axis indicates the power transmission characteristic (S21), and the horizontal axis indicates the frequency of the AC power supplied from the AC power supply 60.

In the power transmitting communication device 100B, as illustrated in FIG. 24, the communication pass characteristic (S43) is substantially equal to or smaller than 15 dB around 1 GHz band. That is, the influence on communication caused by supplying electric power is suppressed in the power transmitting communication device 100B. In the power transmitting communication device 100B, a flat broadband characteristic is obtained around 0.5 GHz to 0.9 GHz band. In FIG. 24, the vertical axis indicates the communication pass characteristic (S43), and the horizontal axis indicates the frequency of the electric signal output from the signal input/output circuit 50.

In the power transmitting communication device 100B, as illustrated in FIGS. 25 and 26, the communication reflection characteristic (S33) is equal to or smaller than 0.5 over a wide band in 1 GHz band. Table 5 below represents a frequency band in which the communication reflection characteristic (S33) is equal to or smaller than 0.5 and a fractional bandwidth for each distance (gap) D between the first electrodes 20 of the electric transmission communication unit 3A and the electric reception communication unit 3B. As a comparative example, represented are a frequency band and a fractional bandwidth in a case of using the single UFMA 80. According to Table 5, it can be found that although the fractional bandwidth is slightly reduced in the power transmitting communication device 100B as compared with the fractional bandwidth in a case of using the single UFMA 80, the fractional bandwidth becomes wider than that in a case of using the slot antenna 40 according to the first embodiment. In particular, it can be found that the fractional bandwidth becomes wide and effective when the gap D is large in the power transmitting communication device 100B. In FIGS. 25 and 26, the vertical axis indicates the communication reflection characteristic (S33), and the horizontal axis indicates the frequency of the electric signal output from the signal input/output circuit 50.

TABLE 5

| Distance D (mm) | Frequency band (MHz) | Specific band (%) |
| --- | --- | --- |
| 100 | 128 | 13.9 |
| 150 | 152 | 16.4 |
| 200 | 369 | 46.7 |
| 300 | 421 | 55.4 |
| (Single UFMA) | 516 | 71.8 |

In the power transmitting communication device 100B, as illustrated in FIGS. 27 and 28, the isolation characteristic (S31) indicating the influence on communication caused by supplying electric power is equal to or larger than 20 dB. That is, the influence on communication caused by supplying electric power is suppressed in the power transmitting communication device 100B. In FIGS. 27 and 28, the vertical axis indicates the isolation characteristic (S31), and the horizontal axis indicates the frequency of the AC power supplied from the AC power supply 60.

As illustrated in FIGS. 29 and 30, it can be found that the reflection characteristic (S11) becomes smaller than 0.5 in 1 GHz band and 30 MHz band, and the reflected wave can be suppressed in the power transmitting communication device 100B.

Figure 31:
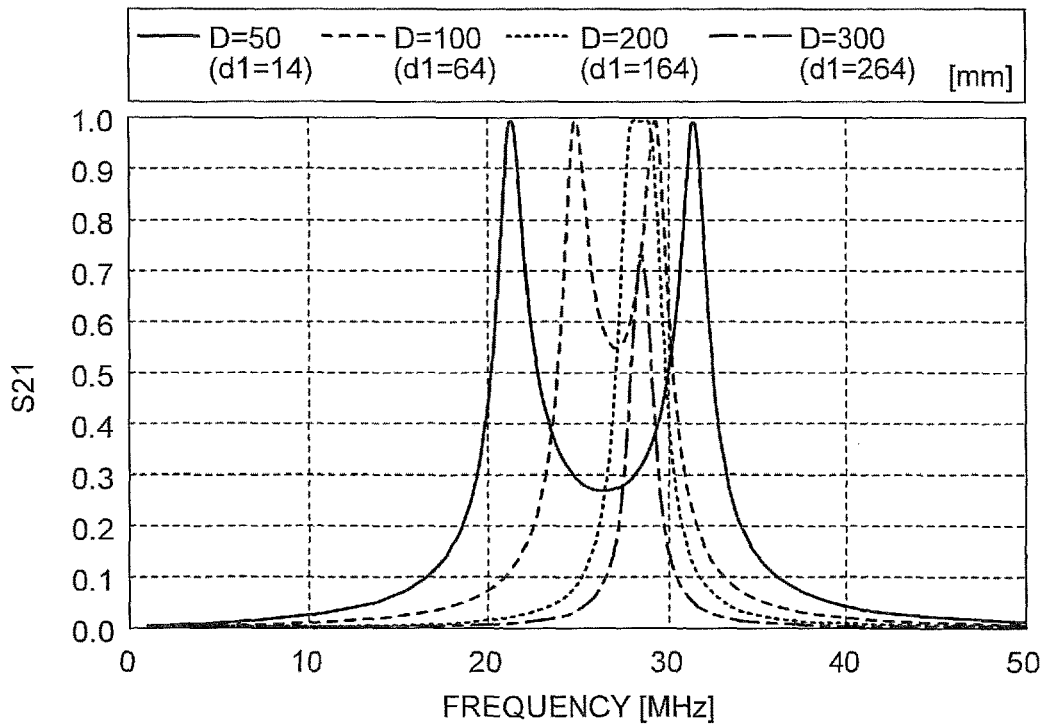
FIG. 31 is a diagram illustrating the power transmission characteristic (S21) in 30 MHz band according to the second embodiment.
Figure 32:
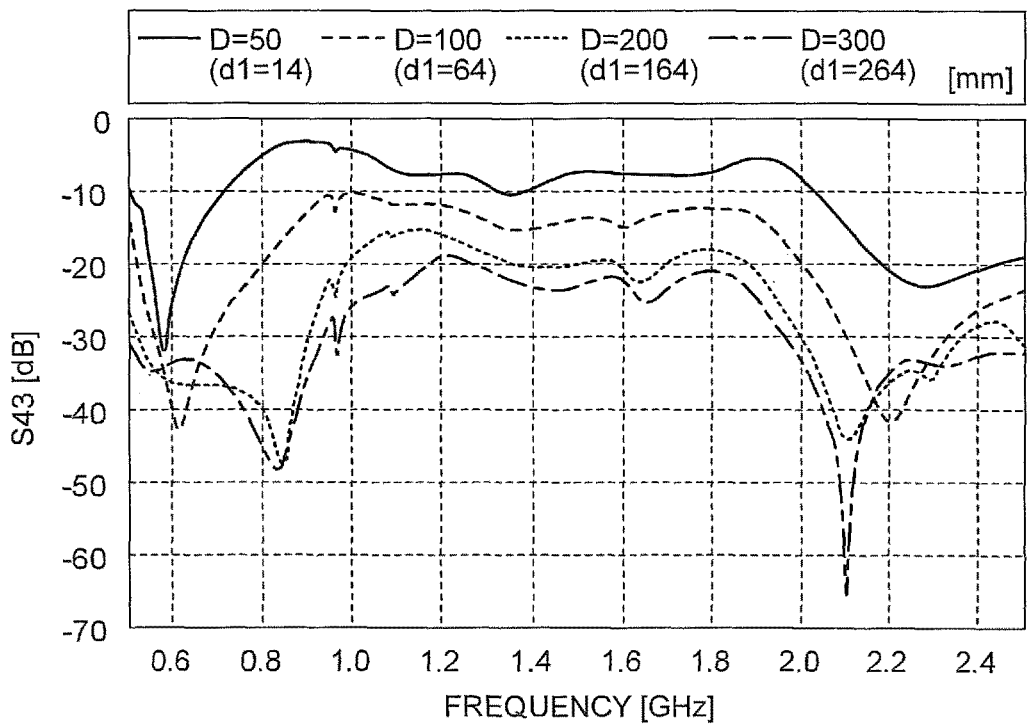
FIG. 32 is a diagram illustrating the communication pass characteristic (S43) in 2 GHz band according to the second embodiment.
Figure 33:
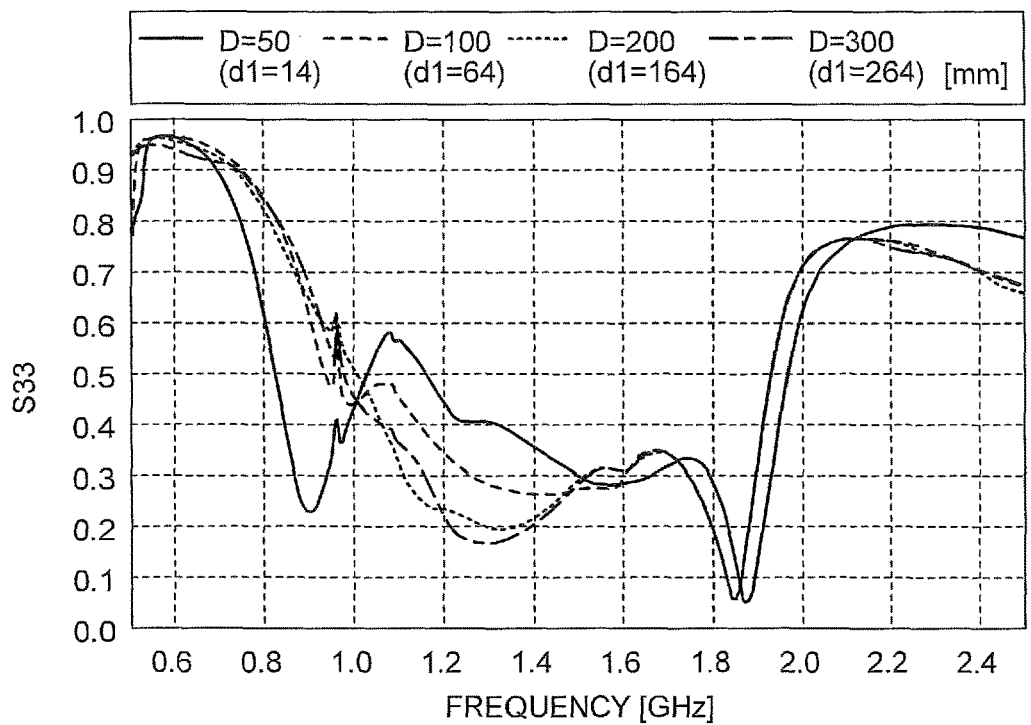
FIG. 33 is a diagram illustrating the communication reflection characteristic (S33) in 2 GHz band according to the second embodiment.
Figure 34:
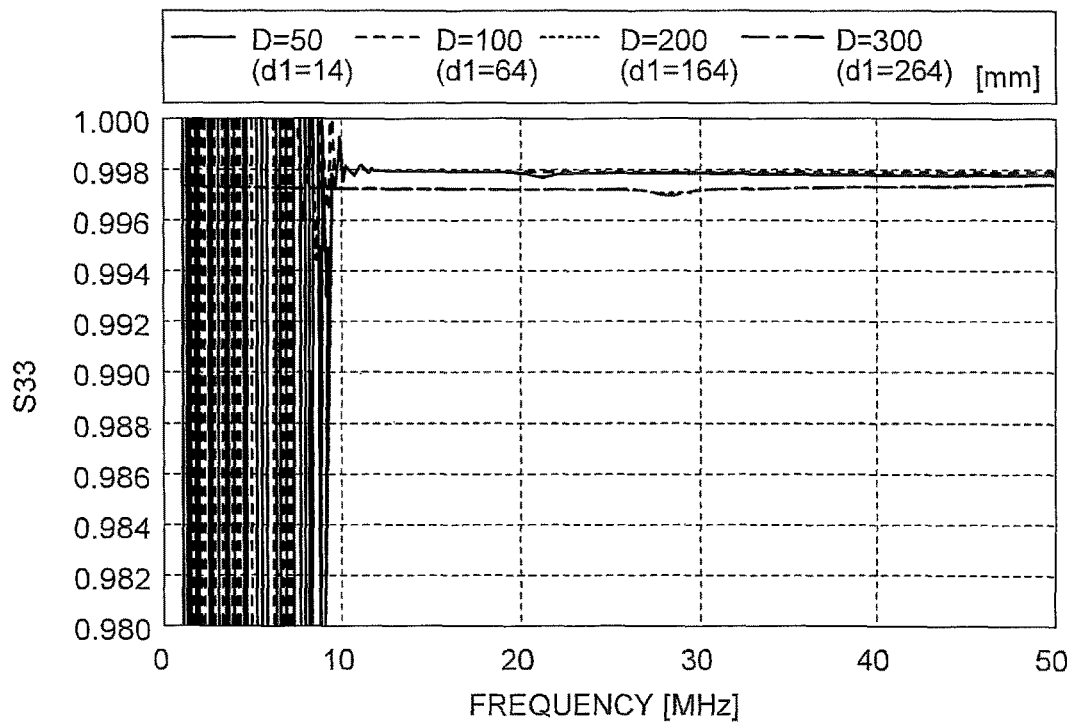
FIG. 34 is a diagram illustrating the communication reflection characteristic (S33) in 30 MHz band according to the second embodiment.
Figure 35:
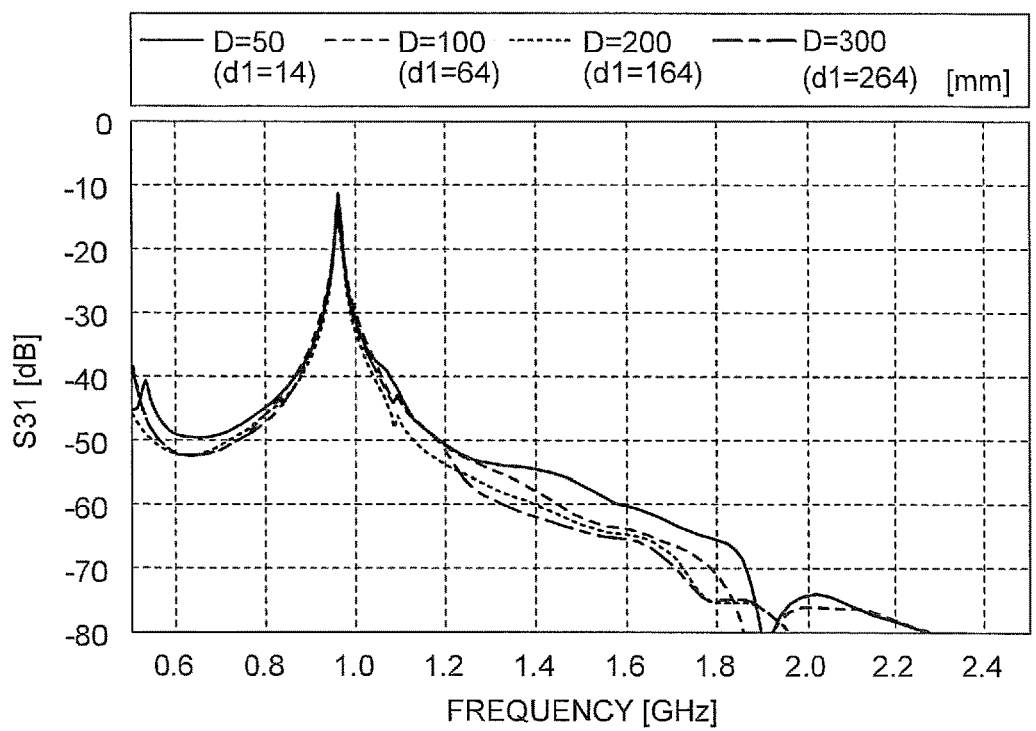
FIG. 35 is a diagram illustrating the isolation characteristic (S31) in 2 GHz band according to the second embodiment.
Figure 36:
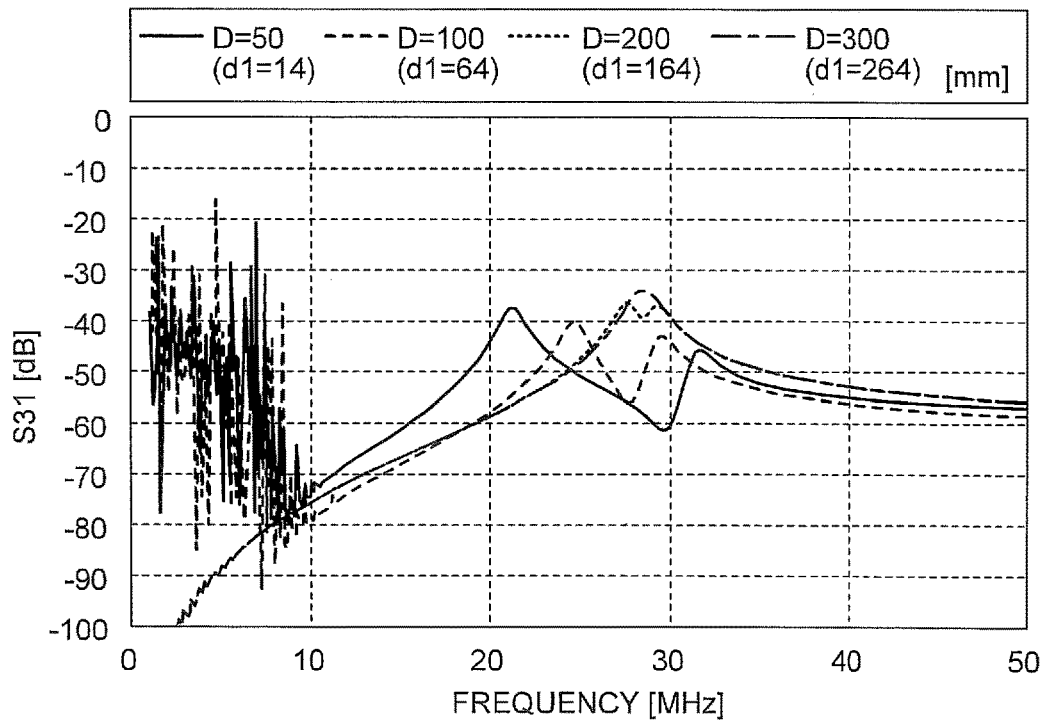
FIG. 36 is a diagram illustrating the isolation characteristic (S31) in 30 MHz band according to the second embodiment.
Figure 37:
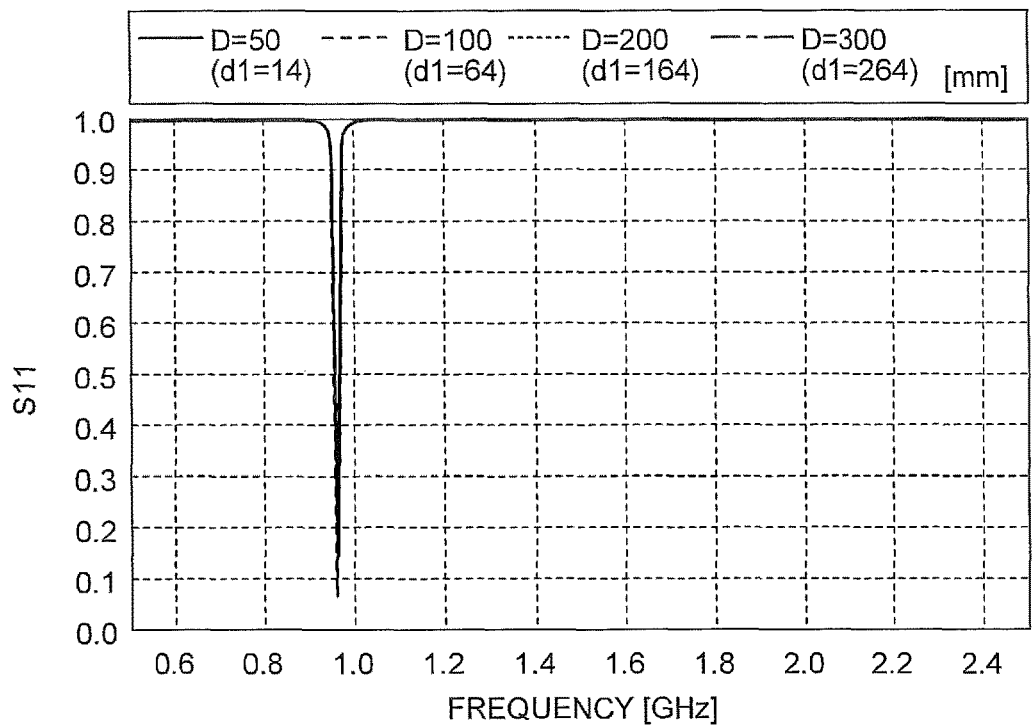
FIG. 37 is a diagram illustrating the power reflection characteristic (S11) in 2 GHz band according to the second embodiment.
Figure 38:
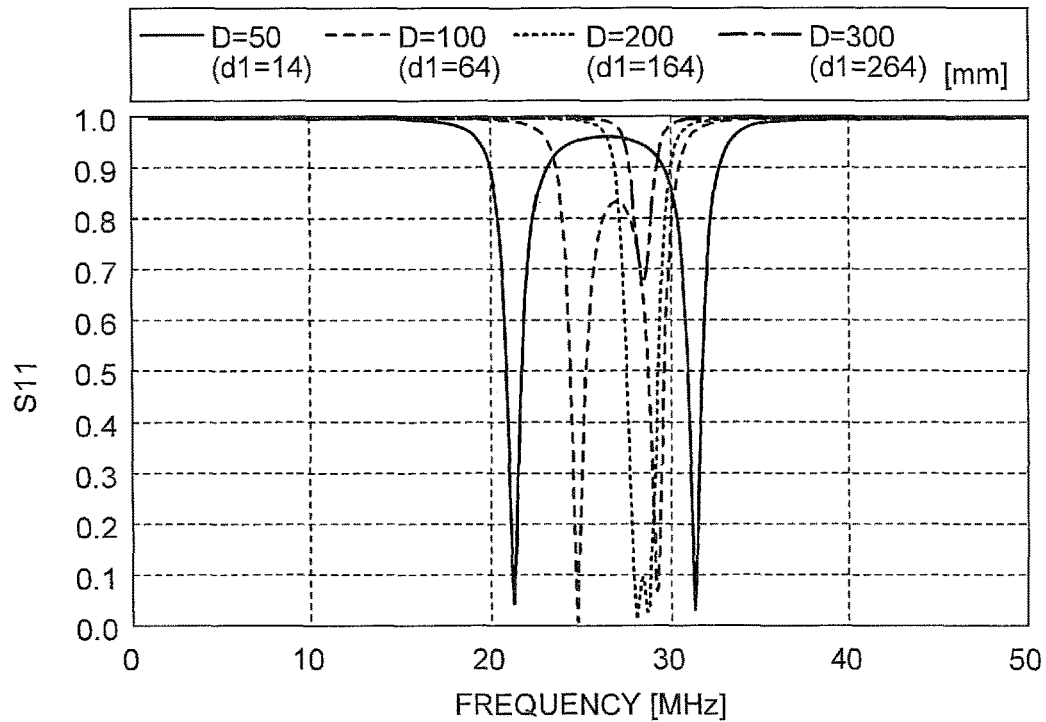
FIG. 38 is a diagram illustrating the power reflection characteristic (S11) in 30 MHz band according to the second embodiment.

Next, the following describes an example in which the frequency of the radio waves transmitted from the UFMA 80 is assumed to be 2 GHz band. FIG. 31 is a diagram illustrating the power transmission characteristic (S21) in 30 MHz band according to the second embodiment. FIG. 32 is a diagram illustrating the communication pass characteristic (S43) in 2 GHz band according to the second embodiment. FIG. 33 is a diagram illustrating the communication reflection characteristic (S33) in 2 GHz band according to the second embodiment. FIG. 34 is a diagram illustrating the communication reflection characteristic (S33) in 30 MHz band according to the second embodiment. FIG. 35 is a diagram illustrating the isolation characteristic (S31) in 2 GHz band according to the second embodiment. FIG. 36 is a diagram illustrating the isolation characteristic (S31) in 30 MHz band according to the second embodiment. FIG. 37 is a diagram illustrating the power reflection characteristic (S11) in 2 GHz band according to the second embodiment. FIG. 38 is a diagram illustrating the power reflection characteristic (S11) in 30 MHz band according to the second embodiment.

For the power transmitting communication device 100B, as illustrated in FIG. 31, it can be found that the power transmission characteristic (S21) is 90% or higher at a frequency around 30 MHz. That is, it can be found that the power transmission characteristic of the power transmitting communication device 100B is not affected by the UFMA 80 that is arranged on each of the first electrode 20 of the electric transmission communication unit 3A and the first electrode 20 of the electric reception communication unit 3B. In FIG. 31, the vertical axis indicates the power transmission characteristic (S21), and the horizontal axis indicates the frequency of the AC power supplied from the AC power supply 60.

As illustrated in FIG. 32, in the power transmitting communication device 100B, a flat broadband characteristic is obtained at a frequency of 2 GHz as compared with at the frequency of 1 GHz. In FIG. 32, the vertical axis indicates the communication pass characteristic (S43), and the horizontal axis indicates the frequency of the electric signal output from the signal input/output circuit 50.

For the power transmitting communication device 100B, as illustrated in FIGS. 33 and 34, the communication reflection characteristic (S33) is equal to or smaller than 0.5 over a wide band in 2 GHz band. Table 6 below represents a frequency band in which the communication reflection characteristic (S33) is equal to or smaller than 0.5 and a fractional bandwidth for each distance (gap) D between the first electrodes 20 of the electric transmission communication unit 3A and the electric reception communication unit 3B. As a comparative example, represented are a frequency band and a fractional bandwidth in a case of using the single UFMA 80. According to Table 6, it can be found that the fractional bandwidth of the power transmitting communication device 100B the frequency of which is 2 GHz is wider than that of the power transmitting communication device 100B the frequency of which is 1 GHz. It can be also found that the fractional bandwidth of the power transmitting communication device 100B is wide and effective even when the gap D is small. In FIGS. 33 and 34, the vertical axis indicates the communication reflection characteristic (S33), and the horizontal axis indicates the frequency of the electric signal output from the signal input/output circuit 50.

TABLE 6

| Distance D (mm) | Frequency band (MHz) | Specific band (%) |
| --- | --- | --- |
| 50 | 804 | 51.5 |
| 100 | 959 | 66.2 |
| 200 | 923 | 62.9 |
| 300 | 952 | 65.6 |
| (Single UFMA) | 24 | 13.4 |

For the power transmitting communication device 100B, as illustrated in FIGS. 35 and 36, the isolation characteristic (S31) indicating the influence on communication caused by supplying electric power is secured to be equal to or larger than 30 dB in both of 2 GHz band and 30 MHz band except for part of the band (950 MHz±50 MHz). That is, the influence on communication caused by supplying electric power is suppressed in the power transmitting communication device 100B. In FIGS. 35 and 36, the vertical axis indicates the isolation characteristic (S31), and the horizontal axis indicates the frequency of the AC power supplied from the AC power supply 60.

As illustrated in FIGS. 37 and 38, it can be found that the reflection characteristic (S11) becomes smaller than 0.5 in 1 GHz band and 30 MHz band, and the reflected wave can be suppressed in the power transmitting communication device 100B.

As described above, the power transmitting communication unit 3 according to the second embodiment includes the U-shaped folded monopole antenna (UFMA) 80 that transmits or receives the radio waves via a U-shaped metal plate formed on at least one of the first electrode 20 and the second electrode 30. For the power transmitting communication unit 3, the communication module is not required to be added to another place on the same plane as the power transmission module unlike the related art, so that the power transmitting communication unit 3 can be downsized. The power transmitting communication unit 3 can suppress the influence on communication caused by supplying electric power, and can also suppress the influence on supplying of electric power caused by communication. That is, the power transmitting communication unit 3 can prevent supplying of electric power and communication from interfering with each other even when the first electrode 20 is integrated with the UFMA 80. A communication band of the power transmitting communication unit 3 can be substantially wider than that of the power transmitting communication device 100 according to the first embodiment.

For the power transmitting communication device 100B according to the second embodiment, the first electrode 20 and the second electrode 30 of the electric transmission communication unit 3A are arranged being opposed to the first electrode 20 and the second electrode 30 of the electric reception communication unit 3B so that power transmission can be performed, and the UFMA 80 of the electric transmission communication unit 3A is arranged being opposed to the UFMA 80 of the electric reception communication unit 3B in a communicable manner. Due to this, the power transmitting communication device 100B enables power transmission and communication to be performed between the electric transmission communication unit 3A and the electric reception communication unit 3B.

Reference Example

Figure 39:
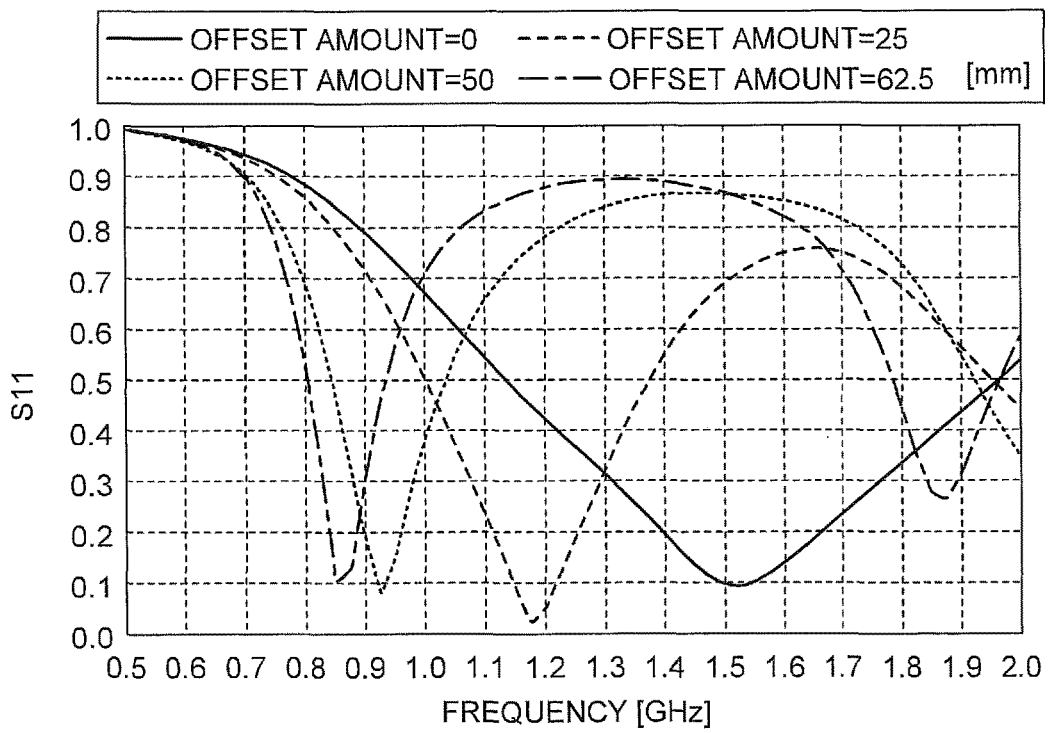
FIG. 39 is a diagram illustrating a reflection characteristic (S11) according to a reference example.
Figure 40:
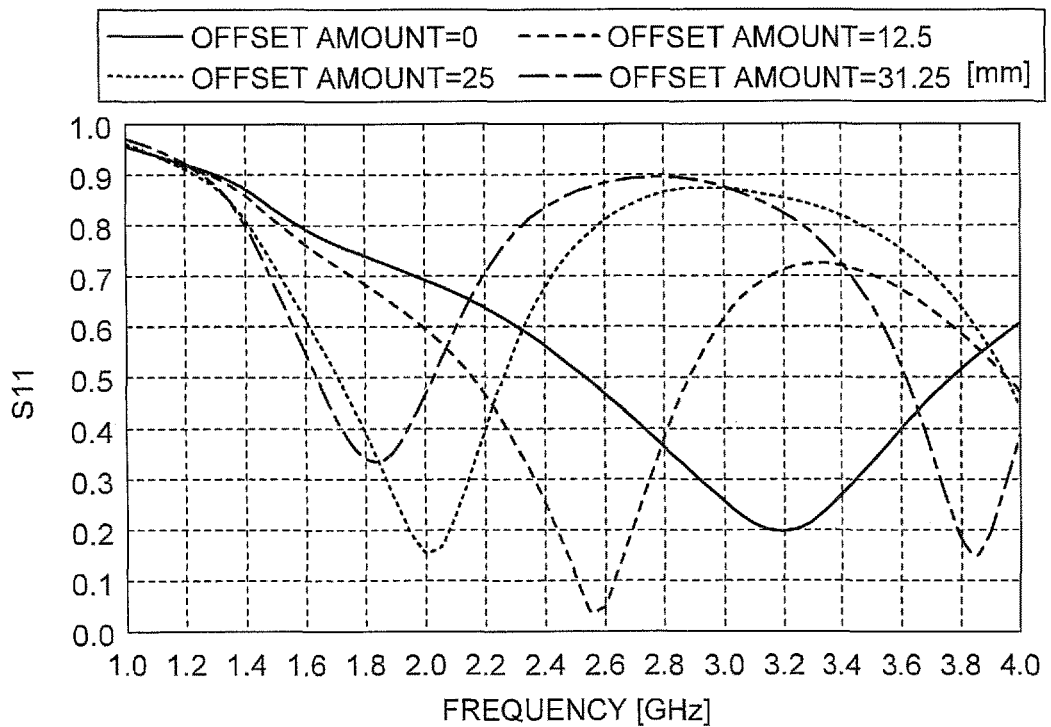
FIG. 40 is another diagram illustrating the reflection characteristic (S11) according to the reference example.
Figure 41:
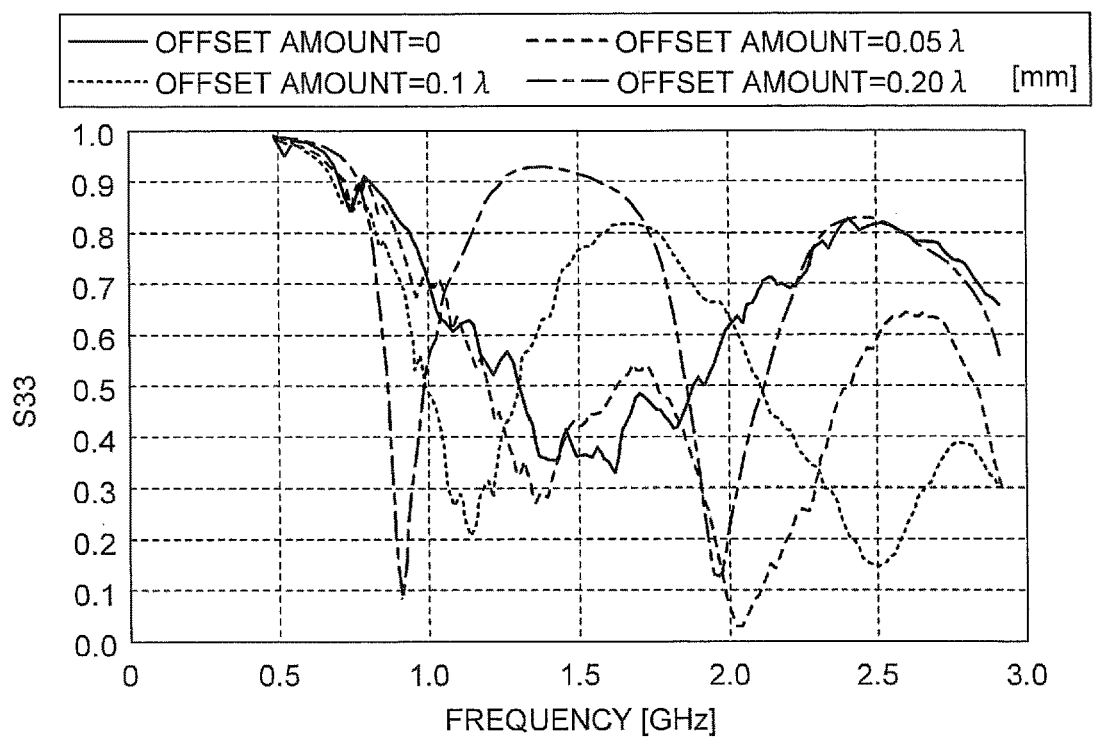
FIG. 41 is a diagram illustrating the communication reflection characteristic (S33) according to the reference example.
Figure 42:
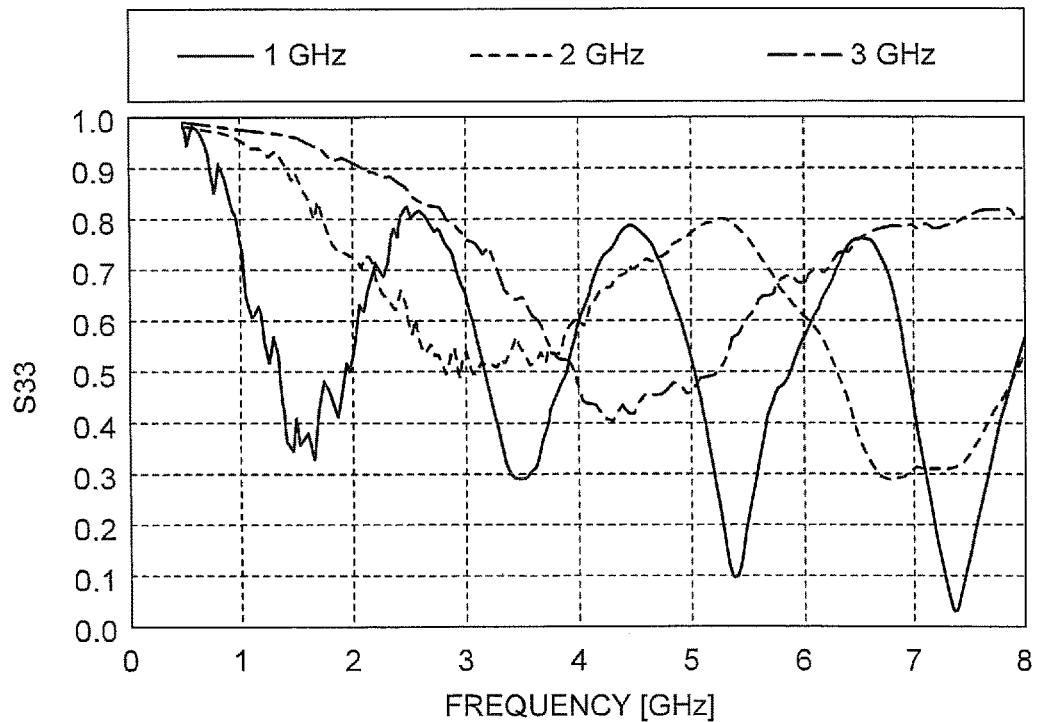
FIG. 42 is another diagram illustrating the communication reflection characteristic (S33) according to the reference example.

Next, the following describes the slot antenna according to a reference example. In the reference example, described is a case of using the single slot antenna without forming the slot antenna on each of the first and second electrodes 20 and 30. FIG. 39 is a diagram illustrating the reflection characteristic (S11) according to the reference example. FIG. 40 is a diagram illustrating the reflection characteristic (S11) according to the reference example. FIG. 41 is a diagram illustrating the communication reflection characteristic (S33) according to the reference example. FIG. 42 is a diagram illustrating the communication reflection characteristic (S33) according to the reference example.

For the slot antenna (not illustrated), the power feeding point is arranged at the center of the long side of the slit. Also in a case of using the single slot antenna, the band is widened while the resonance frequency is increased in the slot antenna when the offset amount of the power feeding point is changed, so that a maximum bandwidth can be obtained by causing the offset amount of the power feeding point to be 0 mm (refer to FIGS. 39 and 40).

As illustrated in FIG. 41, in an actual measurement result of 1 GHz, it can be found that the maximum bandwidth can be obtained by causing the offset amount of the power feeding point to be 0 mm similarly to a simulation result. Regarding the communication reflection characteristic (S33) in a case of changing the frequency to be 1 GHz, 2 GHz, and 3 GHz, as illustrated in FIG. 42, a band in which the communication reflection characteristic (S33) is equal to or smaller than 0.5 is a fractional bandwidth around 30% except for the frequency of 2 GHz. Thus, it can be found that the length of the long side of the slit that is changed depending on the frequency does not much affect the communication reflection characteristic (S33). In FIG. 41, the vertical axis indicates the communication reflection characteristic (S33), and the horizontal axis indicates the frequency of the AC power supplied from the AC power supply 60. In FIG. 42, the vertical axis indicates the communication reflection characteristic (S33), and the horizontal axis indicates the frequency of the AC power supplied from the AC power supply 60.

As described above, in the slot antenna according to the reference example, the power feeding point is arranged at the center of the long side of the slit, so that the communication frequency band can be widened even when the single slot antenna is used.

Third Embodiment

Figure 43:
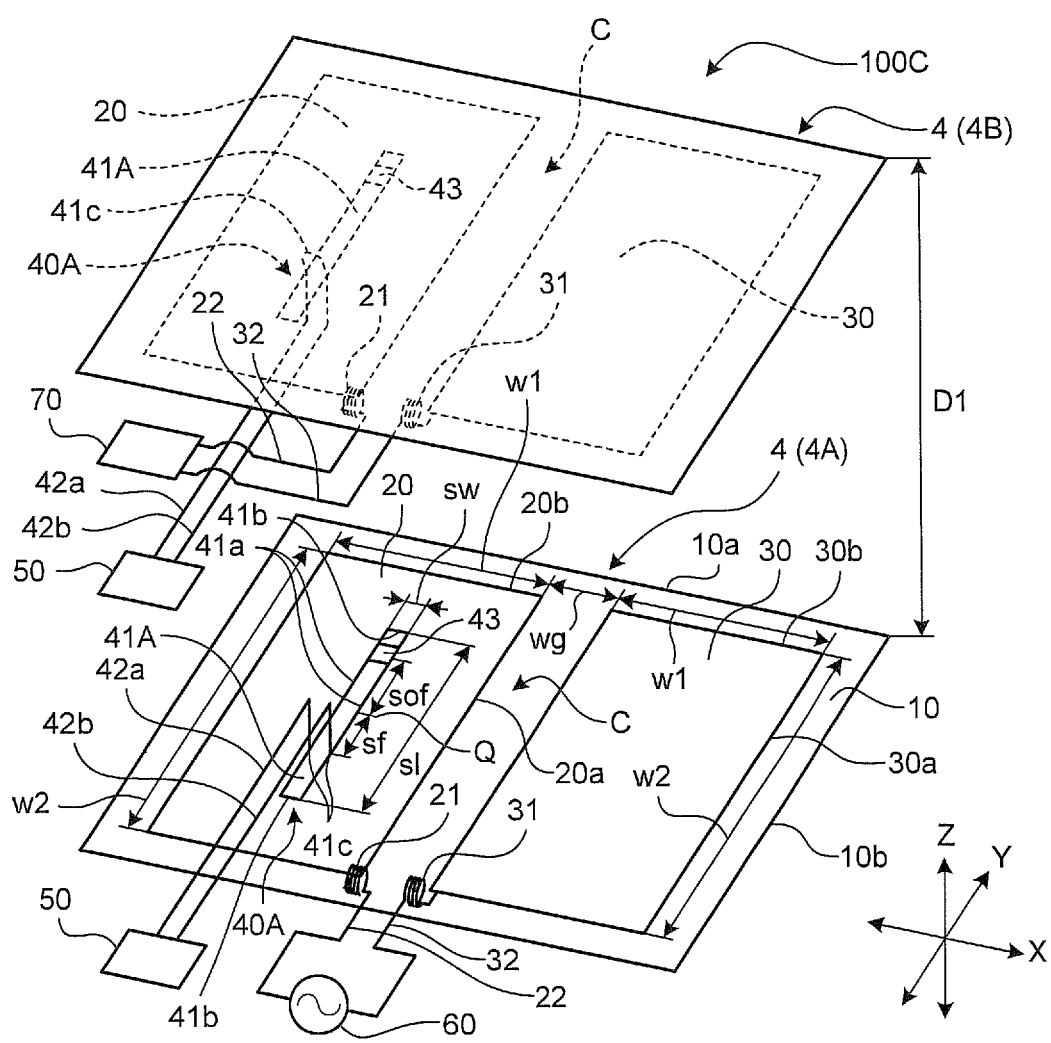
FIG. 43 is a perspective view illustrating a configuration example of a power transmitting communication unit according to a third embodiment.

Next, the following describes a power transmitting communication device 100C and a power transmitting communication unit 4 according to a third embodiment. The third embodiment is different from the first embodiment in that, in the power transmitting communication device 100C, a slot antenna 40A includes a short-circuit strip 43 serving as a short-circuit part. The same component of the power transmitting communication device 100C as that of the power transmitting communication device 100 according to the first embodiment is denoted by the same reference numeral, and detailed description thereof will not be repeated. FIG. 43 is a perspective view illustrating a configuration example of the power transmitting communication unit according to the third embodiment.

As illustrated in FIG. 43, the slot antenna 40A includes one short-circuit strip 43 that electrically connects a long side 41a with the other long side 41a of a slit 41A. The short-circuit strip 43 is a conductor formed in a rectangular shape (including a square), and is arranged along a direction orthogonal to the long side 41a of the slit 41A. In this example, the short-circuit strip 43 is formed in a square shape, and the length of each side is equal to the length sw of the short side 41b of the slit 41A. The short-circuit strip 43 is, for example, made of the same material as that of the first electrode 20, and integrally molded with the slot antenna 40A of the first electrode 20. The short-circuit strip 43 may be assembled to the slot antenna 40A as a component. The short-circuit strip 43 is, for example, positioned closer to the end (short side 41b side) with respect to the center Q of the long side 41a of the slit 41A. That is, the short-circuit strip 43 is positioned closer to the end with respect to a half (½) position of the long side 41a of the slit 41A. Preferably, the short-circuit strip 43 is positioned closer to the end with respect to a quarter position of the long side 41a. More preferably, when the length from the center Q to the end of the long side 41a is 75 mm, the short-circuit strip 43 is positioned at a place separated away from the center Q of the long side 41a toward the end by 60 mm. That is, assuming that a distance from the center Q of the long side 41a to the end is "1", the short-circuit strip 43 is positioned at a place separated away from the center Q toward the end by "⅘". The short-circuit strip 43 is preferably positioned closer to the end of the slit 41A, and is not electrically connected to the short side 41b of the slit 41A.

The power transmitting communication unit 4 functions as an electric transmission communication unit 4A that transmits electric power, or an electric reception communication unit 4B that receives electric power. The electric transmission communication unit 4A and the electric reception communication unit 4B constitute the power transmitting communication device 100C.

For the power transmitting communication device 100C, the first electrode 20 and the second electrode 30 of the electric transmission communication unit 4A and the first electrode 20 and the second electrode 30 of the electric reception communication unit 4B are opposed to each other so that power transmission can be performed, and are arranged with a predetermined transmission distance (gap) D1 in the Z-axis direction.

For the power transmitting communication device 100C, the slot antenna 40A of the electric transmission communication unit 4A is opposed to the slot antenna 40A of the electric reception communication unit 4B in a communicable manner. For example, in the electric transmission communication unit 4A and the electric reception communication unit 4B, slot antennas 40A are opposed to each other, and short-circuit strips 43 of the slot antennas 40A are positioned closer to the same end of the slit 41A. In a state in which the electric transmission communication unit 4A is opposed to the electric reception communication unit 4B, the short-circuit strips 43 are not necessarily positioned closer to the same end.

Next, the following describes an operation characteristic of the power transmitting communication device 100C. In this example, the length w1 of the short side 20b of the first electrode 20 is assumed to be 107.8 mm, and the length w2 of the long side 20a of the first electrode 20 is assumed to be 250 mm. Similarly, the length w1 of the short side 30b of the second electrode 30 is assumed to be 107.8 mm, and the length w2 of the long side 30a of the second electrode 30 is assumed to be 250 mm. For the slot antenna 40A, the length s1 of the long side 41a of the slit 41A is assumed to be 150 mm, and the length sw of the short side 41b is assumed to be 1 mm. Analysis was performed assuming that a wireless power transfer (WPT) band is in a range from 0 MHz to 50 MHz, and a near field radio communication (NFC) band is in a range from 0.5 GHz to 2.5 GHz. With respect to the center Q (0 mm) of the long side 41a of the slit 41A, one side of the long side 41a is assumed to be a plus length, and the other side of the long side 41a is assumed to be a minus length. That is, with respect to the center Q (0 mm) of the slit 41A, one side of the long side 41a is assumed to have a length from 0 mm to 75 mm, and the other side of the long side 41a is assumed to have a length from 0 mm to −75 mm. In this case, a position sof of the short-circuit strip 43 is changed in a range from −10 mm to −60 mm, and the offset amount sf of the power feeding point 41c is changed in a range from 0 mm to 60 mm. The transmission distance D1 is changed in a range from 10 mm to 200 mm.

Figure 44:
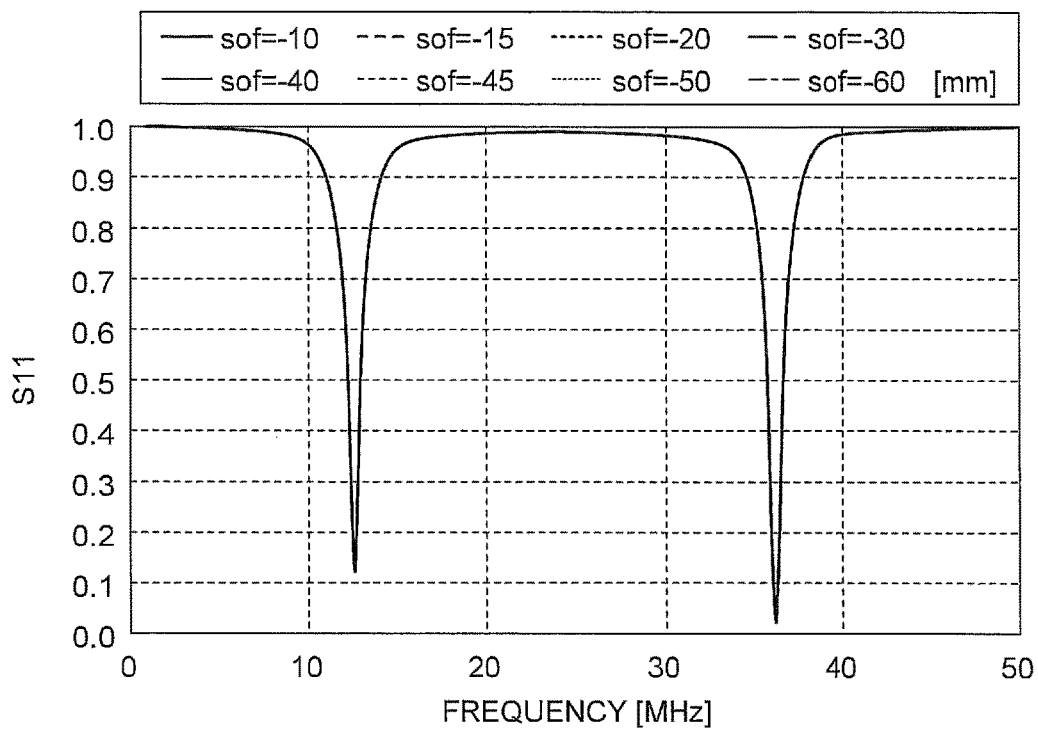
FIG. 44 is a diagram illustrating the power reflection characteristic (S11) in a wireless power transfer (WPT) band when a short-circuit position is changed according to the third embodiment.
Figure 45:
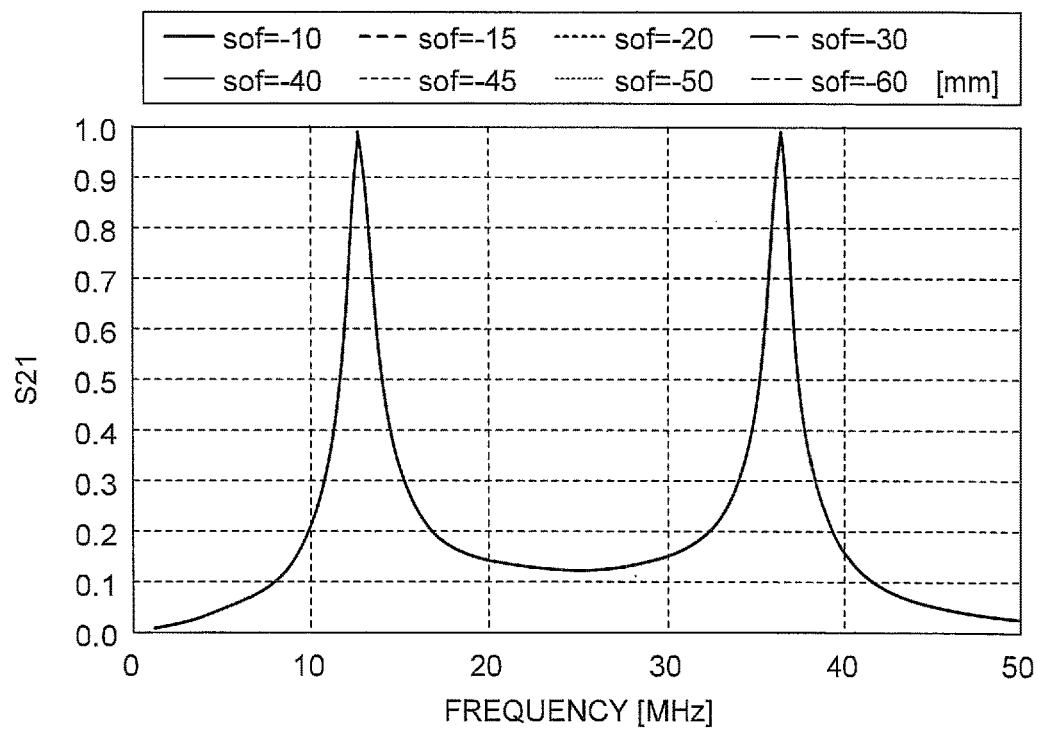
FIG. 45 is a diagram illustrating the power transmission characteristic (S21) in the WPT band when the short-circuit position is changed according to the third embodiment.
Figure 46:
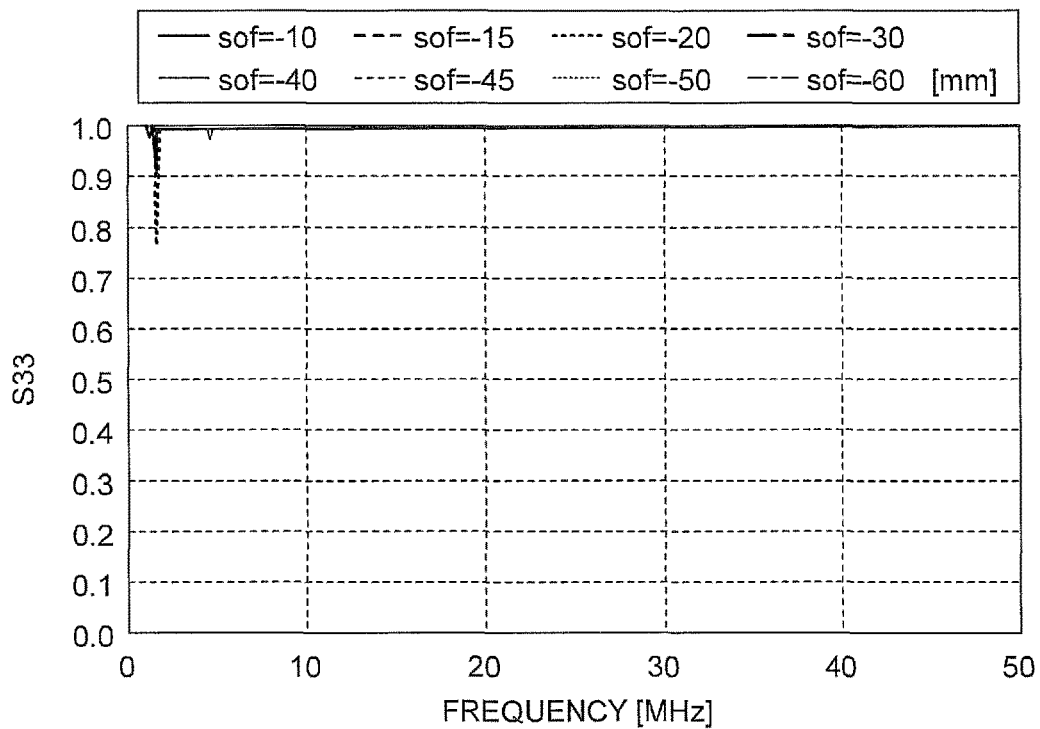
FIG. 46 is a diagram illustrating the communication reflection characteristic (S33) in the WPT band when the short-circuit position is changed according to the third embodiment.
Figure 47:
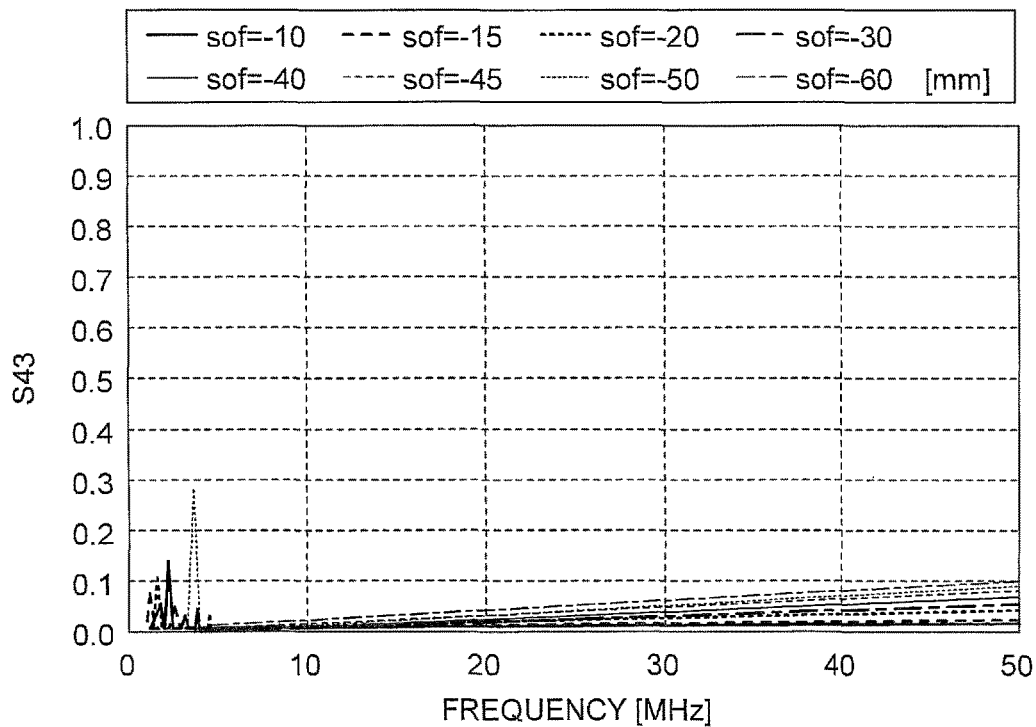
FIG. 47 is a diagram illustrating the communication pass characteristic (S43) in the WPT band when the short-circuit position is changed according to the third embodiment.

FIG. 44 is a diagram illustrating the power reflection characteristic (S11) in the WPT band when the short-circuit position is changed according to the third embodiment. FIG. 45 is a diagram illustrating the power transmission characteristic (S21) in the WPT band when the short-circuit position is changed according to the third embodiment. FIG. 46 is a diagram illustrating the communication reflection characteristic (S33) in the WPT band when the short-circuit position is changed according to the third embodiment. FIG. 47 is a diagram illustrating the communication pass characteristic (S43) in the WPT band when the short-circuit position is changed according to the third embodiment. In FIG. 44, the vertical axis indicates the power reflection characteristic (S11). In FIG. 45, the vertical axis indicates the power transmission characteristic (S21). In FIG. 46, the vertical axis indicates the communication reflection characteristic (S33). In FIG. 47, the vertical axis indicates the communication pass characteristic (S43). The horizontal axis in FIGS. 44 to 47 indicates a frequency of the WPT band. In this example, in the WPT band, the position sof of the short-circuit strip 43 is changed in a range from −10 mm to −60 mm. The offset amount sf of the power feeding point 41c offset from the center Q of the long side 41a of the slit 41A in the Y-axis direction is assumed to be 0 mm, and the transmission distance D1 is assumed to be 10 mm.

As illustrated in FIGS. 44, 45, 46, and 47, in the power transmitting communication device 100C, even when the position sof of the short-circuit strip 43 is changed in a range from −10 mm to −60 mm in the WPT band, the power reflection characteristic (S11), the power transmission characteristic (S21), the communication reflection characteristic (S33), and the communication pass characteristic (S43) are hardly changed. Thus, it can be found that the position sof of the short-circuit strip 43 in the power transmitting communication device 100C hardly affects the operation characteristic in the WPT band.

Figure 48:
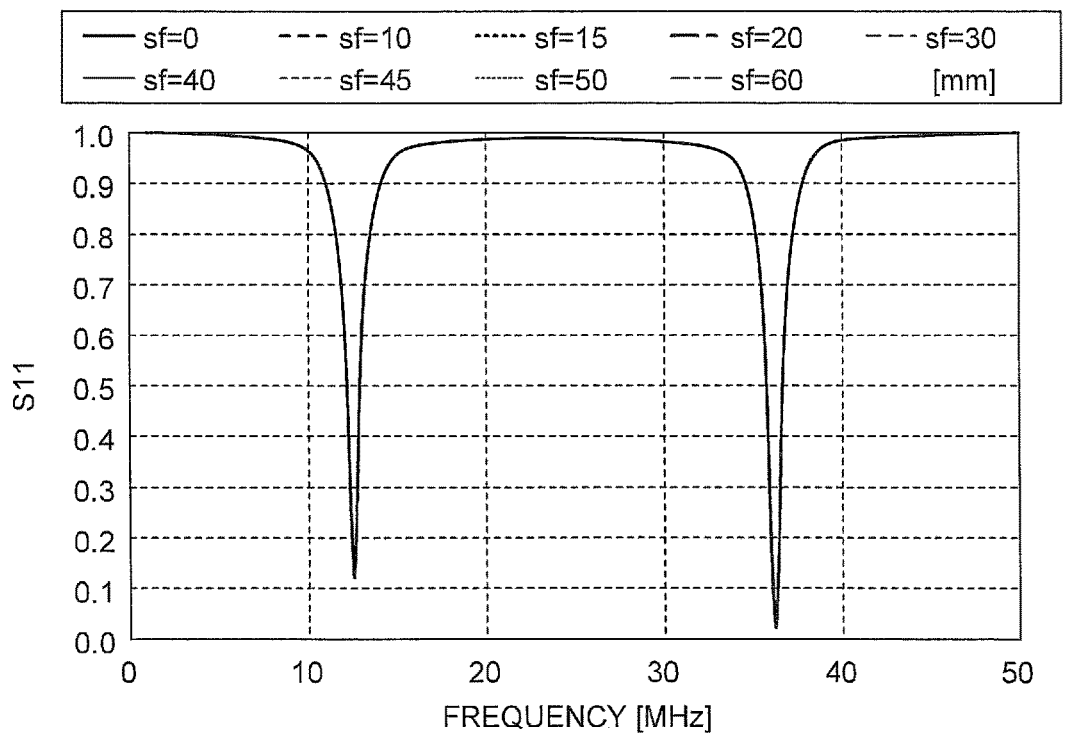
FIG. 48 is a diagram illustrating the power reflection characteristic (S11) in the WPT band when a power feeding position is changed according to the third embodiment.
Figure 49:
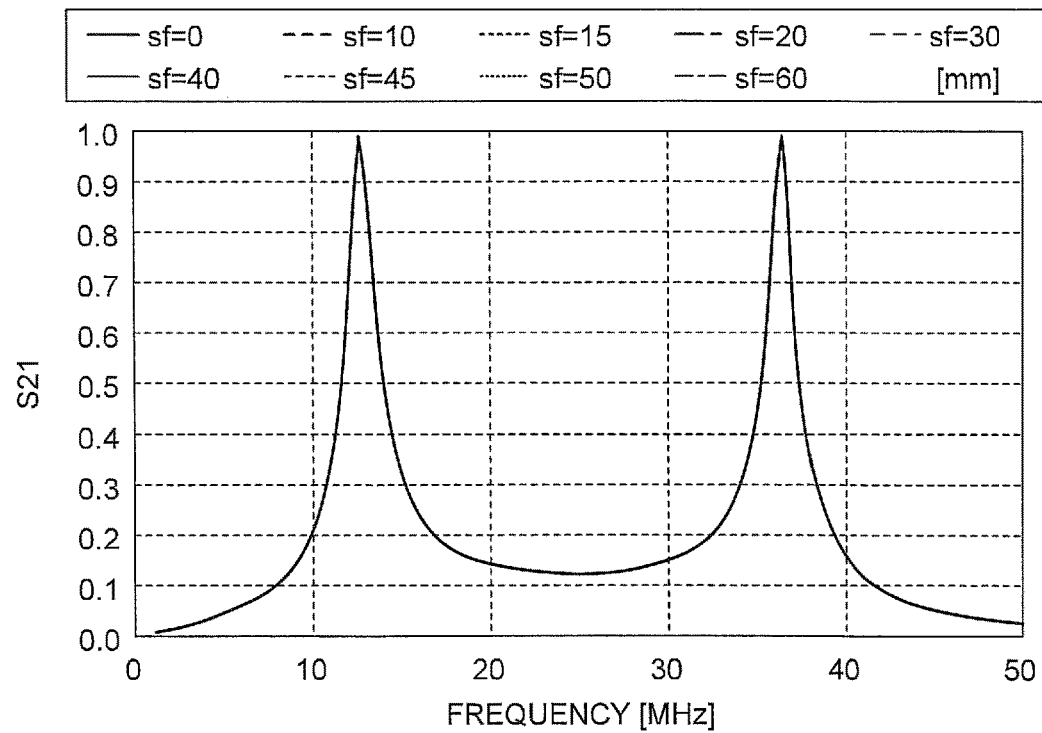
FIG. 49 is a diagram illustrating the power transmission characteristic (S21) in the WPT band when the power feeding position is changed according to the third embodiment.
Figure 50:
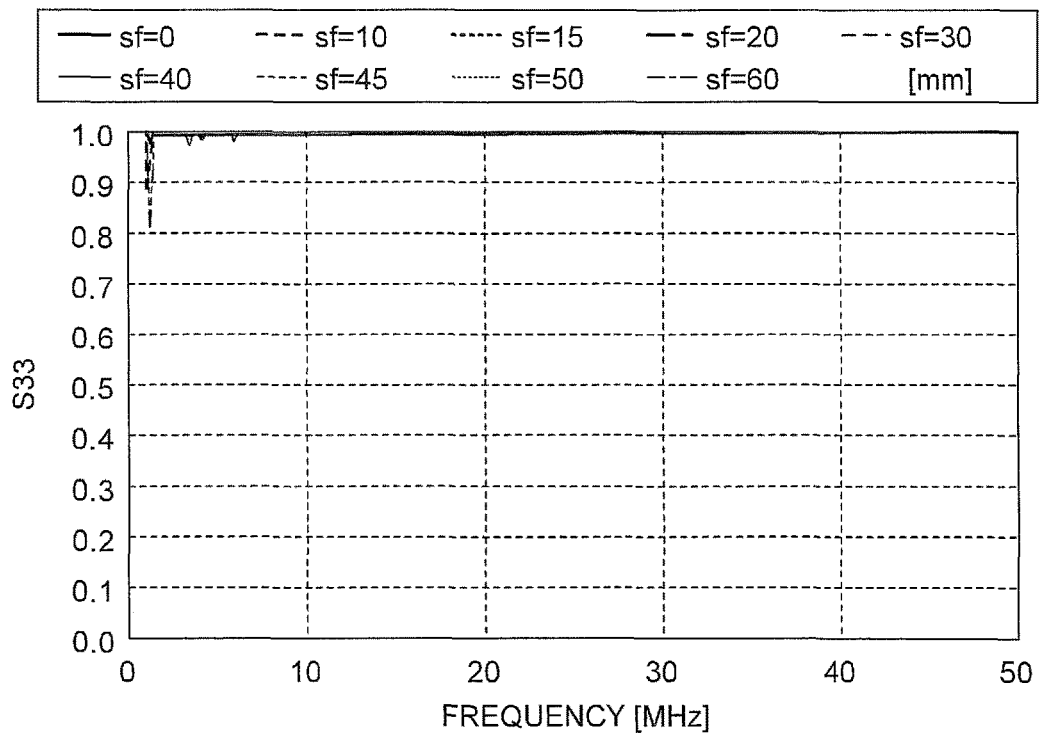
FIG. 50 is a diagram illustrating the communication reflection characteristic (S33) in the WPT band when the power feeding position is changed according to the third embodiment.
Figure 51:
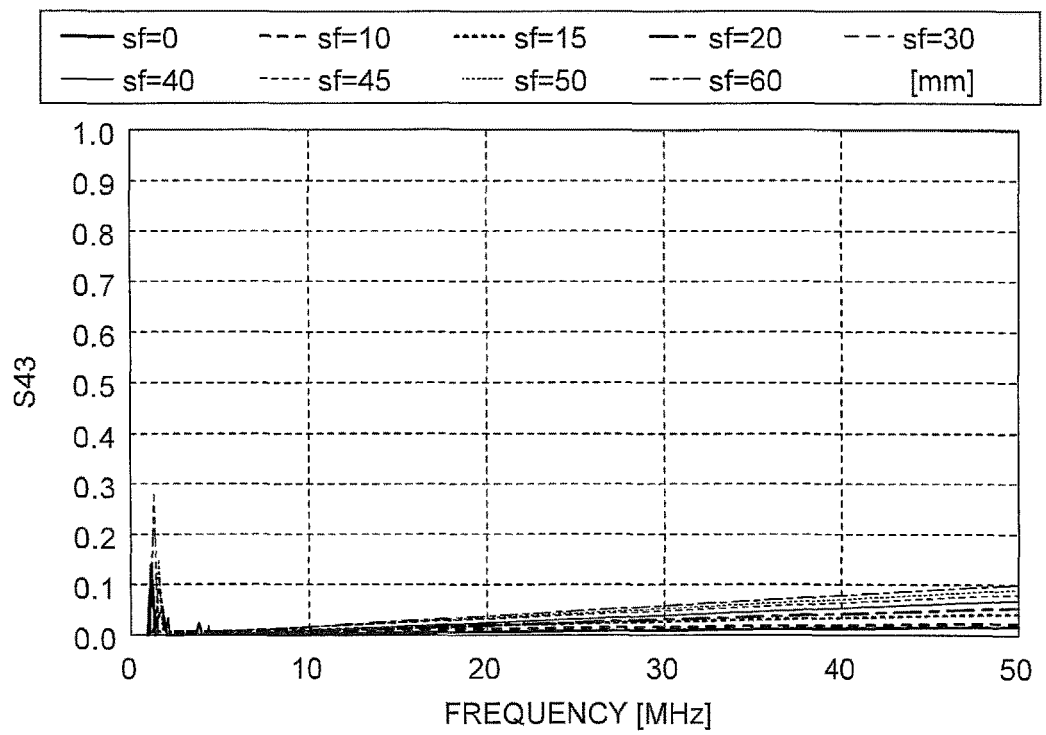
FIG. 51 is a diagram illustrating the communication pass characteristic (S43) in the WPT band when the power feeding position is changed according to the third embodiment.

FIG. 48 is a diagram illustrating the power reflection characteristic (S11) in the WPT band when a power feeding position is changed according to the third embodiment. FIG. 49 is a diagram illustrating the power transmission characteristic (S21) in the WPT band when the power feeding position is changed according to the third embodiment. FIG. 50 is a diagram illustrating the communication reflection characteristic (S33) in the WPT band when the power feeding position is changed according to the third embodiment. FIG. 51 is a diagram illustrating the communication pass characteristic (S43) in the WPT band when the power feeding position is changed according to the third embodiment. In FIG. 48, the vertical axis indicates the power reflection characteristic (S11). In FIG. 49, the vertical axis indicates the power transmission characteristic (S21). In FIG. 50, the vertical axis indicates the communication reflection characteristic (S33). In FIG. 51, the vertical axis indicates the communication pass characteristic (S43). The horizontal axis in FIGS. 48 to 51 indicates the frequency of the WPT band. In this example, the offset amount sf of the power feeding point 41c is changed in a range from 0 mm to 60 mm in the WPT band. The position sof of the short-circuit strip 43 is assumed to be −60 mm, and the transmission distance D1 is assumed to be 10 mm.

For the power transmitting communication device 100C, as illustrated in FIGS. 48, 49, 50, and 51, even when the offset amount sf of the power feeding point 41c is changed in a range from 0 mm to 60 mm in the WPT band, the power reflection characteristic (S11), the power transmission characteristic (S21), the communication reflection characteristic (S33), and the communication pass characteristic (S43) are hardly changed. Thus, it can be found that the offset amount sf of the power feeding point 41c in the power transmitting communication device 100C hardly affects the operation characteristic in the WPT band.

Figure 52:
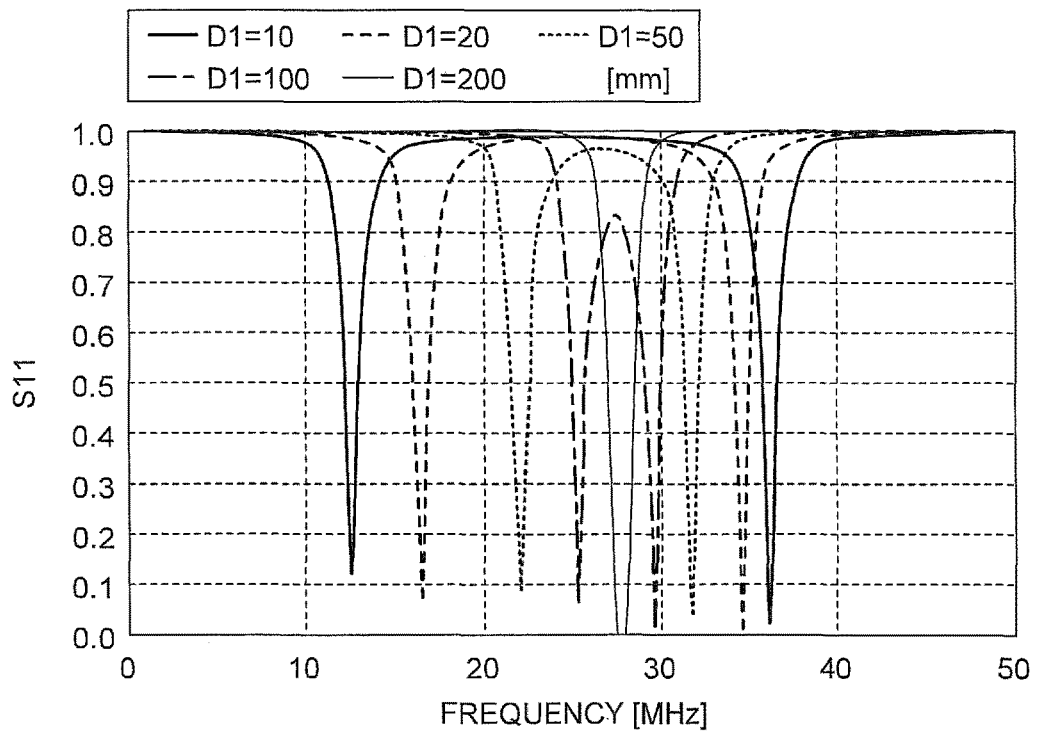
FIG. 52 is a diagram illustrating the power reflection characteristic (S11) in the WPT band when a transmission distance is changed according to the third embodiment.
Figure 53:
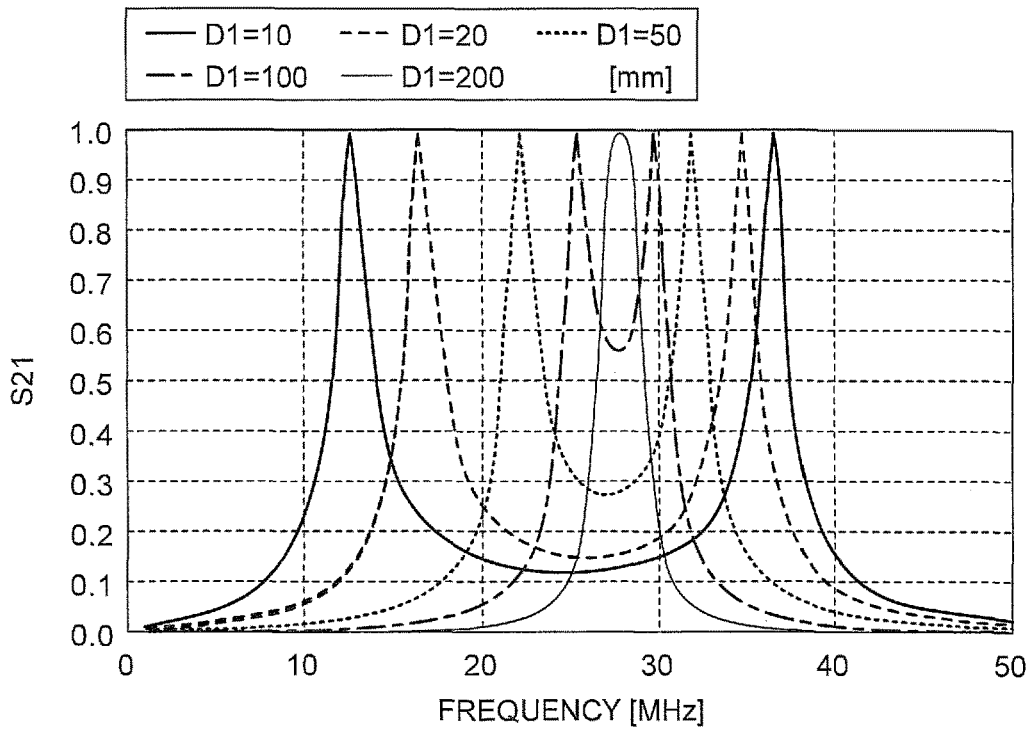
FIG. 53 is a diagram illustrating the power transmission characteristic (S21) in the WPT band when the transmission distance is changed according to the third embodiment.
Figure 54:
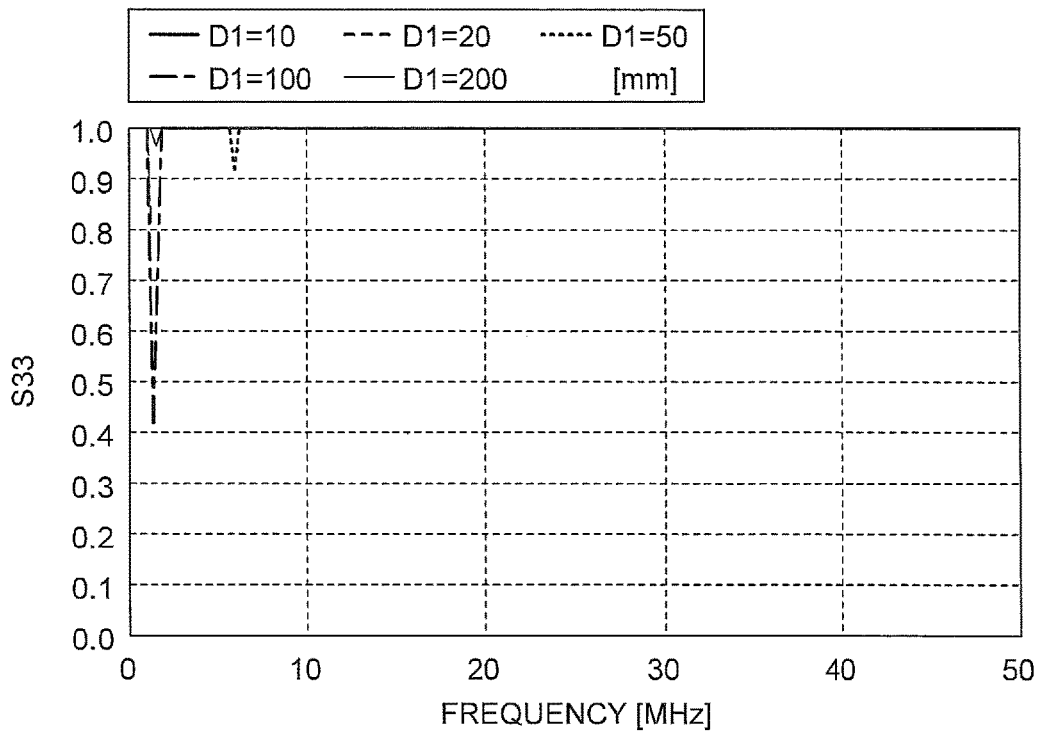
FIG. 54 is a diagram illustrating the communication reflection characteristic (S33) in the WPT band when the transmission distance is changed according to the third embodiment.
Figure 55:
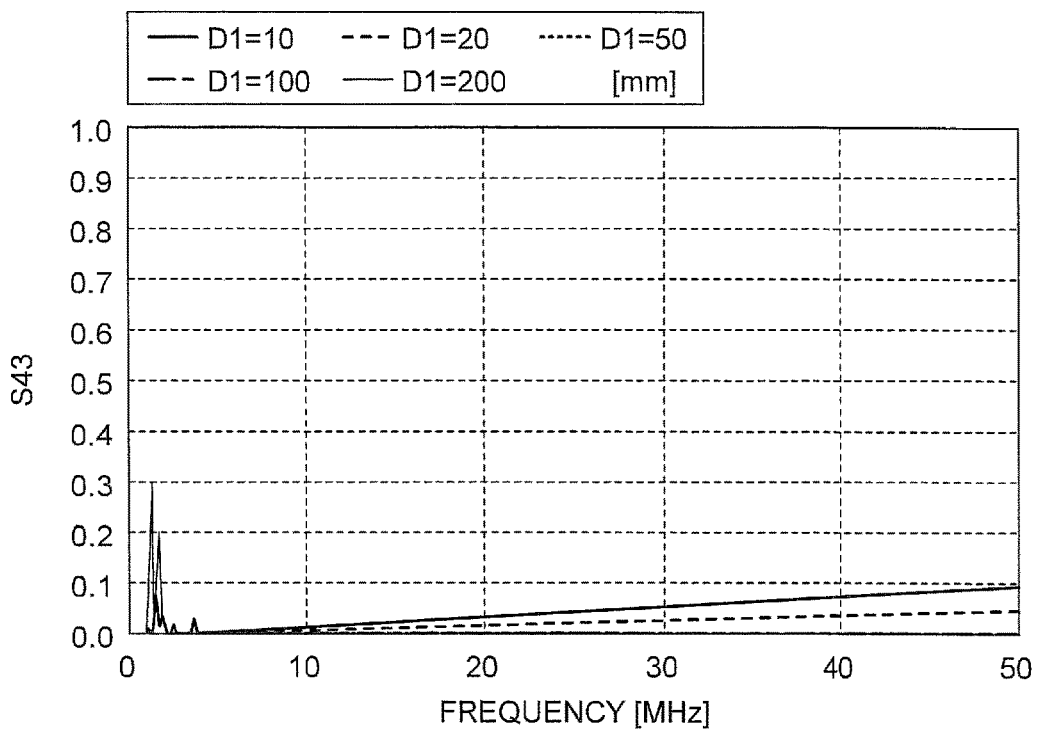
FIG. 55 is a diagram illustrating the communication pass characteristic (S43) in the WPT band when the transmission distance is changed according to the third embodiment.

FIG. 52 is a diagram illustrating the power reflection characteristic (S11) in the WPT band when a transmission distance is changed according to the third embodiment. FIG. 53 is a diagram illustrating the power transmission characteristic (S21) in the WPT band when the transmission distance is changed according to the third embodiment. FIG. 54 is a diagram illustrating the communication reflection characteristic (S33) in the WPT band when the transmission distance is changed according to the third embodiment. FIG. 55 is a diagram illustrating the communication pass characteristic (S43) in the WPT band when the transmission distance is changed according to the third embodiment. In FIG. 52, the vertical axis indicates the power reflection characteristic (S11). In FIG. 53, the vertical axis indicates the power transmission characteristic (S21). In FIG. 54, the vertical axis indicates the communication reflection characteristic (S33). In FIG. 55, the vertical axis indicates the communication pass characteristic (S43). The horizontal axis in FIGS. 52 to 55 indicates the frequency of the WPT band. In this example, the transmission distance D1 is changed in a range from 10 mm to 200 mm in the WPT band. The offset amount sf of the power feeding point 41c is assumed to be 0 mm, and the position sof of the short-circuit strip 43 is assumed to be −60 mm.

For the power transmitting communication device 100C, as illustrated in FIG. 52, even when the transmission distance D1 is changed in a range from 10 mm to 200 mm in the WPT band, the power reflection characteristic (S11) can be suppressed to be equal to or smaller than 0.5 in a predetermined band. For the power transmitting communication device 100C, even when the transmission distance D1 is changed in a range from 10 mm to 200 mm in the WPT band, the power transmission characteristic (S21) illustrated in FIG. 53 was not much changed from the power transmission characteristic (S21) of the power transmitting communication device 100 not including the short-circuit strip 43 illustrated in FIG. 3. Thus, it can be found that the offset amount sf of the short-circuit strip 43 or the power feeding point 41c hardly affects the power transmission characteristic (S21) in the WPT band. As illustrated in FIGS. 54 and 55, in the power transmitting communication device 100C, even when the transmission distance D1 is changed in a range from 10 mm to 200 mm in the WPT band, the communication reflection characteristic (S33) and the communication pass characteristic (S43) were hardly changed. Thus, it can be found that the transmission distance D1 hardly affects a communication characteristic in the WPT band in the power transmitting communication device 100C.

Figure 56:
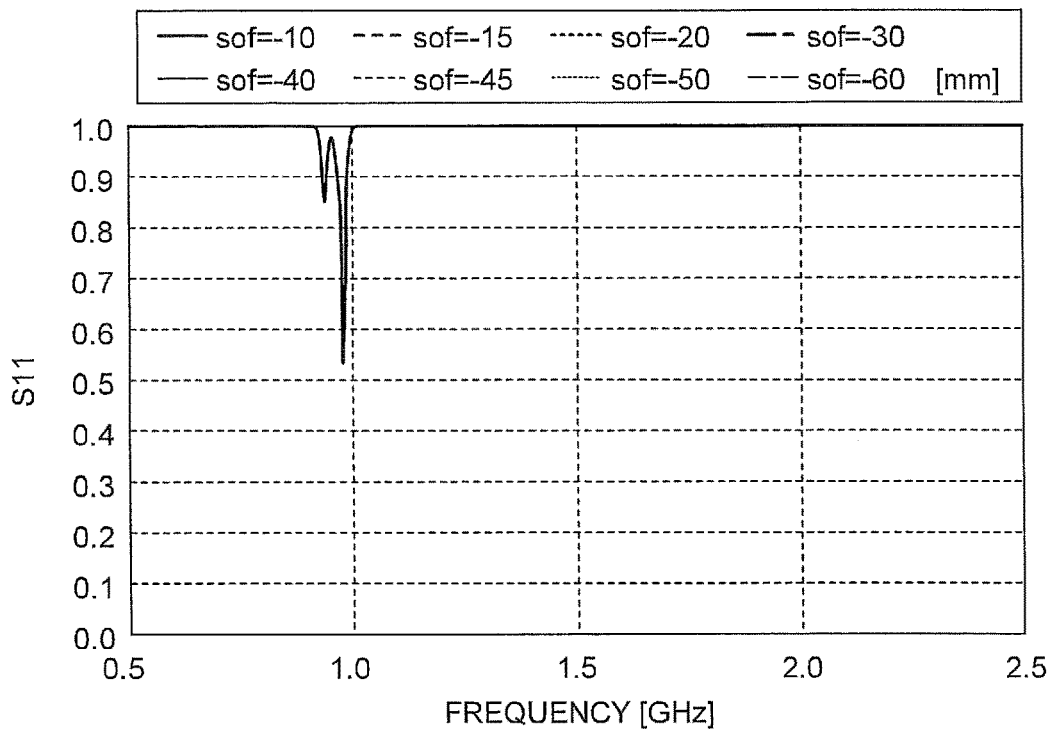
FIG. 56 is a diagram illustrating the power reflection characteristic (S11) in a near field radio communication (NFC) band when the short-circuit position is changed according to the third embodiment.
Figure 57:
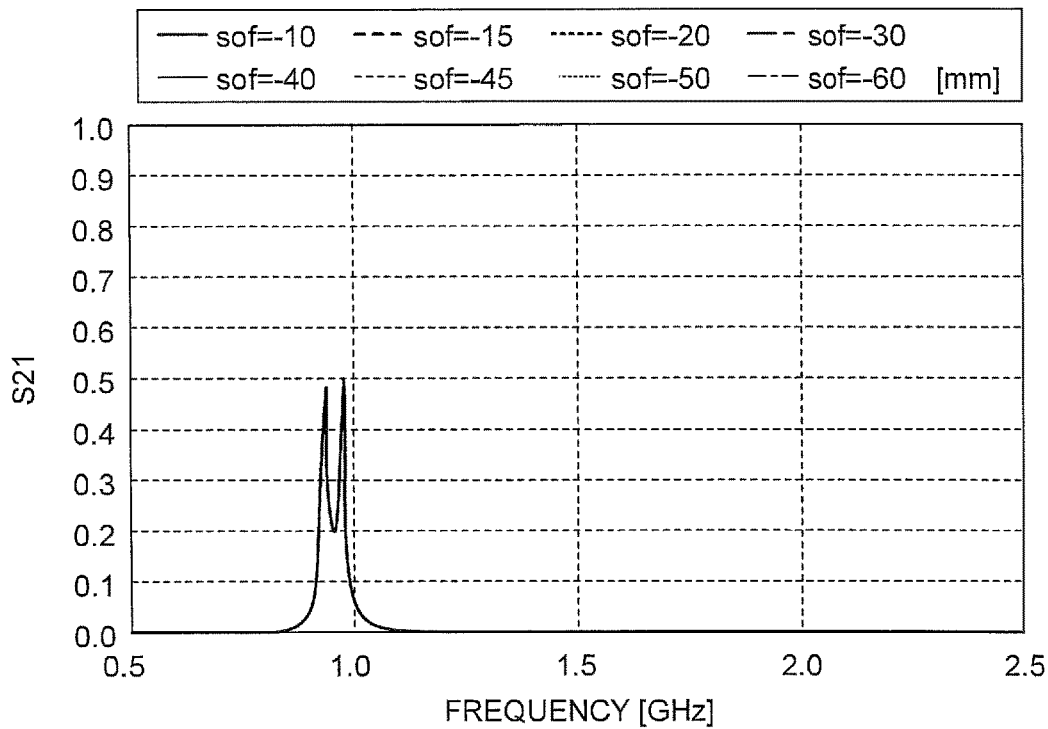
FIG. 57 is a diagram illustrating the power transmission characteristic (S21) in the NFC band when the short-circuit position is changed according to the third embodiment.
Figure 58:
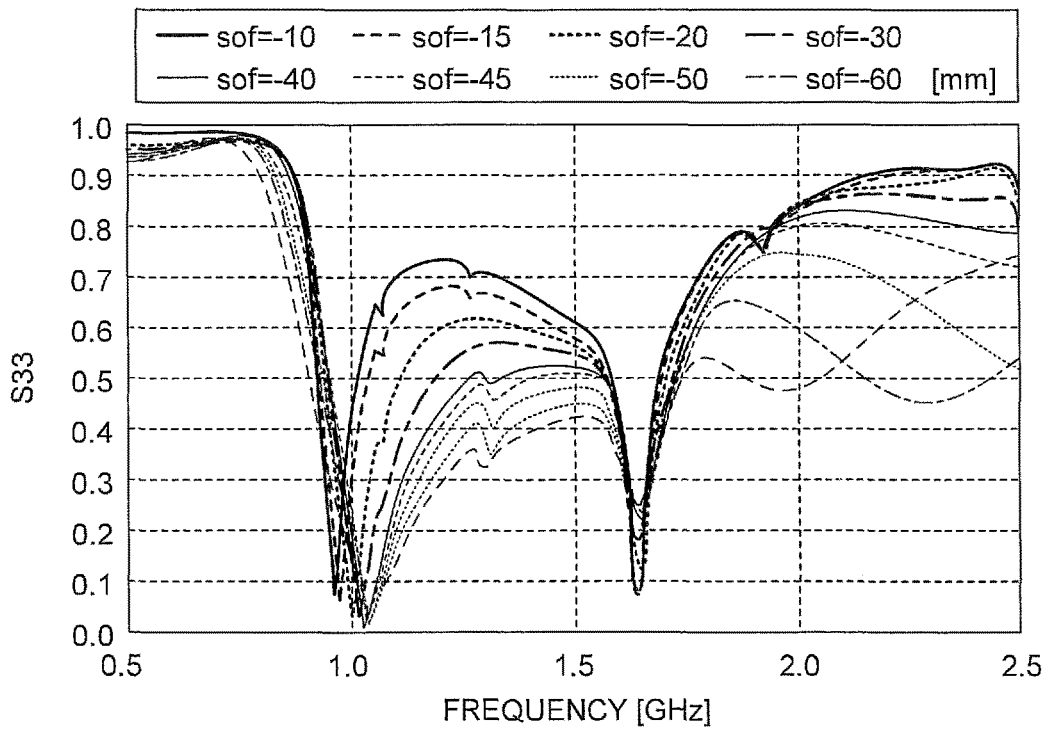
FIG. 58 is a diagram illustrating the communication reflection characteristic (S33) in the NFC band when the short-circuit position is changed according to the third embodiment.
Figure 59:
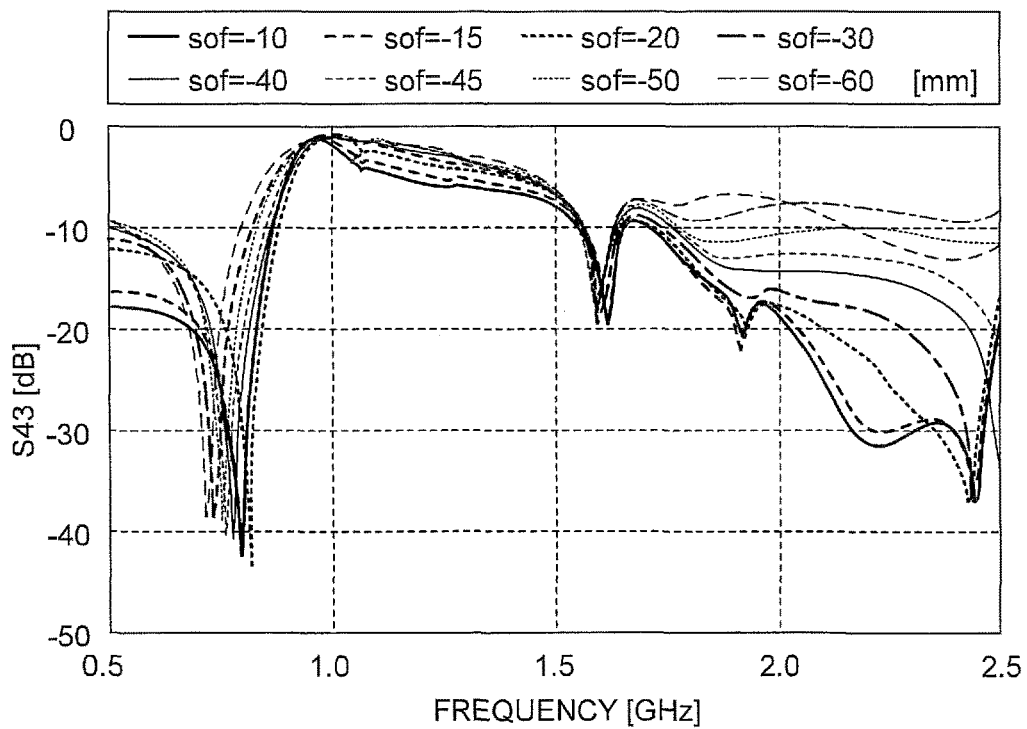
FIG. 59 is a diagram illustrating the communication pass characteristic (S43) in the NFC band when the short-circuit position is changed according to the third embodiment.
Figure 60:
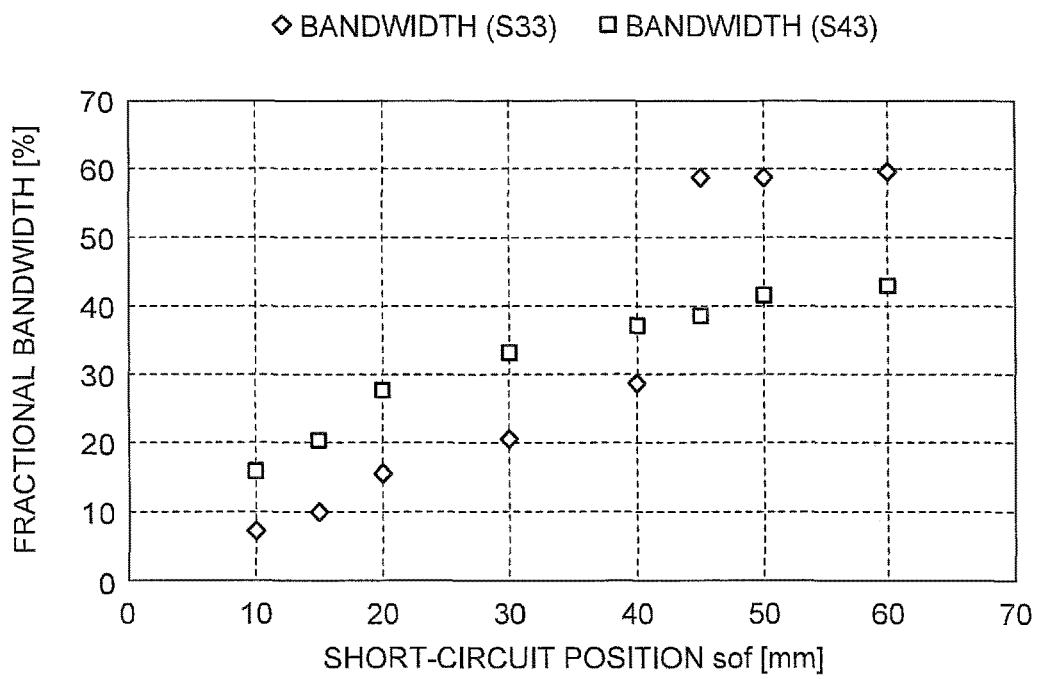
FIG. 60 is a diagram illustrating a relation between the short-circuit position and a fractional bandwidth according to the third embodiment.

FIG. 56 is a diagram illustrating the power reflection characteristic (S11) in the NFC band when the short-circuit position is changed according to the third embodiment. FIG. 57 is a diagram illustrating the power transmission characteristic (S21) in the NFC band when the short-circuit position is changed according to the third embodiment. FIG. 58 is a diagram illustrating the communication reflection characteristic (S33) in the NFC band when the short-circuit position is changed according to the third embodiment. FIG. 59 is a diagram illustrating the communication pass characteristic (S43) in the NFC band when the short-circuit position is changed according to the third embodiment. FIG. 60 is a diagram illustrating a relation between the short-circuit position and the fractional bandwidth according to the third embodiment. In FIG. 56, the vertical axis indicates the power reflection characteristic (S11). In FIG. 57, the vertical axis indicates the power transmission characteristic (S21). In FIG. 58, the vertical axis indicates the communication reflection characteristic (S33). In FIG. 59, the vertical axis indicates the communication pass characteristic (S43). The horizontal axis in FIGS. 56 to 59 indicates a frequency of the NFC band. In FIG. 60, the vertical axis indicates the fractional bandwidth, and the horizontal axis indicates the position sof of the short-circuit strip 43. FIG. 60 illustrates a relation between a bandwidth in which the communication reflection characteristic (S33) is equal to or smaller than 0.5 and a bandwidth in which the communication pass characteristic (S43) is in a range from a maximum value to −3 dB. In this example, the position sof of the short-circuit strip 43 is changed in a range from −10 mm to −60 mm in the NFC band. The offset amount sf of the power feeding point 41c is assumed to be 0 mm, and the transmission distance D1 is assumed to be 10 mm.

For the power transmitting communication device 100C, as illustrated in FIGS. 56 and 57, even when the position sof of the short-circuit strip 43 is changed in a range from −10 mm to −60 mm in the NFC band, the power reflection characteristic (S11) and the power transmission characteristic (S21) were hardly changed. Thus, it can be found that the position sof of the short-circuit strip 43 in the power transmitting communication device 100C hardly affects the electric power characteristic in the NFC band.

For the power transmitting communication device 100C, as illustrated in FIG. 58, a result of the communication reflection characteristic (S33) indicates that multi-frequency resonance is obtained in 1 GHz band and 1.7 GHz band. It can also be found that the bandwidth (0.5≥S33) is widened as the position sof of the short-circuit strip 43 is moved away from the center Q of the long side 41a of the slit 41A toward the end in the power transmitting communication device 100C. For the power transmitting communication device 100C, as illustrated in FIG. 59, it can be found that the bandwidth is widened as the position sof of the short-circuit strip 43 is moved away from the center Q of the long side 41a of the slit 41A toward the end based on the bandwidth from the maximum value of the communication pass characteristic (S43) to −3 dB. In this way, in the power transmitting communication device 100C, the fractional bandwidth can be increased as the position sof of the short-circuit strip 43 is moved away from the center Q of the long side 41a of the slit 41A toward the end as illustrated in FIG. 60. The power transmitting communication device 100C can obtain a maximum band when the position sof of the short-circuit strip 43 is −60 mm, and the fractional bandwidth is 59.6% at this time. For the power transmitting communication device 100C, the fractional bandwidth is monotonously increased in accordance with the distance of the position sof of the short-circuit strip 43, so that the bandwidth can be fine-tuned with the position sof of the short-circuit strip 43.

Figure 61:
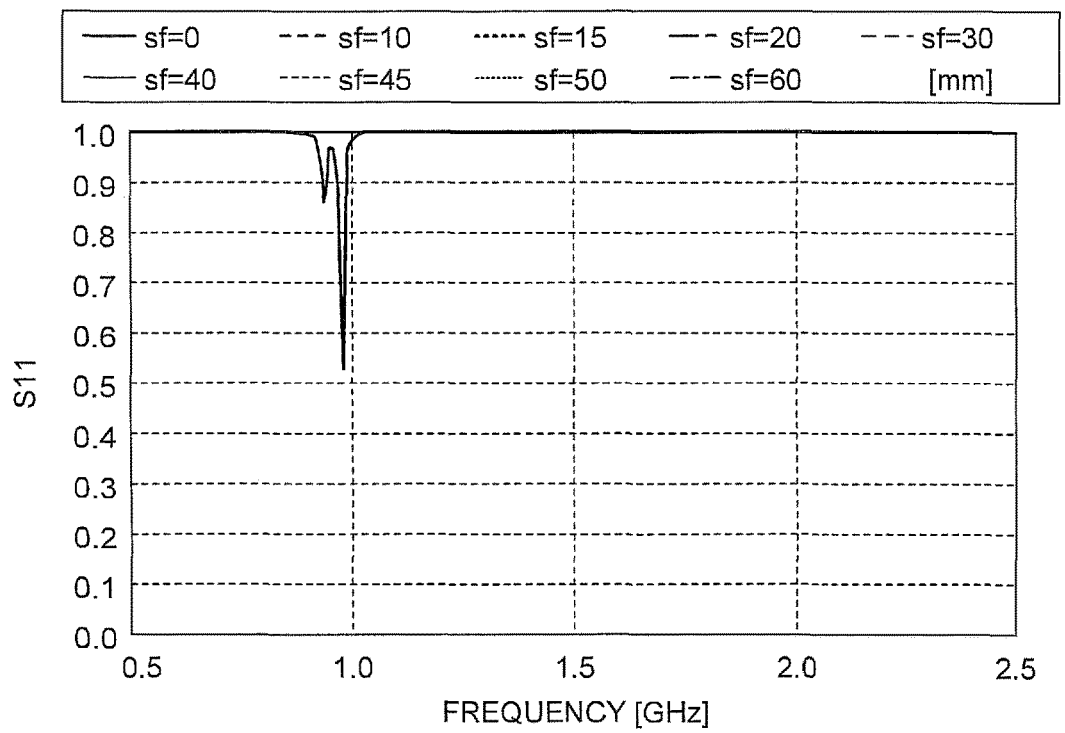
FIG. 61 is a diagram illustrating the power reflection characteristic (S11) in the NFC band when the power feeding position is changed according to the third embodiment.
Figure 62:
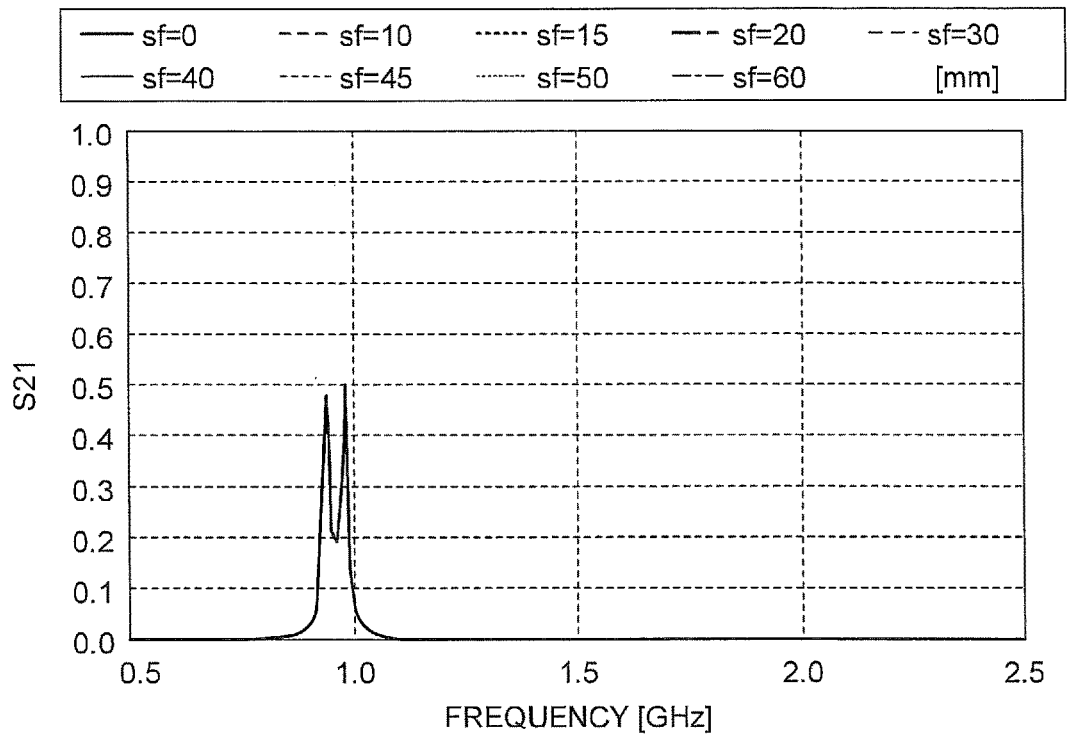
FIG. 62 is a diagram illustrating the power transmission characteristic (S21) in the NFC band when the power feeding position is changed according to the third embodiment.
Figure 63:
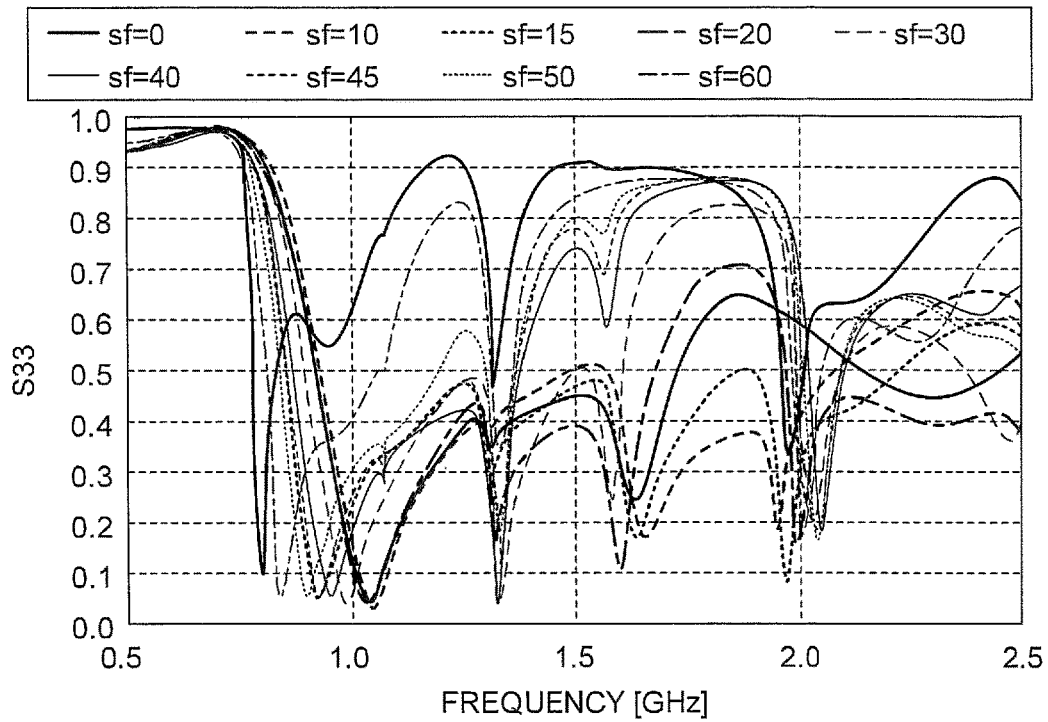
FIG. 63 is a diagram illustrating the communication reflection characteristic (S33) in the NFC band when the power feeding position is changed according to the third embodiment.
Figure 64:
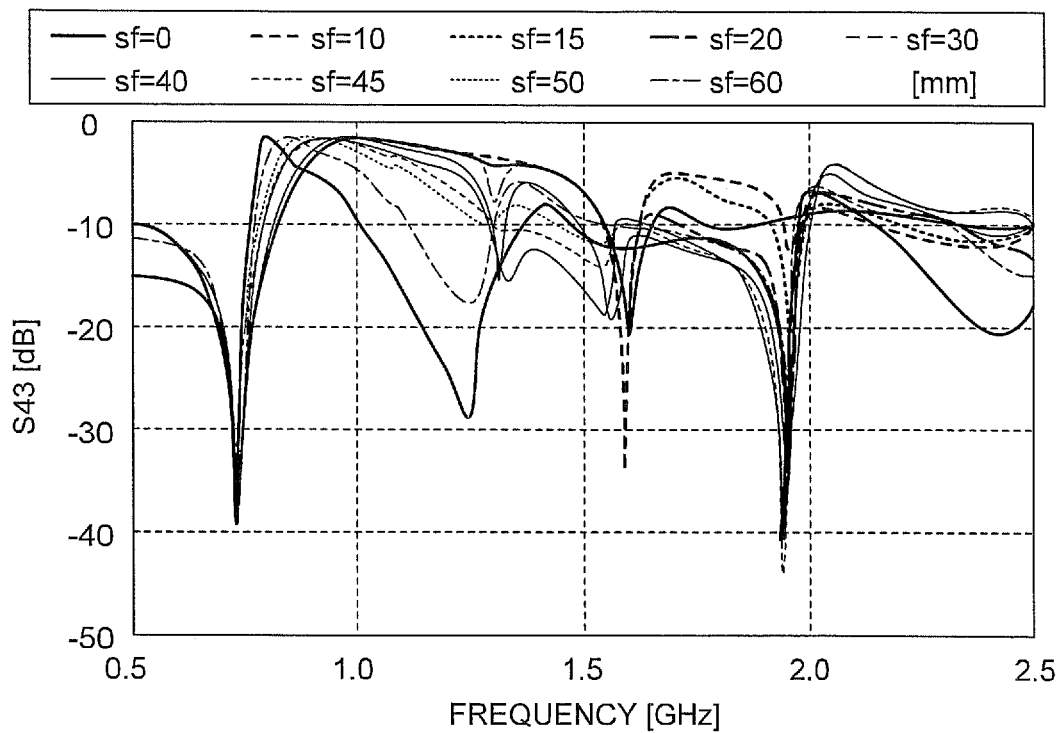
FIG. 64 is a diagram illustrating the communication pass characteristic (S43) in the NFC band when the power feeding position is changed according to the third embodiment.
Figure 65:
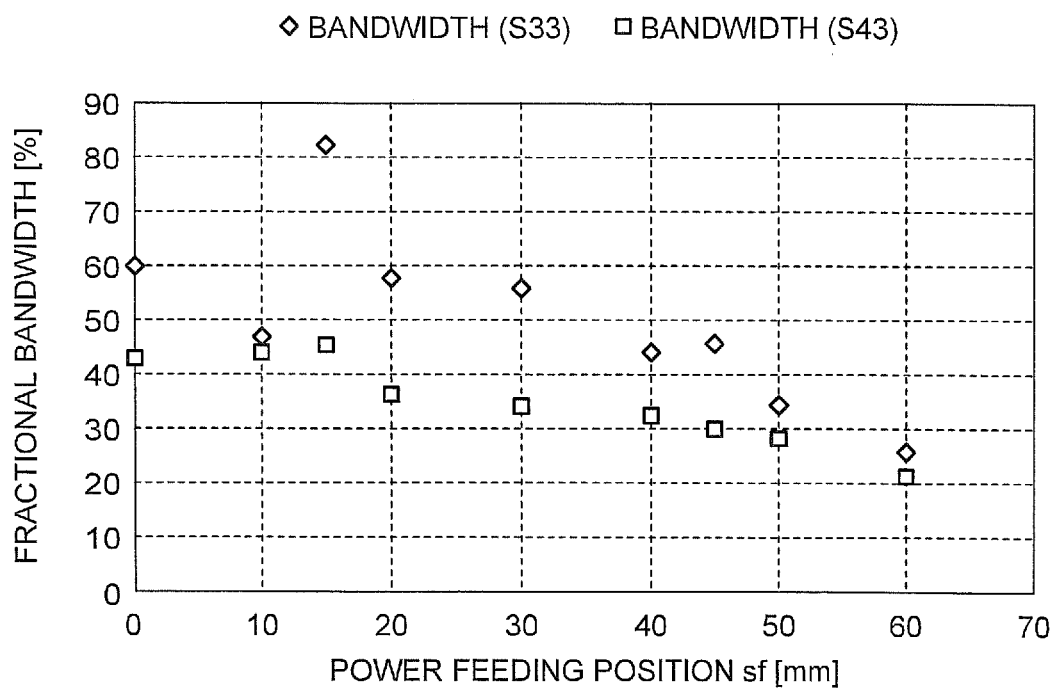
FIG. 65 is a diagram illustrating a relation between the power feeding position and the fractional bandwidth according to the third embodiment.

FIG. 61 is a diagram illustrating the power reflection characteristic (S11) in the NFC band when the power feeding position is changed according to the third embodiment. FIG. 62 is a diagram illustrating the power transmission characteristic (S21) in the NFC band when the power feeding position is changed according to the third embodiment. FIG. 63 is a diagram illustrating the communication reflection characteristic (S33) in the NFC band when the power feeding position is changed according to the third embodiment. FIG. 64 is a diagram illustrating the communication pass characteristic (S43) in the NFC band when the power feeding position is changed according to the third embodiment. FIG. 65 is a diagram illustrating a relation between the power feeding position and the fractional bandwidth according to the third embodiment. In FIG. 61, the vertical axis indicates the power reflection characteristic (S11). In FIG. 62, the vertical axis indicates the power transmission characteristic (S21). In FIG. 63, the vertical axis indicates the communication reflection characteristic (S33). In FIG. 64, the vertical axis indicates the communication pass characteristic (S43). The horizontal axis in FIGS. 61 to 64 indicates the frequency of the NFC band. In FIG. 65, the vertical axis indicates the fractional bandwidth, and the horizontal axis indicates the offset amount sf of the power feeding point 41c. FIG. 65 illustrates a relation between a bandwidth in which the communication reflection characteristic (S33) is equal to or smaller than 0.5 and a bandwidth in which the communication pass characteristic (S43) is in a range from a maximum value to −3 dB. In this example, the offset amount sf of the power feeding point 41c is changed in a range from 0 mm to 60 mm in the NFC band. The position sof of the short-circuit strip 43 is assumed to be −60 mm, and the transmission distance D1 is assumed to be 10 mm.

For the power transmitting communication device 100C, as illustrated in FIGS. 61 and 62, even when the offset amount sf of the power feeding point 41c is changed in a range from 0 mm to 60 mm in the NFC band, the power reflection characteristic (S11) and the power transmission characteristic (S21) were hardly changed. Thus, it can be found that the offset amount sf of the power feeding point 41c in the power transmitting communication device 100C hardly affects the electric power characteristic in the NFC band.

For the power transmitting communication device 100C, as illustrated in FIGS. 63 and 64, the bandwidth of the communication reflection characteristic (S33) and the communication pass characteristic (S43) is widened as the power feeding point 41c is closer to the center Q of the long side 41a of the slit 41A. Due to this, the power transmitting communication device 100C enables the fractional bandwidth to increase by setting the power feeding point 41c to the center Q of the long side 41a of the slit 41A as illustrated in FIG. 65. Regarding the communication reflection characteristic (S33), the maximum value of the fractional bandwidth is 82.3%, and the offset amount sf of the power feeding point 41c is not 0 mm, but 15 mm. This is because matching disturbed by adding the short-circuit strip 43 becomes the best at an offset position of 15 mm.

Figure 66:
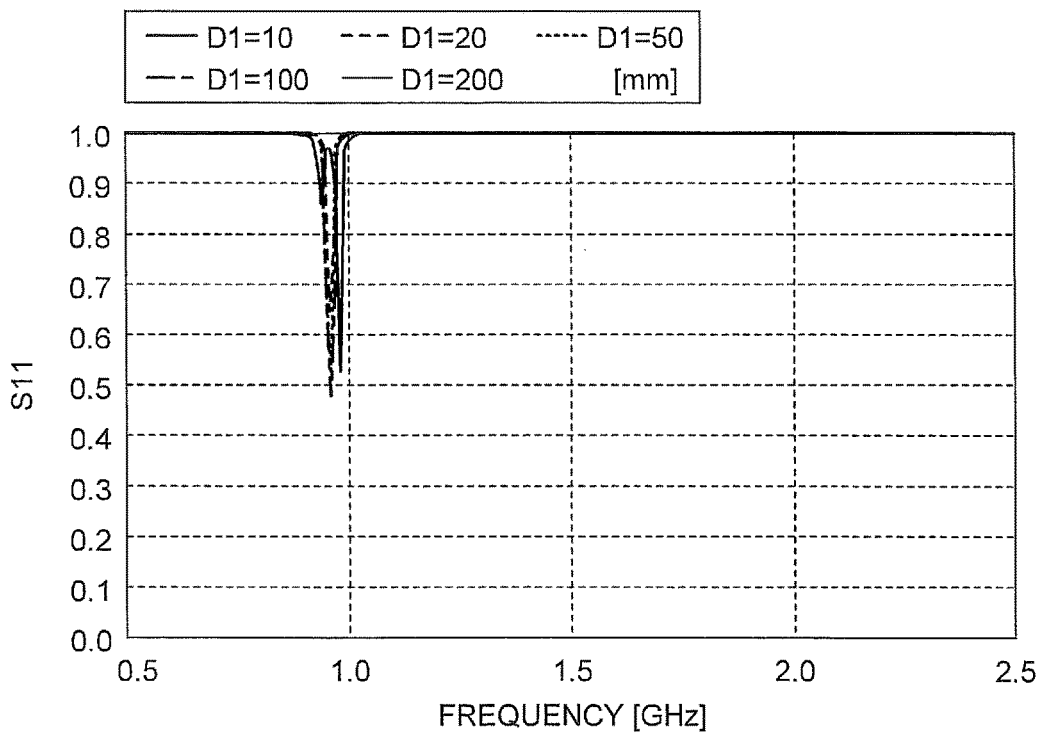
FIG. 66 is a diagram illustrating the power reflection characteristic (S11) in the NFC band when the transmission distance is changed according to the third embodiment.
Figure 67:
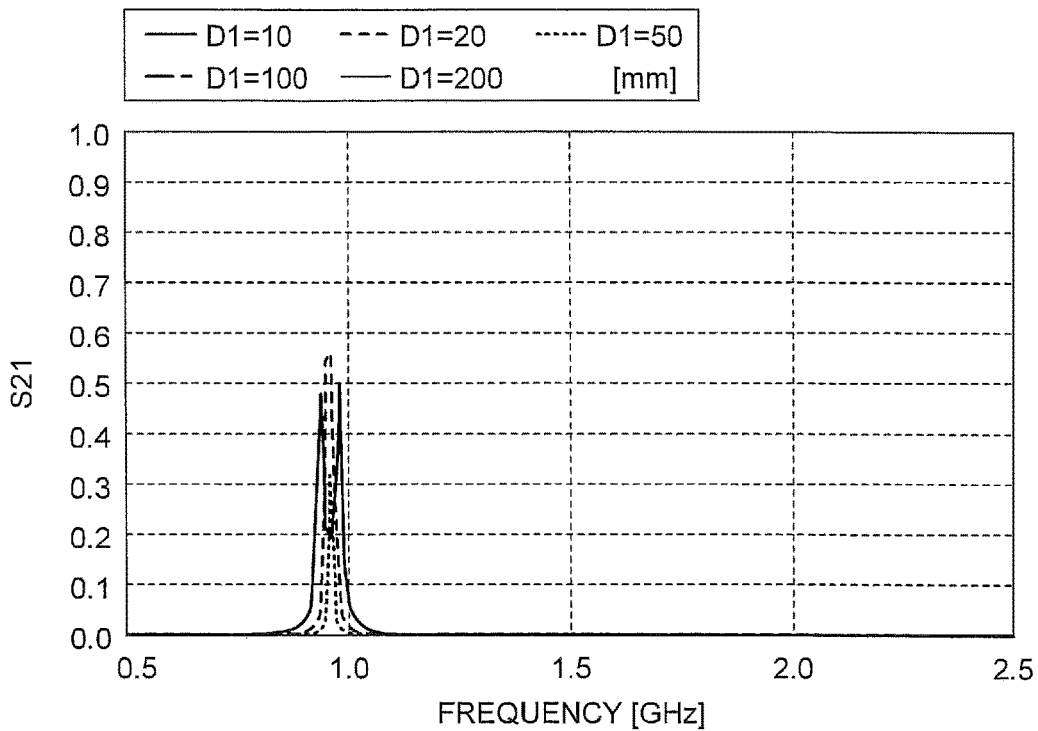
FIG. 67 is a diagram illustrating the power transmission characteristic (S21) in the NFC band when the transmission distance is changed according to the third embodiment.
Figure 68:
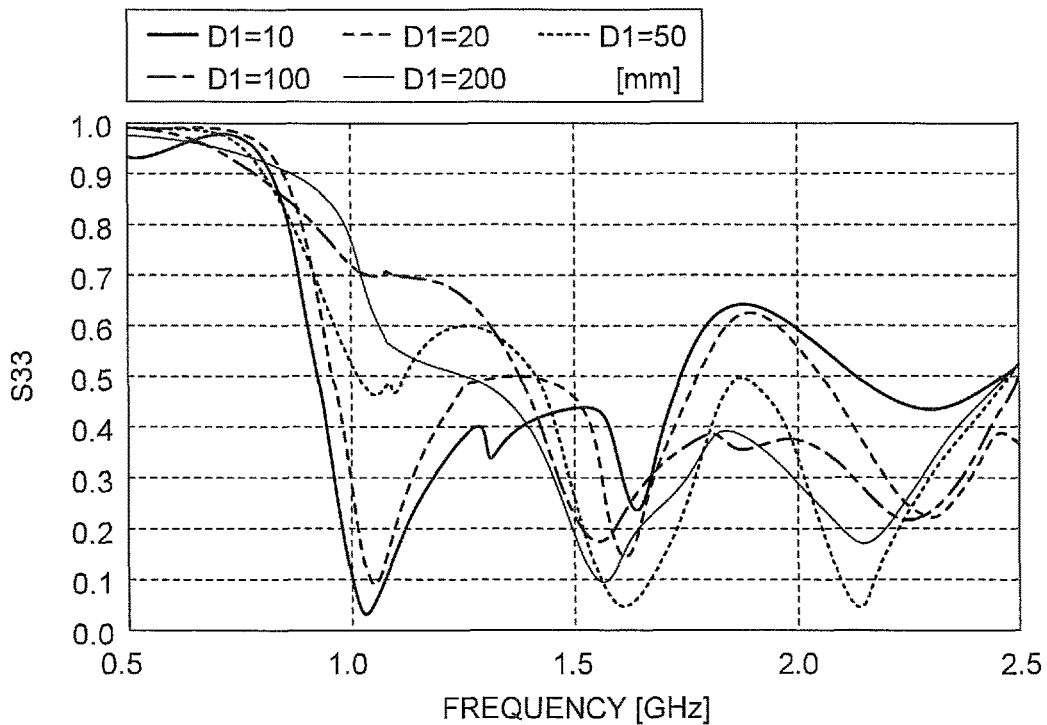
FIG. 68 is a diagram illustrating the communication reflection characteristic (S33) in the NFC band when the transmission distance is changed according to the third embodiment.
Figure 69:
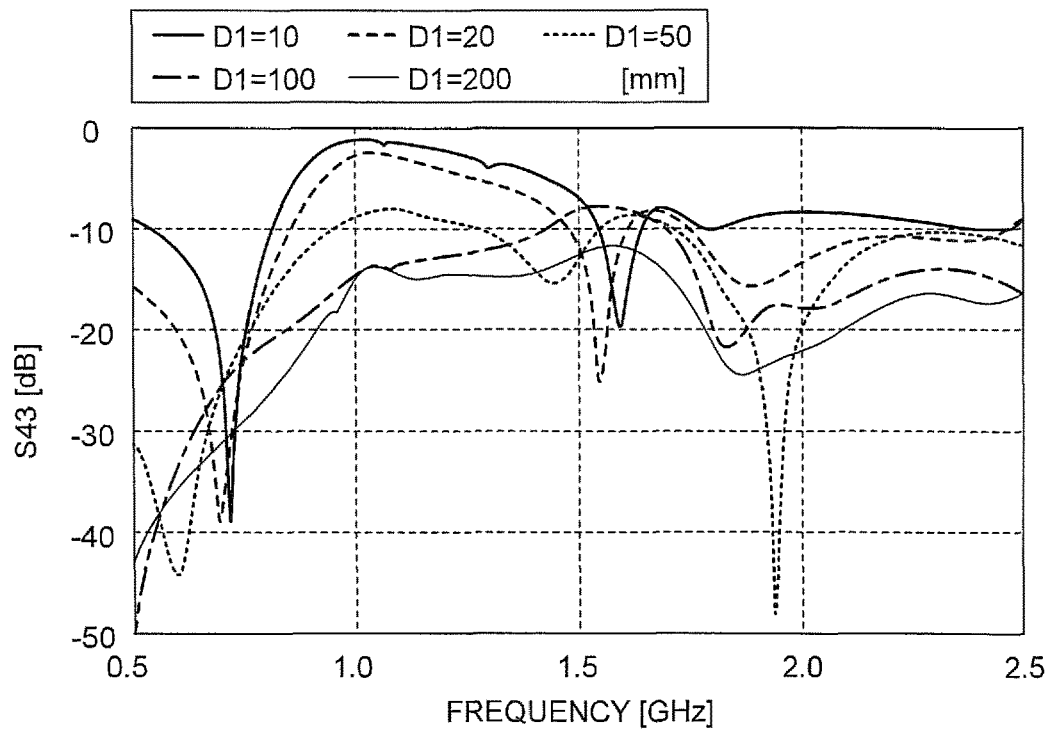
FIG. 69 is a diagram illustrating the communication pass characteristic (S43) in the NFC band when the transmission distance is changed according to the third embodiment.
Figure 70:
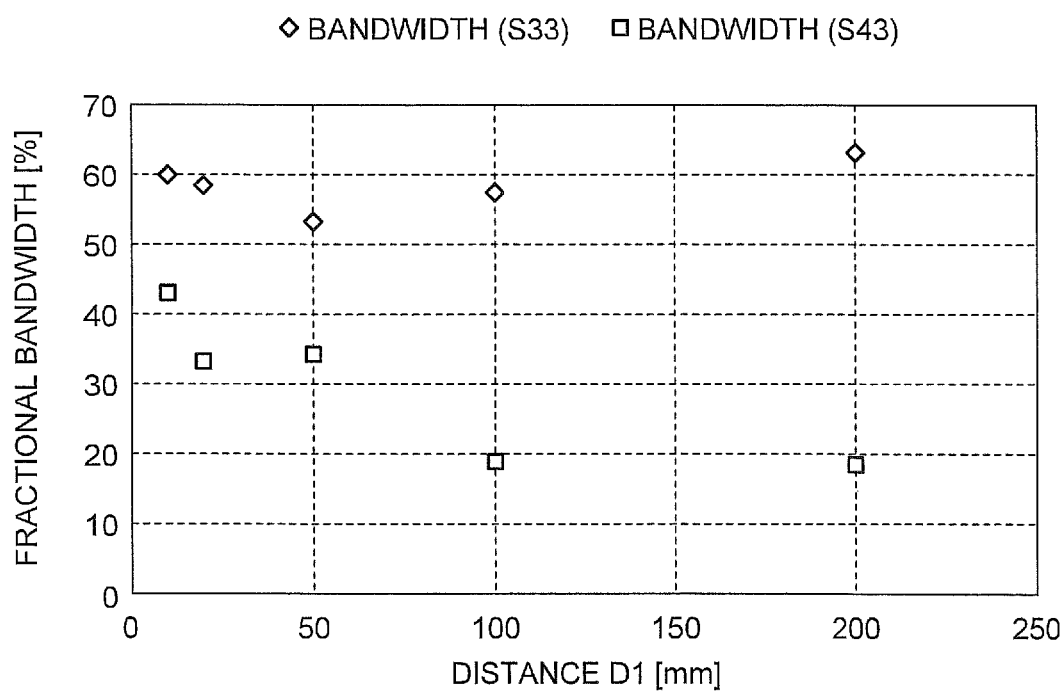
FIG. 70 is a diagram illustrating a relation between the transmission distance and the fractional bandwidth according to the third embodiment.

FIG. 66 is a diagram illustrating the power reflection characteristic (S11) in the NFC band when the transmission distance is changed according to the third embodiment. FIG. 67 is a diagram illustrating the power transmission characteristic (S21) in the NFC band when the transmission distance is changed according to the third embodiment. FIG. 68 is a diagram illustrating the communication reflection characteristic (S33) in the NFC band when the transmission distance is changed according to the third embodiment. FIG. 69 is a diagram illustrating the communication pass characteristic (S43) in the NFC band when the transmission distance is changed according to the third embodiment. FIG. 70 is a diagram illustrating a relation between the transmission distance and the fractional bandwidth according to the third embodiment. In FIG. 66, the vertical axis indicates the power reflection characteristic (S11). In FIG. 67, the vertical axis indicates the power transmission characteristic (S21). In FIG. 68, the vertical axis indicates the communication reflection characteristic (S33). In FIG. 69, the vertical axis indicates the communication pass characteristic (S43). The horizontal axis in FIGS. 66 to 69 indicates the frequency of the NFC band. In FIG. 70, the vertical axis indicates the fractional bandwidth, and the horizontal axis indicates the transmission distance D1. FIG. 70 illustrates a relation between a bandwidth in which the communication reflection characteristic (S33) is equal to or smaller than 0.5 and a bandwidth in which the communication pass characteristic (S43) is in a range from a maximum value to −3 dB. In this example, the transmission distance D1 is changed in a range from 10 mm to 200 mm in the NFC band. The position sof of the short-circuit strip 43 is assumed to be −60 mm, and the offset amount sf of the power feeding point 41c is assumed to be 0 mm.

For the power transmitting communication device 100C, as illustrated in FIGS. 66 and 67, even when the transmission distance D1 is changed in a range from 10 mm to 200 mm in the NFC band, the power reflection characteristic (S11) and the power transmission characteristic (S21) were hardly changed. Thus, it can be found that the transmission distance D1 hardly affects the electric power characteristic in the NFC band in the power transmitting communication device 100C.

With reference to the communication reflection characteristic (S33) illustrated in FIG. 68 and the communication pass characteristic (S43) illustrated in FIG. 69, the influence on communication caused by supplying electric power is suppressed, a flat communication characteristic is obtained, and the bandwidth is widened in the power transmitting communication device 100C. The power transmitting communication device 100C has the same characteristic as that of the power transmitting communication device 100A described above, but it can be found that a resonance point is newly generated as compared with the communication reflection characteristic (S33) of the power transmitting communication device 100A illustrated in FIG. 17. For the power transmitting communication device 100C, as illustrated in FIG. 70, the fractional bandwidth is not largely changed even when the transmission distance D1 is changed.

As described above, in the power transmitting communication device 100C according to the third embodiment, the slot antenna 40A includes the short-circuit strip 43 that electrically connects one long side 41a with the other long side 41a of the slit 41A. Due to this, the power transmitting communication device 100C can fine-tune the bandwidth, and increase the fractional bandwidth.

For the power transmitting communication device 100C, the short-circuit strip 43 is arranged along a direction orthogonal to the long side 41a of the slit 41A, and positioned closer to the end with respect to the center Q of the long side 41a of the slit 41A. Due to this, the power transmitting communication device 100C enables the fractional bandwidth to increase as compared with a case in which the short-circuit strip 43 is positioned at the center Q of the long side 41a of the slit 41A.

Reference Example

Figure 71:
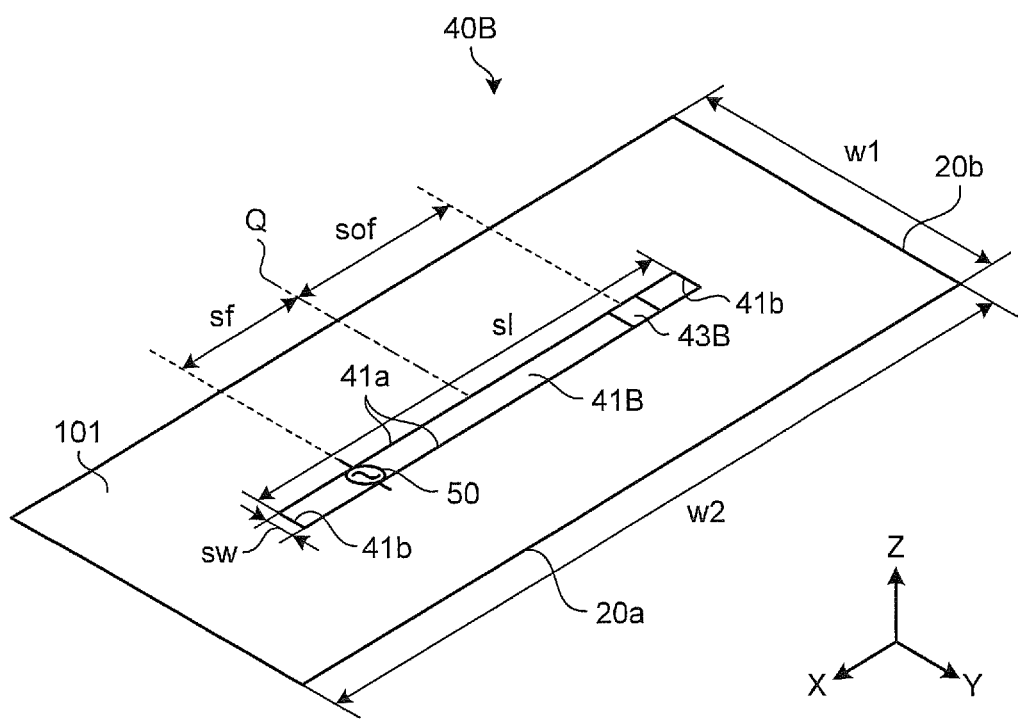
FIG. 71 is a perspective view illustrating a configuration example of a slot antenna according to a reference example.

Next, the following describes a slot antenna 40B including a short-circuit strip 43B according to a reference example. The reference example is different from the third embodiment in that the slot antenna 40B is not arranged on each of the first and second electrodes 20 and 30 that transmit electric power described above, but the single slot antenna 40B is used. As illustrated in FIG. 71, the slot antenna 40B is formed on a rectangular metal plate 101, and configured similarly to the slot antenna 40A described above. For example, the slot antenna 40B includes one short-circuit strip 43B that electrically connects one long side 41a with the other long side 41a of a slit 41B. The short-circuit strip 43B is a conductor formed in a rectangular shape (including a square), and arranged along a direction orthogonal to the long side 41a of the slit 41B. In this example, the short-circuit strip 43B is formed in a square shape, and the length of each side is equal to the length sw of the short side 41b of the slit 41B. The short-circuit strip 43B is, for example, made of the same material as that of the metal plate 101, and integrally molded with the slot antenna 40B. The short-circuit strip 43B may be assembled to the slot antenna 40B as a component. The short-circuit strip 43B is, for example, positioned closer to the end (short side 41b) with respect to the center Q of the long side 41a of the slit 41B. That is, the short-circuit strip 43B is positioned closer to the end with respect to a half (½) position of the long side 41a of the slit 41B. Preferably, the short-circuit strip 43B is positioned closer to the end with respect to a quarter position of the long side 41a. More preferably, when the length from the center Q to the end of the long side 41a is 75 mm, the short-circuit strip 43B is positioned at a place separated away from the center Q of the long side 41a toward the end by 60 mm. That is, assuming that the distance from the center Q to the end of the long side 41a is "1", the short-circuit strip 43B is positioned at a place separated away from the center Q toward the end by "⅘".

Next, the following describes an operation characteristic of the slot antenna 40B. In this example, the length w1 of the short side 20b of the metal plate 101 is assumed to be 107.8 mm, and the length w2 of the long side 20a of the metal plate 101 is assumed to be 250 mm. For the slot antenna 40B, the length s1 of the long side 41a of the slit 41B is assumed to be 150 mm, and the length sw of the short side 41b is assumed to be 1 mm. Analysis was performed assuming that the NFC band is in a range from 0.5 GHz to 3.0 GHz. With respect to the center Q (0 mm) of the long side 41a of the slit 41B, one side of the long side 41a is assumed to be a plus length, and the other side of the long side 41a is assumed to be a minus length. That is, with respect to the center Q (0 mm) of the slit 41B, one side of the long side 41a is assumed to have a length from 0 mm to 75 mm, and the other side of the long side 41a is assumed to have a length from 0 mm to −75 mm. In this case, the position sof of the short-circuit strip 43B is changed in a range from −10 mm to −70 mm, and the offset amount sf of the power feeding point 41c is changed in a range from 0 mm to 70 mm.

Figure 72:
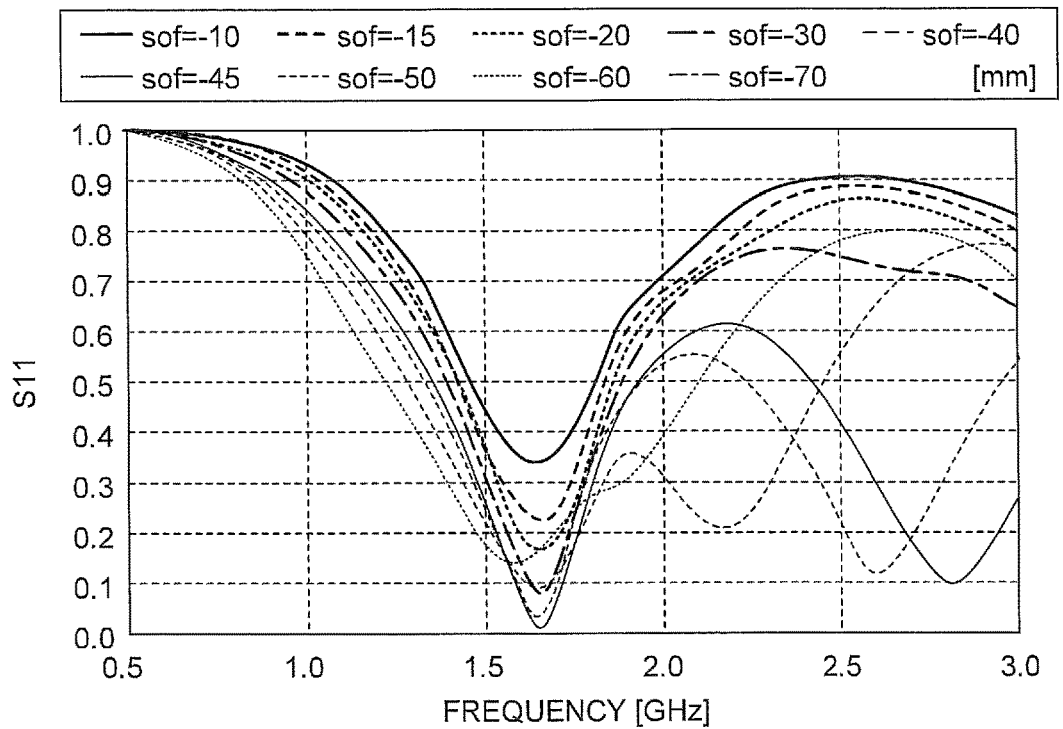
FIG. 72 is a diagram illustrating the communication reflection characteristic (S11) in the NFC band when the short-circuit position is changed according to the reference example.

FIG. 72 is a diagram illustrating the communication reflection characteristic (S11) in the NFC band when the short-circuit position is changed according to the reference example. In FIG. 72, the vertical axis indicates the communication reflection characteristic (S11), and the horizontal axis indicates the frequency of the NFC band. In this example, the position sof of the short-circuit strip 43B is changed in a range from −10 mm to −70 mm in the NFC band. The offset amount sf of the power feeding point 41c is assumed to be 0 mm. For the slot antenna 40B, as illustrated in FIG. 72, when the position sof of the short-circuit strip 43B is changed in a range from −10 mm to −70 mm in the NFC band, the bandwidth (0.5≥S11) tends to be widened as the position sof of the short-circuit strip 43B is moved away from the center Q of the long side 41a of the slit 41B toward the end. The slot antenna 40B can obtain a maximum band when the position sof of the short-circuit strip 43B is −60 mm, and the fractional bandwidth is 61.3% at this time.

Figure 73:
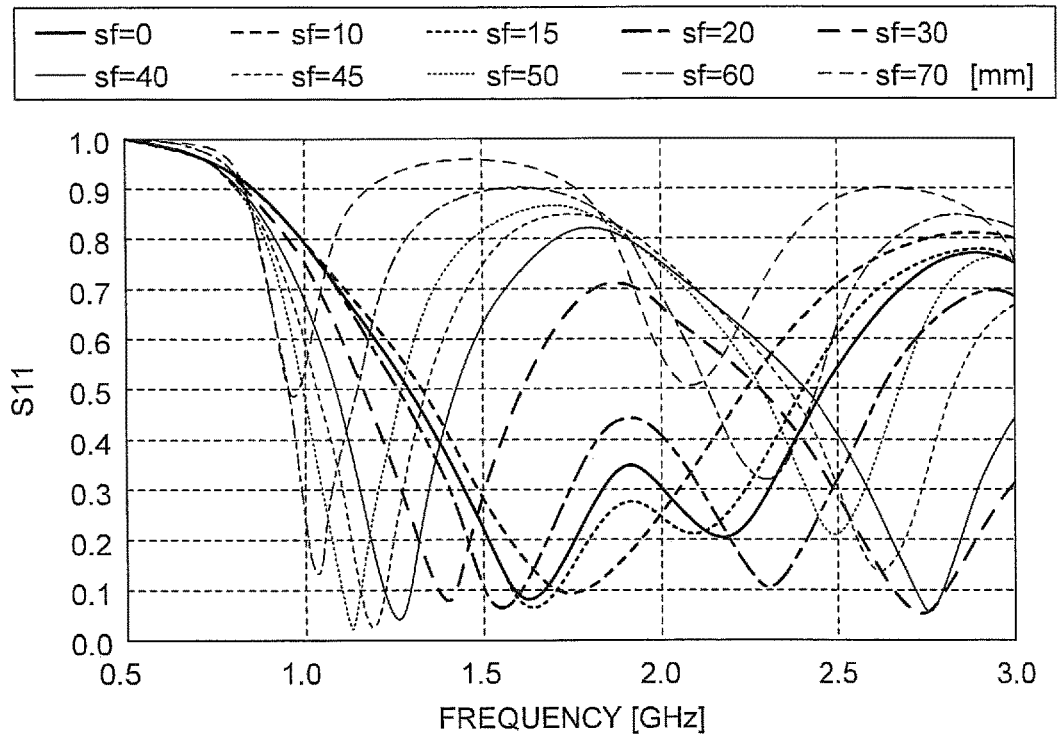
FIG. 73 is a diagram illustrating the communication reflection characteristic (S11) in the NFC band when the power feeding position is changed according to the reference example.

FIG. 73 is a diagram illustrating the communication reflection characteristic (S11) in the NFC band when the power feeding position is changed according to the reference example. In FIG. 73, the vertical axis indicates the communication reflection characteristic (S11), and the horizontal axis indicates the frequency of the NFC band. In this example, the offset amount sf of the power feeding point 41c is changed in a range from 0 mm to 70 mm in the NFC band. The position sof of the short-circuit strip 43B is assumed to be −60 mm. For the slot antenna 40B, as illustrated in FIG. 73, when the offset amount sf of the power feeding point 41c is changed in a range from 0 mm to 70 mm in the NFC band, the bandwidth of the communication reflection characteristic (S11) was widened as the power feeding point 41c is closer to the center Q of the long side 41a of the slit 41B. Due to this, the slot antenna 40B enables the fractional bandwidth to increase by setting the power feeding point 41c to the center Q of the long side 41a of the slit 41B.

As described above, the slot antenna 40B according to the reference example is constituted of the single slot antenna 40B, and includes the short-circuit strip 43B that electrically connects one long side 41a with the other long side 41a of the slit 41B. Due to this, the slot antenna 40B can fine-tune the bandwidth, and increase the fractional bandwidth.

For the slot antenna 40B, the short-circuit strip 43B is arranged along the direction orthogonal to the long side 41a of the slit 41B, and positioned closer to the end with respect to the center Q of the long side 41a of the slit 41B. Due to this, for the slot antenna 40B, the fractional bandwidth can be increased as compared with a case in which the short-circuit strip 43B is positioned at the center Q of the long side 41a of the slit 41B. For the slot antenna 40B, the power feeding point 41c is arranged at the center Q of the long side 41a of the slit 41B, so that the fractional bandwidth can be widened.

The power transmitting communication unit and the power transmitting communication device according to the present embodiments includes a slot antenna that transmits or receives radio waves via a slit formed on at least one of the first electrode or the second electrode, so that the size thereof can be reduced.

The power transmitting communication unit and the power transmitting communication device according to the present embodiments includes a U-shaped folded monopole antenna that transmits or receives radio waves via a U-shaped metal plate formed on at least one of the first electrode or the second electrode, so that the size thereof can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmitting communication unit comprising:
   a base material;
   a flat plate-like first electrode that is arranged on the base material and transmits electric power for supplying a load in a non-contact manner;
   a flat plate-like second electrode that is arranged side by side with the first electrode on the base material, and transmits electric power for supplying the load in a non-contact manner; and
   a slot antenna that transmits or receives radio waves via a slit formed on at least one of the first electrode and the second electrode, the radio waves being for communication and different from the electric power supply to the load.

2. The power transmitting communication unit according to claim 1, wherein the slit is formed in a rectangular shape, a length of a long side of the slit is ½ of a wavelength of the radio waves, and a length of a short side of the slit is equal to or smaller than 1/30 of the wavelength of the radio waves.

3. The power transmitting communication unit according to claim 1, further comprising: a signal input/output circuit that is connected to the slot antenna via a signal line and inputs/outputs an electric signal to the slot antenna.

4. The power transmitting communication unit according to claim 3, wherein the slot antenna includes a power feeding point to which the signal line is connected, and the power feeding point is arranged at a center of the long side of the slit.

5. The power transmitting communication unit according to claim 1, wherein the slit is formed in a rectangular shape, and the slot antenna includes a short-circuit part that electrically connects one long side with the other long side of the slit.

6. The power transmitting communication unit according to claim 5, wherein the short-circuit part is arranged along a direction orthogonal to the long side of the slit, and positioned closer to an end with respect to the center of the long side of the slit.

* * * * *